(12) United States Patent
Kasper

(10) Patent No.: US 8,538,588 B2
(45) Date of Patent: Sep. 17, 2013

(54) METHOD AND APPARATUS FOR CONFIGURING SCHEDULING ON A WALL MODULE

(75) Inventor: Gary P. Kasper, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 13/037,264

(22) Filed: Feb. 28, 2011

(65) Prior Publication Data

US 2012/0221149 A1    Aug. 30, 2012

(51) Int. Cl.
| G01M 1/38 | (2006.01) |
| G05B 13/00 | (2006.01) |
| G05B 15/00 | (2006.01) |
| G05D 23/00 | (2006.01) |
| G05B 19/42 | (2006.01) |
| G06F 3/00 | (2006.01) |
| G06F 19/00 | (2011.01) |

(52) U.S. Cl.
USPC ............... 700/276; 700/86; 700/87; 700/277; 700/278; 715/700; 715/866; 717/100; 717/121

(58) Field of Classification Search
USPC ............... 700/17, 83–87, 276–278; 715/700, 715/866, 963; 717/100, 121
See application file for complete search history.

(56) References Cited

U.S. PATENT DOCUMENTS

| 3,058,484 A | 10/1962 | Feiring |
| 3,107,685 A | 10/1963 | Scaramucci |
| 3,132,836 A | 5/1964 | Dickerson et al. |
| 3,150,681 A | 9/1964 | Hansen et al. |
| 3,179,121 A | 4/1965 | Bredtschneider et al. |
| 3,198,477 A | 8/1965 | Allenbaugh, Jr. |
| 3,743,242 A | 7/1973 | Scaramucci |
| 4,562,860 A | 1/1986 | Walter et al. |
| 4,606,368 A | 8/1986 | McCafferty |

(Continued)

FOREIGN PATENT DOCUMENTS

| EP | 1008817 | 6/2000 |
| EP | 1380909 | 1/2004 |

(Continued)

OTHER PUBLICATIONS

"LonMark Functional Profile: VAV Controller (VAV)," pp. 1-19, 1996.

(Continued)

*Primary Examiner* — Ramesh Patel
(74) *Attorney, Agent, or Firm* — Seager Tufte & Wickhem LLC.

(57) ABSTRACT

The present disclosure relates generally to building control systems and, more particularly, to methods and devices for configuring and/or displaying parameters or other information such as menu screens on a programmable wall module of a building control system. In an illustrative embodiment, a configuration tool may be configured to create a number of screens for the user interface of the programmable wall module based on a number of user inputs received via the user interface of the configuration tool. In some cases, the number of user inputs received via the user interface of the configuration tool may be less than, and sometimes far less than, the number of screens that are created by the configuration tool. Regardless, with the number of screens created, the configuration tool may upload the number of screens to the programmable wall module for use on the user interface of the programmable wall module.

20 Claims, 45 Drawing Sheets

(56) References Cited

U.S. PATENT DOCUMENTS

| | | |
|---|---|---|
| 4,654,653 A | 3/1987 | Brindle et al. |
| 4,721,870 A | 1/1988 | Rector et al. |
| 4,723,513 A | 2/1988 | Vallett et al. |
| 4,784,580 A | 11/1988 | Takata et al. |
| 4,793,800 A | 12/1988 | Vallett et al. |
| 5,449,319 A | 9/1995 | Dushane et al. |
| 5,479,812 A | 1/1996 | Juntunen et al. |
| 5,605,280 A | 2/1997 | Hartman |
| 5,689,669 A | 11/1997 | Lynch et al. |
| 5,778,368 A | 7/1998 | Hogan et al. |
| 5,801,942 A | 9/1998 | Nixon et al. |
| 5,944,054 A | 8/1999 | Saieva |
| 5,989,020 A | 11/1999 | Glass et al. |
| 6,008,805 A | 12/1999 | Land et al. |
| 6,134,853 A | 10/2000 | Haener |
| 6,157,943 A | 12/2000 | Meyer |
| 6,272,400 B1 | 8/2001 | Jankins et al. |
| 6,330,806 B1 | 12/2001 | Beaverson et al. |
| 6,366,300 B1 | 4/2002 | Ohara et al. |
| 6,428,312 B1 | 8/2002 | Smelcer et al. |
| 6,453,687 B2 | 9/2002 | Sharood et al. |
| 6,536,678 B2 | 3/2003 | Pouchak |
| 6,549,826 B1 | 4/2003 | Pouchak et al. |
| 6,615,404 B1 | 9/2003 | Garfunkel et al. |
| 6,618,430 B1 | 9/2003 | Khaleghi et al. |
| 6,619,951 B2 | 9/2003 | Bodnar et al. |
| 6,687,698 B1 | 2/2004 | Nixon et al. |
| 6,694,926 B2 | 2/2004 | Baese et al. |
| 6,741,915 B2 | 5/2004 | Poth |
| 6,745,085 B2 | 6/2004 | Pouchak |
| 6,754,885 B1 | 6/2004 | Dardinski et al. |
| 6,832,120 B1 | 12/2004 | Frank et al. |
| 6,851,621 B1* | 2/2005 | Wacker et al. ............ 236/51 |
| 6,867,749 B1 | 3/2005 | Il et al. |
| 6,934,762 B1 | 8/2005 | Lange et al. |
| 6,934,862 B2 | 8/2005 | Sharood et al. |
| 6,954,906 B1* | 10/2005 | Kamachi et al. ............ 715/799 |
| 6,996,600 B2 | 2/2006 | Gagner et al. |
| 7,025,281 B2 | 4/2006 | DeLuca |
| 7,028,912 B1 | 4/2006 | Rosen |
| 7,043,311 B2 | 5/2006 | Nixon et al. |
| 7,047,092 B2* | 5/2006 | Wimsatt ............ 700/83 |
| 7,055,759 B2 | 6/2006 | Wacker et al. |
| 7,071,727 B2 | 7/2006 | Ganton |
| 7,083,109 B2 | 8/2006 | Pouchak |
| 7,089,530 B1 | 8/2006 | Dardinski et al. |
| 7,120,908 B1 | 10/2006 | Klimchynski |
| 7,124,163 B2 | 10/2006 | Geofroy et al. |
| 7,124,205 B2 | 10/2006 | Craft et al. |
| 7,188,779 B2 | 3/2007 | Alles |
| 7,222,800 B2* | 5/2007 | Wruck ............ 236/51 |
| 7,225,054 B2 | 5/2007 | Amundson et al. |
| 7,225,426 B2 | 5/2007 | Frank et al. |
| 7,269,646 B2 | 9/2007 | Yamamoto et al. |
| 7,272,815 B1 | 9/2007 | Eldridge et al. |
| 7,283,816 B2 | 10/2007 | Fok et al. |
| 7,505,817 B2 | 3/2009 | McDaniel et al. |
| 7,529,650 B2 | 5/2009 | Wakelam et al. |
| 7,627,385 B2 | 12/2009 | McGreevy et al. |
| 7,706,923 B2 | 4/2010 | Amundson et al. |
| 7,819,334 B2 | 10/2010 | Pouchak et al. |
| 7,904,074 B2* | 3/2011 | Karaoguz et al. ............ 455/420 |
| 2002/0152298 A1* | 10/2002 | Kikta et al. ............ 709/223 |
| 2003/0158975 A1 | 8/2003 | Frank et al. |
| 2004/0144849 A1 | 7/2004 | Ahmed |
| 2004/0260427 A1* | 12/2004 | Wimsatt ............ 700/275 |
| 2005/0040250 A1* | 2/2005 | Wruck ............ 236/51 |
| 2005/0204020 A1 | 9/2005 | O'Brien et al. |
| 2006/0159007 A1 | 7/2006 | Frutiger et al. |
| 2006/0253205 A1* | 11/2006 | Gardiner ............ 700/19 |
| 2007/0200004 A1* | 8/2007 | Kasper et al. ............ 236/44 C |
| 2008/0004725 A1* | 1/2008 | Wacker ............ 700/83 |
| 2008/0157600 A1 | 7/2008 | Marlenee et al. |
| 2009/0158188 A1* | 6/2009 | Bray et al. ............ 715/771 |
| 2010/0050075 A1* | 2/2010 | Thorson et al. ............ 715/702 |
| 2010/0100829 A1* | 4/2010 | Laberge et al. ............ 715/762 |
| 2010/0245259 A1* | 9/2010 | Bairagi et al. ............ 345/173 |
| 2011/0010660 A1* | 1/2011 | Thorson et al. ............ 715/790 |

FOREIGN PATENT DOCUMENTS

| | | |
|---|---|---|
| GB | 2257538 | 1/1993 |
| GB | 2262625 | 6/1993 |
| JP | 2001117810 | 4/2001 |
| WO | 03067457 | 8/2003 |

OTHER PUBLICATIONS

Alerton Technologies, Inc., "BACtalk Microset II Wall Unit, Product Nos. MS-2000-BT & MS-2000H-BT (with Optional Humidity Sensor)," 2 pages, 1999.

Alerton, "BACtalk Microset II," Installation and Operations Guide, 32 pages, 1999.

Aube, Drawings of Circuits 1 and 2, 2 pages, Date of Public Use or Disclosure Not Yet Determined as of May 28, 2008.

Carrier Corporation, "3V Control System, System Pilot, Part No. 33PILOT-01," Product Specification, 4 pages, Sep. 2004.

Carrier, "System Pilot, Part No. 33PILOT-01," Installation and Operation Instructions, 20 pages, 2004.

Carrier, "System Pilot, Part No. 33PILOT-01," Owner's Manual, 8 pages, 2004.

Central and Southwest Communications, "Customer Choice and Control Thermostat Touchpad," User Guide, 15 pages, May 1996.

Delta Controls, "HVAC, Network Sensors BACstatII: DNS-24/H24," 2 pages, Oct. 2004.

Echelon, "ShortStack Developer's Kit Model 23400," 3 pages, 2002.

Echelon, "Echelon ShortStack Micro Server Answers to Frequently Asked Questions," pp. 1-5, Apr. 2002.

Echelon, "Introduction to the LonWorks System, Version 1.0," 73 pages, 1999.

Echelon, "ShortStack Overview," 12 pages, prior to Nov. 29, 2006.

Echelon, "ShortStack User's Guide, Version 2" 152 pages, Mar. 2002.

Honeywell, "Command Display S7760A EPROM Replacement," Installation Instructions, 2 pages, 2002.

Honeywell, "Command Display S7760A," User Guide, 41 pages, Feb. 2000.

Honeywell, "Excel 15 S7760A Command Display," Installation Instructions, 8 pages, Feb. 1999.

Honeywell, "Excel 15 S7760A Command Display," Specification Data, 2 pages, Nov. 1998.

Honeywell, "FocusPRO TH6000 Series, Installation Guide," 16 pages, Mar. 2006.

Honeywell, "FocusPro TH6320R Wireless Thermostat," Operating Manual, 62 pages, Jul. 2008.

Honeywell, "PVL6436A, PVL6438N, PUL6438 Programmable VAV/Unitary Controllers," Installation Instructions, 24 pages, Dec. 2006.

Honeywell, "S7340A System User Interface," Specification Data, 2 pages, Nov. 1999.

Honeywell, "S7760A Command Display for RapidZone Solution," 12 pages, Feb. 2001.

Honeywell, "T7525A and T7526A Thermostat Touchpads," 6 pages, Oct. 1994.

Honeywell, "T7525A/T7526A Thermostat Touchpad," User Guide, 12 pages, May 1995.

Honeywell, "T7560A,B, Digital Wall Module," Specification Data, 8 pages, May 1999.

Honeywell, "T7560A,B,C Digital Wall Module," Installation Instructions, 8 pages, 2003.

Honeywell, "T7770A,B,C,D,E,F,G, Wall Modules, Excel 5000 Open System," Specification Data, 4 pages, May 1997.

Honeywell, "TB8220 Commercial VisionPro Programmable Thermostat VisionPro 8000 Touchscreen," Product Data, 24 pages, Dec. 2006.

Honeywell, "TB8220U Commercial VisionPRO Programmable Thermostat," Installation Instructions, 16 pages, Jan. 2008.

Honeywell, "TR70 and TR70-H LCD Wall Modules," Installation Instructions, 4 pages, Apr. 2008.

Honeywell, "Zio LCD Wall Modules TR70 and TR70-H with Sylk Bus," Operating Guide, 28 pages, Oct. 2008.
Honeywell, "Zio LCD Wall Modules TR70 and TR70-H with Sylk Bus," Specification Data, 4 pages, Oct. 2008.
Invensys, "Micronet Sensors, DS 10.000, MN Sx Series, Data Sheets," 4 pages, Mar. 2003.
Invensys, "Micronet Sensors, MN-SXXX Series," 4 pages, Mar. 2002.
Johnson Controls, Inc., "Room Sensor with LCD Display (TMZ1600)," Installation Instructions, 14 pages, Apr. 12, 2006.
Johnson Controls, Inc., "TMx1600 Room Sensor with LCD Display," Product Bulletin, 4 pages, Jan. 2001.
Johnson Controls, Inc., "TMx1600 Room Sensor with LCD Display," Product Bulletin, 4 pages, Jul. 20, 2006.
Reliable Controls, "SMART-Sensor LCD, Mach System" 1 page, 2006.
Reliable Controls, "SMART-Sensor LCD," 2 pages, 2006.
Robertshaw, "Deluxe Programmable Thermostat, Models 9801i," 2 pages, Aug. 2003.
Robertshaw, "Deluxe Programmable Thermostats, Models 9801i, 9815i and 9820i, Quick Start Installation Manual," 2 pages, prior to Dec. 14, 2007.
Robertshaw, "Deluxe Programmable Thermostats, Models 9801i, 9815i and 9820i," User's Manual, 28 pages, Jul. 2004.
Robertshaw, "Deluxe Programmable Thermostats, Models 9815i," 2 pages, Aug. 2003.
Robertshaw, "Deluxe Programmable Thermostats, Models 9820i," 2 pages, Aug. 2003.
Trane, "Digital Display Zone Sensor," 2 pages, 2002.
Trane, "Digital Display Zone Sensor," 2 pages, 2004.
Trane, "Operating Instructions," 1 page, prior to Oct. 16, 2008.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.

* cited by examiner

| Area name | # of segments | Segments |
|---|---|---|
| Labels | 10 | SYSTEM:+line, ROOM (left), SETPOINT (left), OUTSIDE, HUMIDITY%, ROOM (middle), SETPOINT (middle), TEMPERATURE, OVERRIDE, REMAINING. |
| Top Alpha-numeric | 80 | 8 characters x 10 segments |
| Middle Alpha-numeric | 28 | 4 characters x 7 segments |
| System Status | 7 | flake, flame, OFF, AUTO, COOL, EM., HEAT |
| Fan Status | 7 | Blade, AUTO, OFF, ON, bar 1, bar 2, bar 3, (bar1 includes the outline of the 3 bars) |
| Occupancy Status | 4 | House+OCCUPIED, inside man, UN+outside man, STANDBY |
| Units and dots | 11 | %, PPM, AM, CFM, PM, L/S, CM , INCH, decimal1, decimal2, colon |
| Menu | 13 | PREV, DONE, FAN, SET HOME SCREEN, EDIT, CANCEL, OVERRIDE, SET VIEW MORE, NEXT, SYSTEM, &, VIEW MORE, PARAMETERS |
| TOTAL | 160 | |

*Figure 3*

METHOD AND APPARATUS FOR CONFIGURING SCHEDULING ON A WALL MODULE

FIELD

The present disclosure relates generally to building control systems and, more particularly, to methods and devices for configuring and/or displaying parameters or other information such as menu screens on a programmable wall module of a building control system.

BACKGROUND

Building automation systems (BAS) are often used to help control certain systems of a building. For example, building automation systems often control a heating, ventilation and air conditioning (HVAC) system, in order to control the comfort level within the building. In some cases, a controller, such as an HVAC controller, may be connected to an HVAC system to activate and deactivate one or more HVAC components of the HVAC system to control one or more environmental conditions within the building. These environmental conditions often include temperature, humidity, and/or ventilation.

In many applications, information and/or parameters concerning the HVAC system are displayed to users of the building, such as owners or tenants. However, the information and/or parameters that each class of user may see and/or modify may vary according to the specific installation or application. For example, in some multi-tenant buildings, it may be desirable for each tenant to be able to view and modify their temperature set point, while in other multi-tenant buildings, it may be desirable for each tenant to be able to only view their temperature set point. Configuring the information and/or parameters that are viewable and/or modifiable on an installation-by-installation basis can be a tedious and time consuming task for many installers.

SUMMARY

The present disclosure relates generally to building control systems and, more particularly, to methods and devices for configuring and/or displaying parameters or other information such as menu screens on a programmable wall module of a building control system. In an illustrative embodiment, a configuration tool may include a controller, a user interface controlled by the controller, and an output port controlled by the controller. The controller of the configuration tool may be configured to create a number of screens for the user interface of the programmable wall module based on a number of user inputs received via the user interface of the configuration tool. In some cases, the number of user inputs received via the user interface of the configuration tool may be less than, and sometimes far less than, the number of screens that are created by the controller of the configuration tool. Regardless, with the number of screens created, the controller may output the number of screens to the output port of the configuration tool so that the number of screens can be uploaded to the programmable wall module for display on the user interface of the programmable wall module.

An illustrative method may include, for example, communicatively connecting a configuration tool to a programmable wall module of an HVAC system, displaying selectable configuration information to a user on a user interface of the configuration tool, allowing a user to make configuration information selections via the user interface of the configuration tool; creating a plurality of screens for the programmable wall module with the configuration tool based on the configuration information selections made by the user of the configuration tool, and uploading the plurality of screens to the programmable wall module from the configuration tool.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which:

FIG. 3 is a table showing the various portions of the segmented display shown in FIG. 2;

DESCRIPTION

Figure 1:
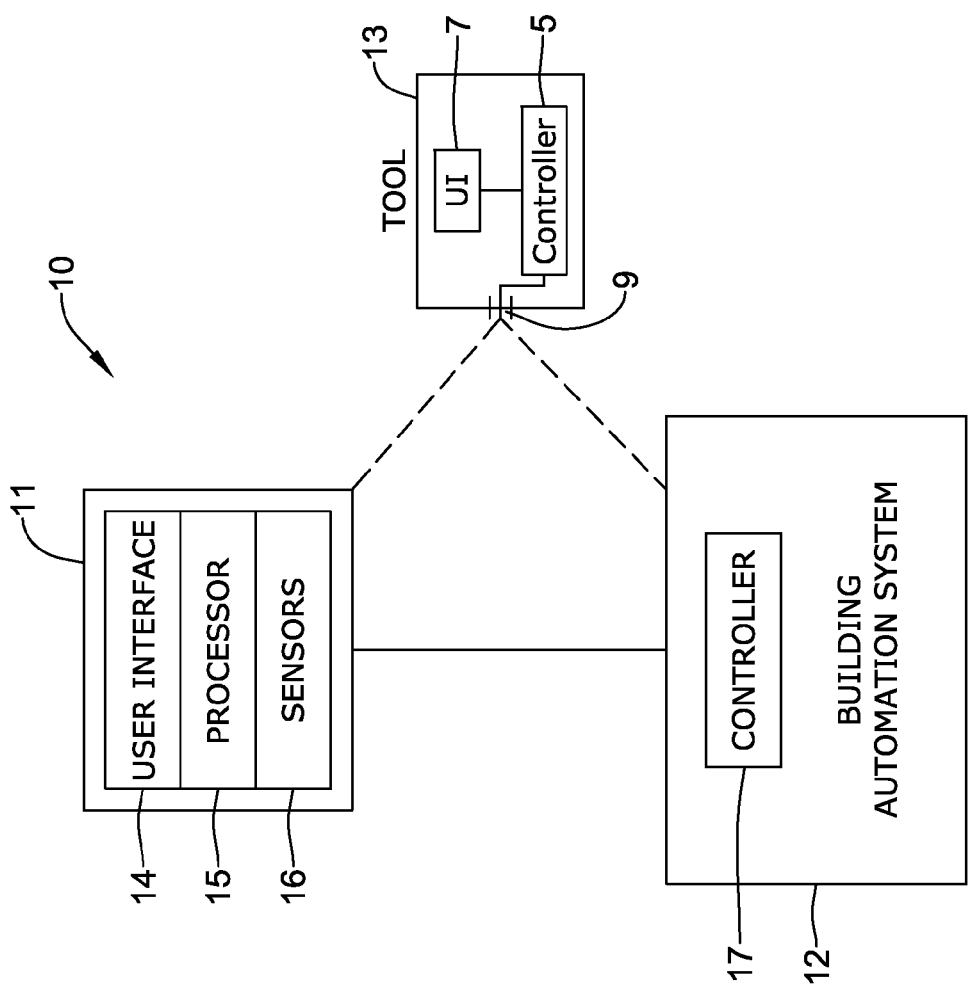
FIG. 1 is a schematic diagram of an illustrative system including a programmable wall module in communication with a building automation system.

The following description should be read with reference to the drawings wherein like reference numerals indicate like elements throughout the several views. The description and drawings show several embodiments which are meant to be illustrative in nature.

FIG. 1 is a schematic diagram of an illustrative system 10 including a programmable wall module 11 in communication with a building automation system (BAS) 12. The BAS 12 may include one or more heating, ventilation and air conditioning (HVAC), lighting, security, fire, or other building systems components configured to monitor and/or control one or more physical properties of the building, such as temperature, humidity, ventilation, building access, lighting, fire detection and/or fire suppression, etc. Example HVAC building components may include, for example, dampers, valves, sensors, AC units, heating units (i.e. boilers, furnaces, etc.), and ventilators. Example security building components may include, but are not limited to, detectors (i.e. motion, fire, smoke, glass, etc.), alarms, cameras, and security lights. Example lighting building components may include, but are not limited to, timers, occupancy sensors, and light fixtures. Example fire building components may include, but are not limited to, detectors (i.e. smoke, heat, air quality, etc.), alarms, and sprinklers. While the BAS 12 may include multiple systems, for simplicity, the following description will be described with reference to HVAC systems and HVAC system components. However, it is to be understood that the following features may be used in combination with the lighting systems, security systems, fire systems, or other building systems, as desired.

In the illustrative embodiment, the BAS 12 may also include a controller 17 configured to, for example, control a particular piece or group of equipment, control a function, and/or control a region of the building. Controller 17 may be, for example, a specific purpose-built computer with input and output capabilities. Such controllers may come in a range of sizes and capabilities to control devices commonly found in buildings, and/or to control sub-networks of controllers. The controller inputs may receive input signals (e.g. temperatures, humidity, pressure, current flow, air flow, etc.) and the controller outputs may provide control signals or commands to other devices or to other parts of the system. The controller inputs and outputs may be either digital or analog signals, or a combination thereof.

In one illustrative embodiment, the controller 17 may be a HVAC controller configured to control the comfort level of the building or structure by activating and deactivating one or more HVAC components. Example HVAC functions that may be controlled by HVAC controller may include, for example, HVAC schedules, temperature setpoints, humidity setpoints, trend logs, timers, environment sensing, and/or other HVAC functions, as desired. In some cases, HVAC controller may be a thermostat, such as a wall mounted thermostat, but this is not required in all embodiments. In other cases, the HVAC controller may be a zone controller configured to control a certain portion of the building. In yet other cases, the HVAC controller 17 may receive instructions (e.g. call for heat) from a wall module 11, and then control the HVAC equipment (e.g. furnace) accordingly. Other suitable HVAC controllers may also be employed, as desired.

In some cases, programmable wall module 11 may serve as a user or installer interface to the HVAC system (or other systems) of the BAS 12. Users may include, for example, building owners, building tenants, equipment installers and/or technicians. The wall module 11 may have the ability to be customized so that selected or customized controller parameters may be accessed and/or displayed at the wall module 11. In other words, the wall module may be configured to access any number of variables or parameters of the controller 17 and the user/installer may be able to view and/or change these variables at the wall module 11. To do so, the wall module 11 can be in communication (wired or wirelessly) with the controller 17 to send and/or receive signals that corresponding to the parameters (e.g. schedule, set points, etc.). Specific customers and applications may be configured to provide different information and/or permissions according to the information that a user may prefer to see in the display (or home screen) of wall module 11. In other words, the wall module 11 may be configurable to let the user or installer choose the information presented on the display and whether that information is viewable only or also modifiable. For example, the wall module 11 may be configured to display schedules, set points, temperatures (e.g. indoor, outdoor), humidity (e.g. indoor, outdoor), $CO_2$ levels, occupancy, fan status, and/or other parameters of HVAC controller 17.

In the illustrative embodiment, wall module 11 may be a programmable wall module 11 and may be wall mountable, but these are not required in all embodiments. Further, while one wall module 11 is shown, it is contemplated that any number of wall modules 11 may be provided, such as two or more, three or more, four or more, five or more, six or more, seven or more, eight or more, or other number of wall modules, as desired.

The wall module 11 may include a user interface 14, a processor 15, and one or more sensors 16. In some cases, the one or more sensors 16 may include a temperature sensor, an occupancy sensor, a humidity sensor, a ventilation sensor, an air quality sensor, and/or any other suitable HVAC building control system sensor, as desired. The temperature sensor may be provided to sense the temperature proximate the wall module 11. The humidity sensor may be provided to sense the humidity proximate the wall module 11. The ventilation sensor may be provided to sense a property related to the ventilation proximate the wall module 11. As illustrated, the one or more sensors 16 may be included with the wall module 11, such as within a housing (not shown). However, it is contemplated that one or more sensors 16 may not be included in the wall module 11, as desired.

Processor 15 of the wall module 11 may be configured to display and/or configure the one or more parameters or settings of the controller 17 via one or more screen. Example parameters or setting may include HVAC controller schedules, temperature setpoints, humidity setpoints, trend logs, timers, environment sensing, HVAC controller programs, user preferences, and/or other HVAC controller settings, as desired. In some cases, the wall module 11 may also include a memory (not shown) operatively coupled to the processor 15 to store the one or more parameter screens uploaded via the output port 9 of the configuration tool 13 or any other desired information, such as the aforementioned HVAC schedules, temperature setpoints, humidity setpoints, trend logs, timers, environmental settings, and any other settings and/or information as desired.

It is contemplated that the output port 9 may communicate with the wall module 11 and/or the controller 17 via a wired and/or wireless connection, as shown by dashed lines. In some cases, the output port 9 may accommodate a portable memory (such as a flash memory), which may be inserted into the output port 9, and the one or more screens may be uploaded from the configuration tool 13 to the portable memory. The portable memory may then be removed from the output port 9 of the configuration tool 13 and inserted into a port of the wall module 11 or the controller 17, and the one or more screens may be uploaded from the portable memory to the wall module 11 or the controller 17, as appropriate.

Wall module 11 may store information within memory and may subsequently retrieve the stored information. Memory may include any suitable type of memory, such as, for example, random-access memory (RAM), read-only member (ROM), electrically erasable programmable read-only memory (EEPROM), Flash memory, or any other suitable memory, as desired.

User interface 14 may be any suitable interface that is configured to display and/or solicit information as well as permit a user to enter data, make selections and/or make other settings, as desired. In some cases, user interface 14 of the wall module 11 may allow a user or technician to program and/or modify one or more parameters, such as programming, schedules, set point, time, equipment status and/or parameters, as desired. In some instances, the user interface 14 may include a display and one or more buttons, such as, for example, a fixed segment display and one or more soft keys. However, other suitable user interfaces may be used, such as, a touch screen display, a liquid crystal display (LCD) panel and keypad, a dot matrix display, a light-emitting diode (LED) display, a computer, buttons and/or any other suitable interface, as desired.

When a fixed segment display and one or more soft keys are used, the fixed segment display may include one or more labels associated with the one or more soft keys for indicating what appears on the screen if the one or more soft keys are pressed or how the one or more keys adjust one or more parameters. Although not shown, there may also be one or more dedicated up and down keys for adjusting a selected parameter or setting, depending on how the wall module 11 is programmed.

In the illustrative embodiment, a configuration tool 13 may be provided in communication with the wall module 11 and/or controller 17. The configuration tool 13 may include a controller 5, a user interface 7 that is controlled by the controller 5, and an output port 9 that is controlled by the controller 5. The configuration tool 13 may be used to, for example, setup, program, and/or configure the programmable wall module 11. For example, the configuration tool 13 may be configured to define the parameters or other information that is to be displayed in one or more screens on the wall module 11, the format of how the parameters or other information is to be displayed in the screens of the wall module 11, and/or parameter permissions (read only, read and write, hide), etc. In some embodiments, the configuration tool 13 may be implemented in a general purpose computer, a workstation, a PDA, a smart phone, a handheld computer device, or any other suitable computing device, as desired.

In the illustrative embodiment, the wall module 11 may be programmable so that building owners/tenants and/or contractors can access different features, functions, and parameters from the single wall module platform 11. A fixed segment display may be used to keep cost low while providing the flexibility needed to meet user needs. The wall module's fixed segment user interface 14 may be programmed based on settings determined from the configuration tool 13 that a contractor uses when setting up the overall building automation system. After the wall module 11 is configured and installed, a user (e.g., building owner, tenant, contractor, etc.) may access building automation system parameters and thus do not require a separate software tool to control and/or monitor critical aspects of the system. The present wall module platform may have provisions for configuring the wall module 11 based on user needs or desires. The contractor may, for example, determine the amount of access and configurability permitted to the users, which may include all that are available to the contractor but often less.

In some embodiments, the user may choose from a number of different home screen options within a single wall module 11 via the fixed segment display of user interface 14. In one example, a user may choose to show one, two, or three parameters. Each parameter may be labeled to indicate its purpose (e.g., room temperature, humidity, setpoint, and so forth). In some instances, changes may be made to the home screen by accessing a menu from the keypad, or it can be adjusted remotely with the configuration tool 13. Changes may be made if new occupants move into a space, or if the HVAC equipment changes.

In some embodiments, the configuration tool 13 may configure the wall module 11 for each or at least some information coming into and going out of the wall module 11. The contractor may, for example, select the engineering unit (DegF/DegC) of a temperature sensor of the one or more sensors 16. The wall module 11 may also need to know how to convert A/D (Analog to Digital) counts into a specific meaningful value to display on the user interface 14. In some embodiments, the wall module 11 may be configured to have an engineering unit for each piece of incoming data. The contractor, via the configuration tool 13, may select the engineering unit(s) to be shown for each piece of data on the user interface 14 (L/S, CFM, INCHES, CM, %, PPM, KW, H, none). This item could be made generic as to what segments (temperature, setpoint, outside, and so forth) should be shown with the various pieces of data. In some cases, the wall module 11 may have no real knowledge of the units of a piece of data, but may merely illuminate that appropriate segments of the fixed segment display.

In some cases, the home screen choice may also be configurable. For example, with the configuration tool 13, the contractor may select home screen choice 1 through x, but in some cases, this may also be changed by the contractor at the wall module. The contractor, via the configuration tool 13, may select what is to be shown on the home screen. For example, there may be a system status option. When the contractor, via the configuration tool 13, selects this option, an input point may be added to a wall module function block. The contractor logically connects this to the controller logic, which may compute the current system status (off, cool, heat, reheat). The use of function blocks is described in, for example, U.S. patent application Ser. No. 11/670,911, filed Feb. 2, 2007, and entitled "System Level Function Block Engine", and U.S. patent application Ser. No. 12/256,444, filed Oct. 22, 2008, and entitled "Flexible Graphical Extension Engine", which are incorporated herein by reference. The contractor may assign the value (number) via the configuration tool 13 associated with each symbol. For example, Off=No segments=0, Flake=Cool=2, Flame=Heat=9, Flake+Flame=Reheat=7.

There may also be a system mode setpoint option. When the contractor, via the configuration tool 13, selects this option, an output point may be added to a wall module function block. The contractor may logically connect this to controller logic, which computes the system status. If selected, the system mode may be shown on the Home screen. One of the segments, OFF, AUTO, COOL, HEAT, or EMERGENCY+HEAT, may be shown. The contractor can select the value of this setpoint. This may be done at the configuration tool 13, and in some cases, can be changed by the tenant at the wall module 11. If selected, a soft key segment "System" may be shown. This may allow the tenant to change the system mode setpoint, if desired.

Figure 8:
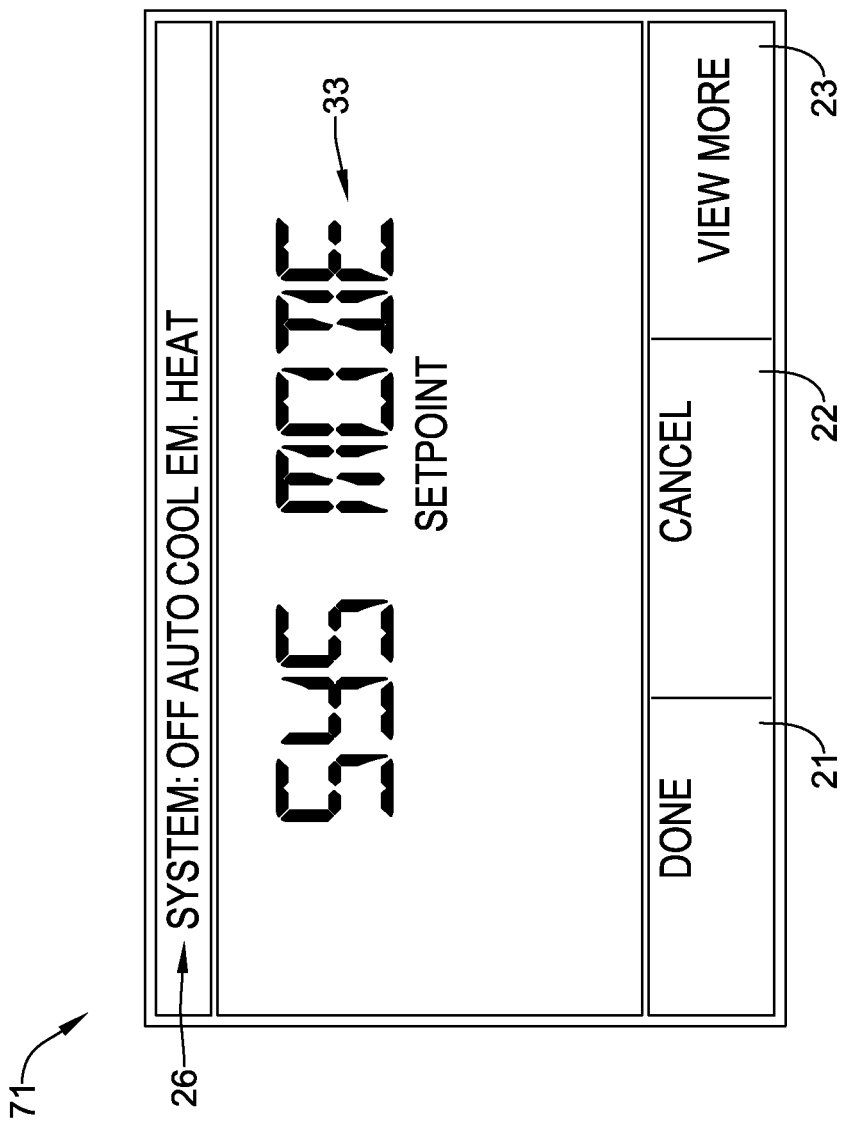

In some cases, when a tenant presses a "System & View More" key on the wall module 11, the system mode screen may be displayed (see screen 71 in FIG. 8). All of the configured segments in the system mode may be displayed (OFF, AUTO, COOL, EMERGENCY, HEAT). The current system mode setpoint segment may blink. Pressing the up/down key may rotate which segment blinks. Pressing "Done" may save the selection. Pressing Cancel may discard the selection. Pressing "View More" may save the selection and go onto the first View More screen. The contractor, via the configuration tool 13, may assign the value (number) associated with each symbol. For example, OFF=0, AUTO=1, COOL=2, HEAT=3, EMERGENCYHEAT=4. The contractor, via the configuration tool 13, may select which symbols should be shown. That is, for example, some systems may not have EMERGENCYHEAT, thus one does not need that symbol as a choice. The wall module could, for example, give choices like: 1) Heat only (OFF and HEAT); 2) Cool only (OFF and COOL); 3) Heat and Cool (OFF, AUTO, HEAT, COOL); and 4) Heat pump (OFF, AUTO, HEAT, COOL, EMERGENCYHEAT). There may be other choices.

There may be a fan setpoint option. When the contractor, via the configuration tool 13, selects this option, an output point may be added to a wall module function block. The contractor may logically connect this to controller logic, which computes the fan status. The contractor may configure, for example, a 2, 3 or 5 position fan. The contractor may assign the value (number) via the configuration tool 13 that is to be associated with each symbol. For example OFF=0, ON=1, Speed 1=1, Speed 2=3, Speed 3=3, and AUTO=4. The contractor may select the value of the fan setpoint. This may be done at the configuration tool 13, and in some cases, can be changed by the tenant at the wall module 11.

There may be an Effective Occupancy status option. When the contractor, via the configuration tool 13, selects this option, an input point may be added to a wall module function block. The contractor may logically connect this to controller logic, which computes the effective occupancy status (occupied, unoccupied, standby). The contractor, via the configuration tool 13, may configure if the home screen reports effective occupancy, or if the home screen shows commanded override if override is in effect. If no override is in effect, then effective occupancy may be shown. The contractor may assign the value (number), via the configuration tool 13, that is associated with each symbol. For example, Occupied=0, Unoccupied=1, Standby=3.

There may be an Occupancy Override option. When the contractor, via the configuration tool 13, selects this option, an output point may be added to a wall module function block. The contractor may logically connect this to controller logic, which computes the effective override. The values may be, for example, Null=wall module is not commanding override, BYP=wall module is commanding timed occupied override, OCC=wall module is commanding occupied, UNOCC=wall module is commanding unoccupied, and STDBY=wall module is commanding standby. The contractor may assign the value (number), via the configuration tool 13, that is associated with each symbol. For example, Null=255 (−1), Occupied=0, Unoccupied=1, Bypass=2, and Standby=3. It may be necessary for the configuration tool 13 to assign a value to the override, for example, Null. On the other hand, the wall module 11 may be able to always initialize the value on power up to Null, if desired.

If a home screen is chosen with time displayed, then the contractor, via the configuration tool 13, may configure the 12/24 hour format. The configuration tool 13 may add an input and output point to a wall module function block to display time and set time. The configuration tool 13 may add the appropriate parameter for the user to set the time. The contractor could create a series of various parameter screens that may have time information such as year, month, day, hour, and minute on them.

Another configuration option may include "View More" choices. The contractor, via the configuration tool 13 or in a contractor mode at the wall module 11, may choose which parameters will be displayed as "View More" items for the Tenant. The contractor, via the configuration tool 13, may configure which parameter setpoints should be editable by the tenant in "View More". Note that setpoints may be editable in a Contractor mode.

In some cases, a configuration item may include parameter categories. For example, the contractor, via the configuration tool 13, may select the number of parameter categories. The contractor, via the configuration tool 13, may select the name of each parameter category. This may be up to 8 characters long in some instances. The contractor, via the configuration tool 13, may then select which parameters are in each category.

A further configuration option may include a parameter value. The contractor, via the configuration tool 13, may select a parameter to be displayed. The parameter may come from a function block—in which case, the wall module cannot necessarily change it. Or the value may come from the wall module 11, in which case there may be a value for the wall module 11 to send to the controller 17.

There may be several types of parameter values which include: 1) inputs which include occupancy status, system status, outside ambient (OA) temp, current time, schedules, and so forth; 2) sensors (outputs) which include room temp, humidity, CO2, (and on non LCD/Keypad models, a setpoint knob, and perhaps an override key); 3) setpoints (outputs) which include a fan setpoint, a system mode setpoint, a humidity setpoint, a room temperature setpoint, a CO2 setpoint, a time (this one is unusual, as it is both an input and output); these setpoints may have values assigned by the user through the configuration tool 13, and the tenant and/or contractor may be able to change them at the wall module, and the configuration tool 13 may upload the current setpoint values from the wall module to update its database; 4) calibration parameters which include temperature offset, humidity offset, and CO2 offset; 5) configuration that the wall module changes which include home screen choice and "View More" choices (e.g. a subset of all the parameters that the contractor can view and/or edit to control what the tenant may be able to view and/or edit, this subset could be all of the parameters, none of the parameters, or any number of parameters); and 6) configuration that the wall module does not change which may include parameter categories, home screen choices, parameter names, high low, increment amount, segments, and/or other parameter values.

The contractor, via the configuration tool 13, may select what segments should be shown for the parameter value. The configuration may allow for any or all of the miscellaneous segments to be shown (all but the alpha numeric). In some cases, the contractor, via the configuration tool 13, may select the high and low limits for an editable value. This may include the set point on the home screen. The contractor, via the configuration tool 13, may select the increment/decrement value of each editable value. The increment/decrement value may also be referred to as "one unit". For example, one unit=1, 10, 100, 0.7, 0.1, 0.5, 0.03, 0.01. This may include the set point on the home screen. The contractor, via the configuration tool 13, may select where the decimal point is XXXX, XXX.y or XX.yy.

In the illustrative embodiment, the configuration tool 13 can be configured to create screens for each parameter displayed on the wall module 11. The configuration tool 13 may be configured to automatically create and/or configured at least some of the screens, such as the screens relating to scheduling, which are to be displayed by the wall module 11. In some cases, the automatically created screens may be created based on one or more user inputs received at the user interface 7 of the configuration tool 13. For example, the configuration tool 13 may be configured to pose one or more questions to a user, which the responses may be used to automatically create the various screens. In some instances, the number of questions posed by the configuration tool 13 may be less than the number of screens created. More generally, the number of user inputs may be less than the number of screens that are created. For example, the number of user inputs may be 15 or less, 12 or less, 10 or less, 9 or less, 8 or less, 7 or less, 6 or less, 5 or less, 4 or less, 3 or less, 2 or less, or any other number of user inputs that is less than the number of screens that are created.

In many embodiments, viewing and/or modifying schedules using the user interface 14 of the wall module 11 involves a series of screens each displaying the schedule for each day. On a wall module, with limited display capability, this is usually done on a day by day basis and an event by event basis within each day. In some instances, there may be seven days per week plus any holiday days and between two and eight events per day, however, fewer or more events may be used. A holiday day means if today has been configured to be a holiday, then use the events in the holiday day instead of the events normally used for today. The event may be a time and a state in which the controller 17 is programmed to operate. In one example, viewing and/or modifying eight days of the week with four events each day would require the user to configure 32 screens. Each screen would have a label for what it is (For example "Monday Event 1") and the corresponding time and state for viewing and/or modifying. Creating 32 screens with individual labels, linking them to the correct event(s), and setting who can access and edit each screen could be time consuming, tedious and error prone.

The illustrative configuration tool 13 may be configured to create the 32 screens, or some other number of screens, without having to create each screen separately. In some cases, the configuration tool 13 may present a series of questions or options to the user/installer that, when completed, the configuration tool 13 can automatically configure all the necessary screens for the schedule to be displayed on the wall module 11, and upload those created screens to the wall module 11 via the output port 9 for display via the user interface 14 of the wall module 11. In one example, the configuration tool 13 may ask a user "Do you want to view/modify scheduling at the wall module?" or similar question. If yes, the configuration tool 13 may ask the user "How do you want the schedules displayed?" or a similar question. In some cases, the configuration tool 13 may display a number of choices including, for example, 1) a 8 schedule (i.e. the 7 days of the week plus holiday), 2) a 5-2 schedule (i.e. Monday through Friday as "1 day", Saturday and Sunday as "1 day", where all events for the "1 day" are programmed the same), 3) a 5-2-1 schedule (i.e. Monday through Friday as "1 day", Saturday and Sunday as "1 day", and holiday), 4) a 5-1-1 schedule (i.e. Monday through Friday as "1 day", Saturday as "1 day", and Sunday as 1 day), 5) a 5-1-1-1 schedule (i.e. Monday through Friday as "1 day", Saturday as "1 day", Sunday as "1 day", and holiday as "1 day"), 6) a 5-2-8 schedule (i.e. Monday through Friday as "1 day", Saturday and Sunday as "1 day", then display the 7 days a week and holiday as individual days—this allows the user to set Monday-Friday to the same schedule and then go in and set an individual day differently), 7) a 8-5-2 schedule (i.e. the 7 days of the week plus holiday as individual day, then Monday-Friday as "1 day", and then Saturday-Sunday as "1 day"), and/or 8) a 8-5-1-1 schedule (i.e. the 7 days of the week plus holiday as individual days, then Monday-Friday as "1 day", then Saturday, and then Sunday). It is contemplated that other display choices may be used, such as, for example, making Monday-Wednesday-Friday as "1 day", Tuesday-Thursday as "1 day", or other combination of days.

In some embodiments, the configuration tool 13 may be configured to automatically configure the language used for the wall module 11 or, the language used for at least some of the screens of the wall module 11 (e.g. schedule screens). For example, the configuration tool 13 may ask a user what language should be used to create the screens and, based on the answer, the configuration tool 13 may create the scheduling screens, or other screens, in the desired language (e.g. English, French, German, Spanish, . . . etc.). In some cases, the configuration tool 13 may automatically determine the language to be displayed from the language used in the configuration tool 13.

In some embodiments, the configuration tool 13 may be configured to define the schedule as being viewable only or modifiable and viewable from the wall module 11. In some cases, the configuration tool 13 may configure the wall module 11 to have multiple user access levels and provide separate view/modify settings for each access level. For example, when three user access levels are provided, a user with a lowest access level may not be able to view or modify the schedules, a user with an intermediate access level 2 may be able to view but not modify the schedules, and a user with a highest access level may be able to view and modify the schedules. In another example, when two user access levels are provided, a user with a lowest access level may be able to view only or may not be able to view or modify the schedules, and a user with a highest access level may be able to view and modify the schedules. However, these are just two examples and it is contemplated that other user access levels or viewable/modifiable settings may be provided.

In some embodiments, the configuration tool 13 may include an "Advanced" button to allow the user to customize the screens created by the configuration tool 13. In some cases, the "Advanced" button may access other settings, as desired.

Another configuration item may include temperature, humidity and $CO_2$ sensor offsets. The configuration tool 13 may create parameters and a special category for these items. The contractor, via the configuration tool 13 and in contractor mode, may select the value of each offset. These could be in a separate area (file/table) in the wall module 11, so that the configuration tool 13 can calibrate the device without reading or writing the other setpoints or configuration.

Still another configuration item may include schedule override. The contractor, via the configuration tool 13, may select what override options should be included. These options may include occupied override, unoccupied override and standby override. Occupied override may be timed in hours, days or continuous. There may be network bypass time support. If "timed" is chosen, the configuration tool 13 may select either standard or delayed override. Standard timed occupied override may start the timer immediately. Delayed occupied override may start the timer when the occupancy status changes from any state to unoccupied. The timer may remain as it was set until this transition. Note that continuous may be a special case of "timed" in that the timer never expires. The configured timer value may be a special value that indicates continuous. Unoccupied override can be timed in hours, days or continuous. Standby override can be timed in hours, days or continuous.

The functional design (display, function segmentation, button layout) may work to improve ease of use and access to building automation system parameters. The programmable wall module 11 may contain three or another number of soft key buttons located below or on the display with labels that configure, based on how the wall module 11 is programmed by the configuration tool 13. The wall module 11 may also contain an up/down button located below proximate to the soft keys to make selections and change building automation system parameter values. Some selectable characteristics may include a configurable home screen with local wall module selection from amongst a defined set of options (numerous values can be shown with fixed segment labels), custom home screen programming to show any number of building automation system parameters, a user-defined eight character alpha-numeric parameter description with optional fixed segment labels, configurable fan control, configurable occupancy selection, configurable system control, pre-defined wall module configurations for common applications, a multi-level menu and navigation for viewing user defined categories and parameters, customizable views/permissions for building owners/tenants, and a security-controlled contractor mode for access to more advanced building automation system parameters.

The illustrative wall module 11 may be programmable so that contractors can access different parameters grouped into user-defined categories. The parameters that are assigned to each category, and associated category and parameter labels, may be defined in the configuration tool 13. The contractor may access the parameters from the programmable wall module 11 via a parameter menu. The parameter menu may allow the contractor to first identify the category of parameters to access, and then go to the individual parameters. This approach may help minimize the probability that contractors and/or installers will select the wrong parameter, improve understanding of related parameters, and allow contractors to quickly find the building automation system information they want.

As can be seen, and in an illustrative embodiment, the controller 5 of the configuration tool 13 may be configured to create a number of screens for the user interface 14 of the programmable wall module 11 based on a number of user inputs received via the user interface 7 of the configuration tool 13. In some cases, the number of user inputs received via the user interface 7 of the configuration tool 13 may be less than, and sometimes far less than, the number of screens that are created by the controller 5 of the configuration tool 13. Regardless, with the number of screens created, the controller 5 may output the number of screens to the output port 9 of the configuration tool 13 so that the number of screens can be uploaded to the programmable wall module 11 for display on the user interface 14 of the programmable wall module 11.

In some cases, at least some of the number of screens that are created by the controller 5 may show scheduling information, and sometimes may include a first menu level for showing days, and a second menu level for editing a selected day (see, for example, FIGS. 11-36). In some cases, a number of user inputs received via the user interface 7 of the configuration tool 13 may include a first input for selecting whether a schedule is to be displayed to a user of the programmable wall module 11, and/or a second input for selecting a one of two or more formats for the number of screens. In some cases, a third input for determining whether the scheduling information is modifiable by a user of the programmable wall module or viewable only may be accepted via the user interface 7 of the configuration tool 13. In some cases, the screens created by the controller 5 of the configuration tool 13 are all configured in a language that is selected by a user of the configuration tool 13, or assume the language used in the user interface 7 of the configuration tool 13. In some cases, the number of user inputs received by the user interface 7 of the configuration tool 13 is five or less before the controller creates the number of screens for the user interface 14 of the programmable wall module 11.

An illustrative method may include, for example, communicatively connecting a configuration tool to a programmable wall module of an HVAC system, displaying selectable configuration information to a user on a user interface of the configuration tool, allowing a user to make configuration information selections via the user interface of the configuration tool; creating a plurality of screens for the programmable wall module with the configuration tool based on the configuration information selections made by the user of the configuration tool, and uploading the plurality of screens to the programmable wall module from the configuration tool.

It is contemplated that the selectable scheduling configuration information may include one or more of the following: should the wall module 11 have access to the controller's schedules, whether a schedule will be viewable by a user of the programmable wall module, whether a schedule is editable by a user of the programmable wall module, a type of schedule to be displayed on the programmable wall module, and a step change size for a schedule if the schedule is editable by a user of the programmable wall module. Also, the plurality of scheduling screens may be created with the configuration tool 13 using one or more predefined labels.

Figure 2:
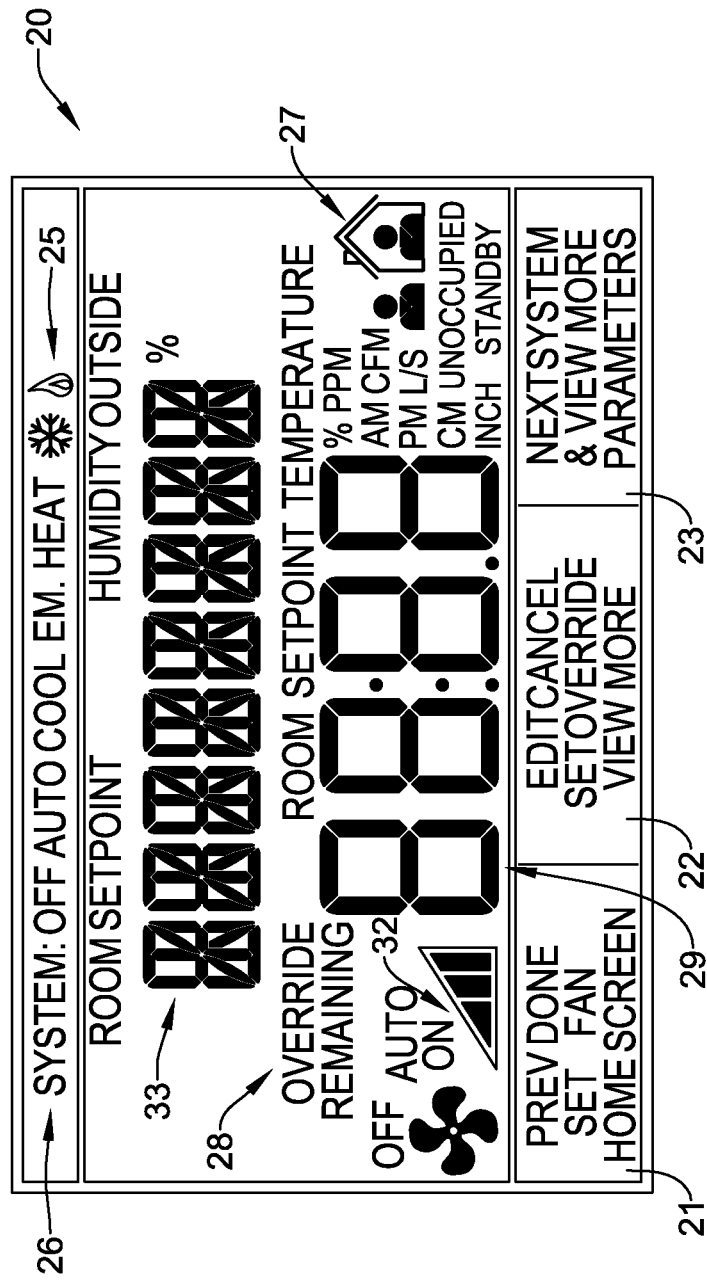
FIG. 2 is a schematic diagram of an illustrative display that may be used in the programmable wall module of FIG. 1.

FIG. 2 is a schematic diagram of an illustrative example display 20 that may be used in the wall module 11. In FIG. 2, all segments of the display 20 are shown. In some cases, a segment approach may be less complex and less expensive than other approaches, such as the dot matrix. However, dot matrix or other displays may be used, as desired. Also, and in some cases, the display may be a touch screen display.

In the illustrative embodiment of FIG. 2, the display 20 includes three areas 21, 22, and 23 corresponding to soft keys or buttons of the wall module 11. In the illustrative embodiment, soft key area 21 may display "PREV", "DONE", "SET", "FAN", or "HOME SCREEN". Soft key area 22 may display "EDIT", "CANCEL", SET", "OVERRIDE", or "VIEW MORE". Soft key area 23 may display "NEXT", "SYSTEM & VIEW MORE", or "PARAMETERS".

Display 20 may include a system area including two parts, a status area 25 and a system mode area 26 that may be displayed when so configured. The system mode 26 may include "OFF", "AUTO", "COOL", "HEAT", and/or "EM." OFF may be displayed if the HVAC system is commanded off. AUTO may be displayed when the HVAC system is commanded to auto mode. COOL may be displayed when the HVAC system is commanded to cooling mode. HEAT may be displayed when the HVAC system is commanded to heating mode. "EM. HEAT" may be displayed when the HVAC system is commanded to an emergency heat mode. The system status area 25 may include an icon, such as a flake and a flame, corresponding to a selected mode of the HVAC system. Flake may be displayed if in the HVAC system is in a COOL or REHEAT mode. Flame may be displayed if the HVAC system is in HEAT, or REHEAT mode. When the system is OFF, no symbols may be displayed.

Display 20 may also include an occupancy status area 27. If status area 27 shows an effective occupancy, then the "Occupied" symbol may be displayed if in occupied mode, the Unoccupied symbol may be displayed if in unoccupied mode, and the Standby symbol may be displayed if in standby. If the tenant is commanding an override, then the Occupied, Unoccupied or Standby symbol may be shown to indicate the command, the Override symbol 28 may be shown on screen to indicate the tenant is requesting override.

Display may include a fan setpoint area 32. The fan symbol may be displayed if area 32 is configured by the contractor. The fan symbol does not necessarily stand alone. It may be present with at least one of the other symbols. Another symbol OFF may be displayed if the tenant or Tool commanded OFF. AUTO may be displayed if the tenant or configuration tool 13 commanded AUTO. ON may be displayed if the tenant or configuration tool 13 commanded ON (2 or 3 position). BAR1 may be displayed if the tenant or Tool commanded speed 1 from the wall module (5-position only). "BAR1+BAR2" may be displayed if the tenant or configuration tool 13 commanded speed 2 from the wall module (5-position only). A BAR1+BAR2+BAR3 may be displayed if the tenant or configuration tool 13 commanded speed 3 from the wall module (5-position only).

Display 20 may also include a middle alpha numeric area 29 and a top alpha numeric area 33. As shown, a left portion of area 33 may contain a value with the Room or Setpoint symbol optionally displayed. A right portion of area 33 may contain a value with the Outside, Humidity %, or both symbols optionally displayed. The middle alpha numeric area 29 may optionally display a value. The Setpoint, Temperature and/or Room symbols may be optionally displayed in area 29. Area 29 may also optionally display a unit symbol and/or a decimal point. In some cases, the middle alpha numeric area 29 may be limited to integer numbers only, such as positive numbers may be up to 4 digits. Negative numbers may be up to 3 digits with the middle segment of the left character serving as the minus sign. Top alpha numeric area 33 may be designed to display a label of up to 8 characters and a number on the left side or a number on the right side or numbers on both sides. The present approach does not necessarily require a mixture of labels and numbers, labels on the home screen, or more or less than two numbers.

Area 29 may optionally display the current time including a colon. Time may be displayed as configured by the Tool in 12/24 hour format. The AM/PM symbols may be shown as appropriate. Areas 33, 29 and 28 may optionally display the Time Remaining and Override symbols if an override is commanded. The middle alpha numeric area 29 may be limited on the display of positive numbers X, XX, XXX, XXXX, X.yy, XX.yy, X.y, XX.y, and XXX.y. Middle alpha numeric area 29 may be limited on display of negative numbers: −X, −XX, −XXX, −X.yy, −X.y, −XX.y. Middle alpha numeric area 29 may be limited on the letters that can be displayed. If the middle value is between −99 and +99 and it is configured with zero decimal places, then the number may be centered. The minus sign, if present, may be to the left. If the value fails to meet these qualifications, it may be right justified. Examples of centering may include blank 9 9 blank, −9 9 blank, blank −9 blank and blank blank 9 blank. Examples of right justification may include blank 1 0 0, blank −1.3 and blank 2.34.

FIG. 3 is a table 38 showing the various portions of the segmented display shown in FIG. 2 indicating the area name, number of segments, and the segments. Fonts may be designed with nearly any number of segments. A smaller number may result in a lower cost display and/or wall module 11, but not always.

Figure 4:
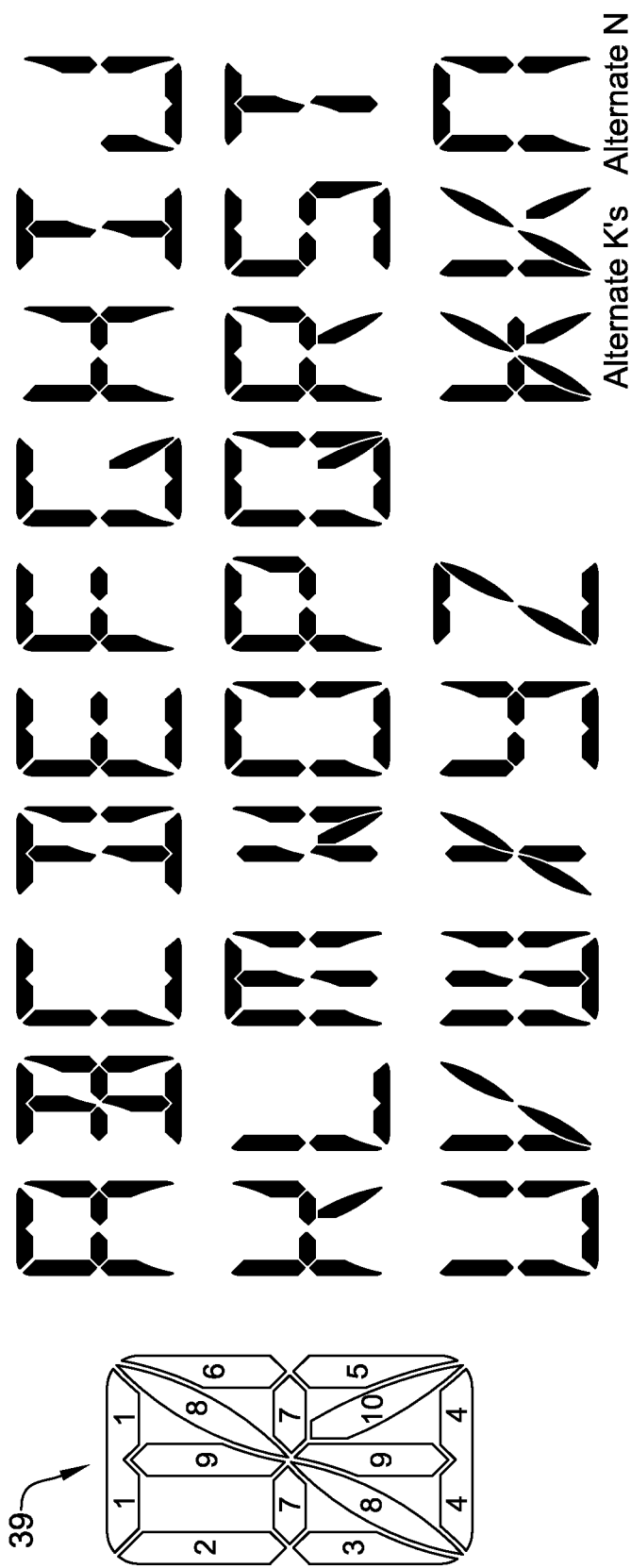
FIG. 4 is a schematic diagram of an example ten segment digit and letters it may form by activating selected segments of the digit.

FIG. 4 is a schematic diagram of an example ten segment digit 39 and letters it may form by activating selected segments of the digit 39. The illustrative letters that may be formed are A, B, C, D, E, F, G, H, I, J, K, L, M, N, O, P, Q, R, S, T, U, V, W, X, Y, Z, with alternate K and N. However, it is contemplated that other forms of letters may also be used. Moreover, while ten segments are shown, it is contemplated that digit 39 may include a varying number of segments depending on the needs of a display. For example, some displays may suffice with a smaller number of segments for each or some of the digits 39. For instance, a seven segment font may display A, b, C, c, d, E, F, G, H, I, i, J, L, n, O, o, P, r, S, t, U, u, Y, Z, 0, 1, 2, 3, 4, 5, 6, 7, 8, and 9. K, M, Q, V, W, and X may be difficult to display in the seven segment font.

Figure 5:
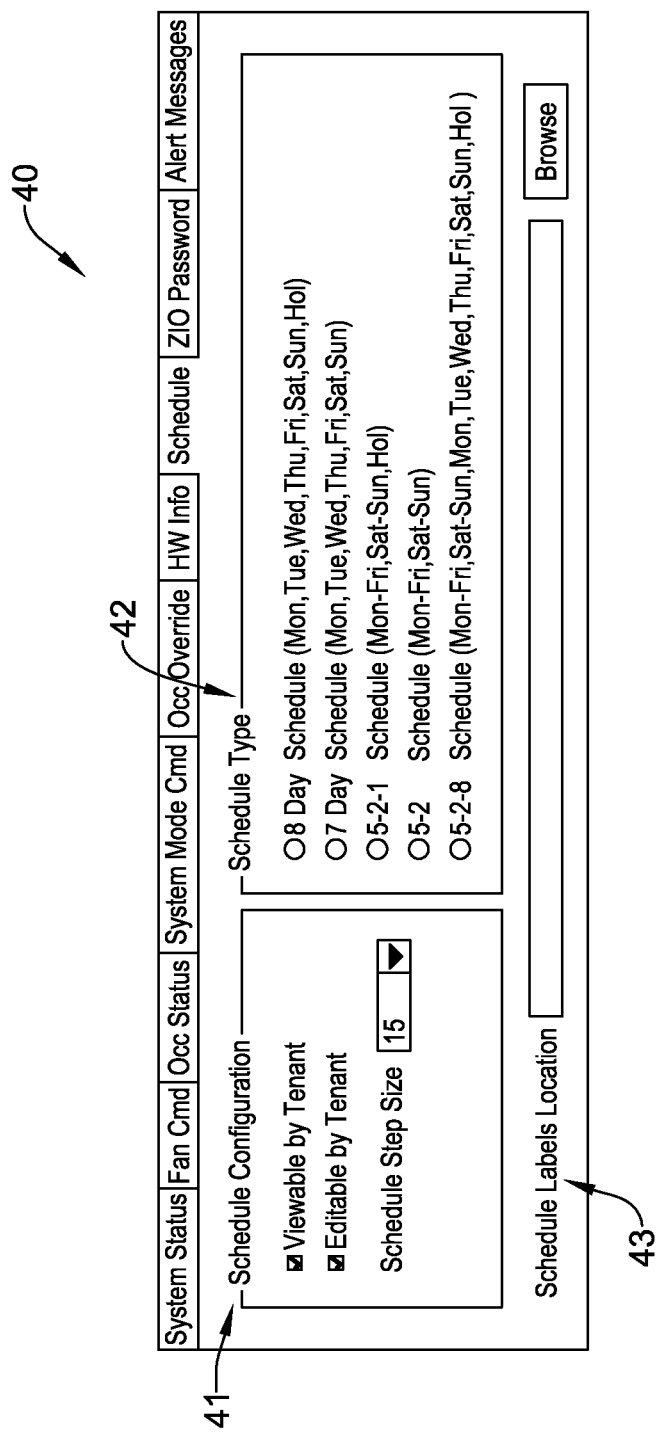
FIG. 5 shows an illustrative display that may be provided on the user interface of the configuration tool for configuring schedule screens to be uploaded to and displayed by the programmable wall module.

FIG. 5 shows an illustrative display 40 that may be provided on the user interface 14 of the configuration tool 13 for configuring schedule screens to be uploaded to and displayed by the wall module 11. In some cases, the illustrative display 40 may be displayed on a PC as part of a software program. This is just one illustrative implementation of the configuration tool 13, and it is contemplated that other displays may be utilized to define the scheduling screens.

As shown in FIG. 5, display 40 may be part of the user interface 7 of the configuration tool 13, and may include a scheduling configuration block 41, a schedule type block 42, and a schedule labels location block 43. The scheduling configuration block 41 may provide boxes that, when checked by a user of the configuration tool 13, set the schedule viewable by the Tenant and editable by the Tenant. The schedule configuration block 41 may also have a schedule step size pull down box that may be used to define the increment/decrement of the schedule event times. In some embodiments, the schedule step size pull down box may be adjustable when the schedule is modifiable by the tenant and, in some cases, may be grayed out when the schedule is not editable by the tenant.

The schedule type block 42 may help define the number of screens that may be uploaded to the wall module 11, such as, for example, screens for an 8 day schedule, a 7 day schedule, a 5-2-1 schedule, a 5-2 schedule, and a 5-2-8 schedule, as shown in FIG. 5. It is contemplated that other schedule types may also be provided, such as, for example, a 5-1-1 schedule, a 5-1-1-1 schedule, a 8-5-2 schedule, a 8-5-1-1 schedule, or other schedules. The schedule label location block 43 may be direct the configuration tool 13 to a predefined or selected file defining the labels and/or other information for the schedule. It is contemplated that the file may be selected by an installer via the configuration tool 13, or other manner of selecting labels or other information may be provided.

Figure 6:
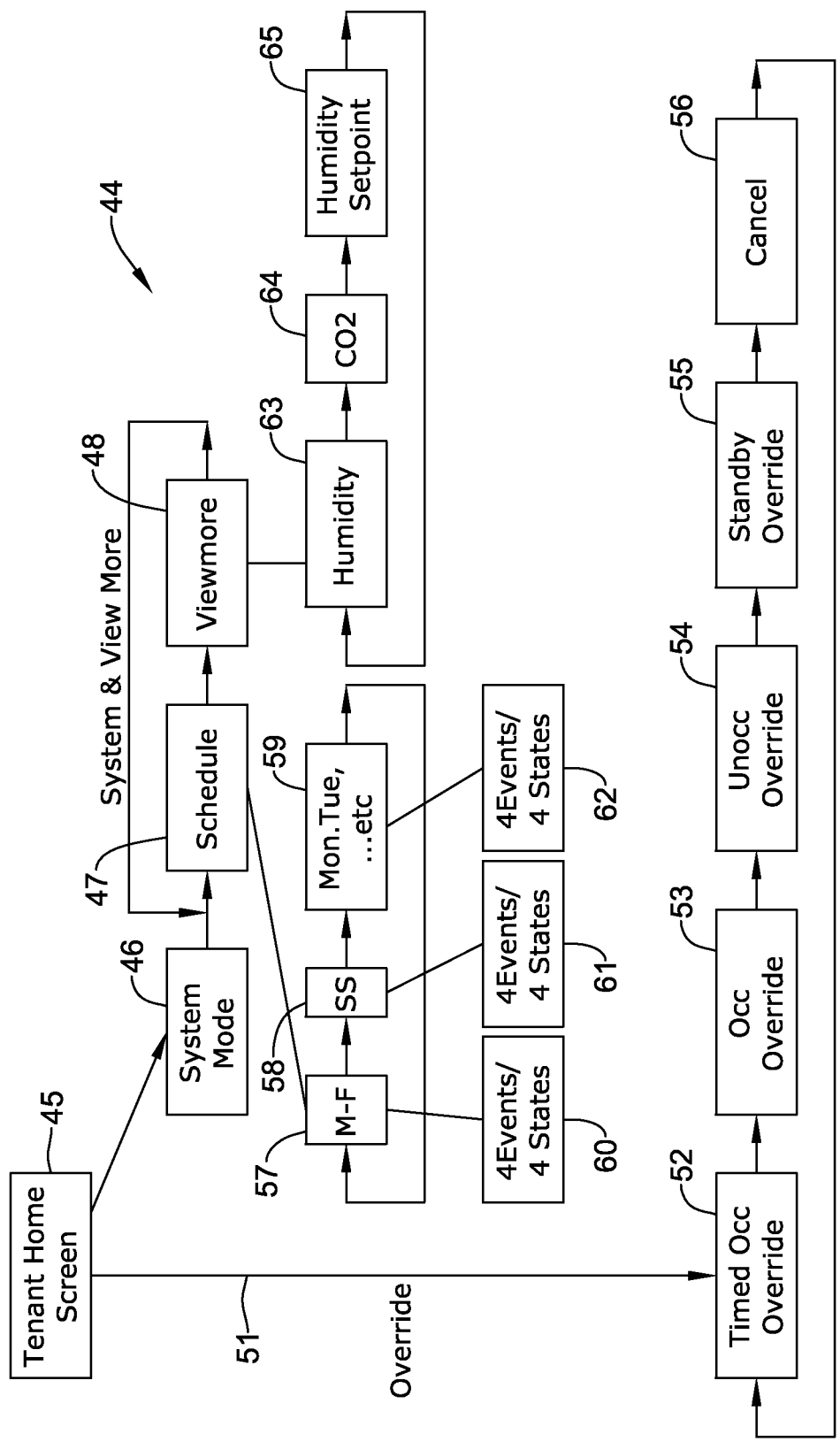
FIG. 6 is a block diagram of an illustrative tenant scenario for the programmable wall module.

FIG. 6 is a block diagram of an illustrative tenant menu scenario 44 for the programmable wall module 11, which can be created by the controller 5 of the configuration tool 13. As shown, the top level of menu scenario 44 is a tenant home screen 45. The tenant home screen 45 may be display by the programmable wall module 11 as a default screen, when no other data entry is underway, and/or when selected by the user. A home screen may, if desired, display one or more parameters relating to environmental conditions such as indoor and/or outdoor temperature and/or humidity, set points, time, equipment status, and/or any other suitable parameter or setting, as desired. In some cases, the home screen may vary depending on the HVAC system that the programmable wall module 11 is operatively engaged to (via the HVAC controller 17).

A tenant may access one or more sub-levels from the home screen 45 via a "system & view more". When accessed, the programmable wall module 11 may initially display a system mode block 46. From the system mode block 46, the tenant may cycle through the schedule block 47 and, if provided, a view more block 48. From the schedule block 47, the tenant may access the programmed screens for the schedule. As shown, the schedule is set up to have a 5-2-8. With such a set up, the tenant may cycle through a Monday-Friday screen 57, a Saturday/Sunday screen 58, screens 59 for each of the days of the week (Monday, Tuesday, Wednesday, Thursday, Friday, Saturday, and Sunday), and a holiday screen. The number, order, and other features of the schedule screens 57, 58, and 59 may be configured by the configuration tool 13. From each of the individual screens, the tenant may go down one level and access the event screens 60, 61, and 62 for each day/days. As shown, there are four events for each day, however, other number of events may be used, if desired. The number of events for each day may be entered in to the configuration tool 13, and the corresponding screens may be automatically generated by the configuration tool 13. Although not shown, the event screens 60, 61, and 62 could be provided as two levels, a firs level to view the events and a second level to edit the events (e.g. time and state), similar to shown in FIG. 44. From the view more block 48, the tenant may access and cycle through a humidity screen 63, CO2 screen 64, and a humidity setpoint screen 65. Again, the availability of the humidity screen 63, CO2 screen 64, and humidity setpoint screen 65 may be set by the configuration tool 13, and the corresponding screens may or may not be provided when the screens for the wall module 11 are generated by the configuration tool 13.

From the tenant home screen 45, the tenant may access a Timed Occ Override block 52 (via an Override path 51) and cycle through an Occ Override block 53, an Unocc Override block 54, a Standby Override block 55, a Cancel block 56 (if provided) and back to the Timed Occ Override block 52. Again, the availability of the Timed Occ Override block 52 (via an Override path 51) and cycle through an Occ Override block 53, an Unocc Override block 54, a Standby Override block 55, a Cancel block 56 (if provided) and back to the Timed Occ Override block 52 may be set by the configuration tool 13, and the corresponding screens may or may not be provided when the screens for the wall module 11 are generated by the configuration tool 13. In some embodiments, the Cancel block 56 may be replaced by designating a soft key as a cancel button.

FIGS. 7-36 are pictorial views showing some illustrative screens that may be displayed on the display of the programmable wall module 11, and which may be created by the controller 5 of the configuration tool 13. In some embodiments, the screens shown in FIG. 7-36 may be manifestations of the some of the screens described in the tenant scenario of FIG. 6, using the segmented display shown in FIG. 2. These screens can be created by the configuration tool 13, depending on the configuration settings entered by the installer into the user interface 7 of the configuration tool 13.

Figure 7:
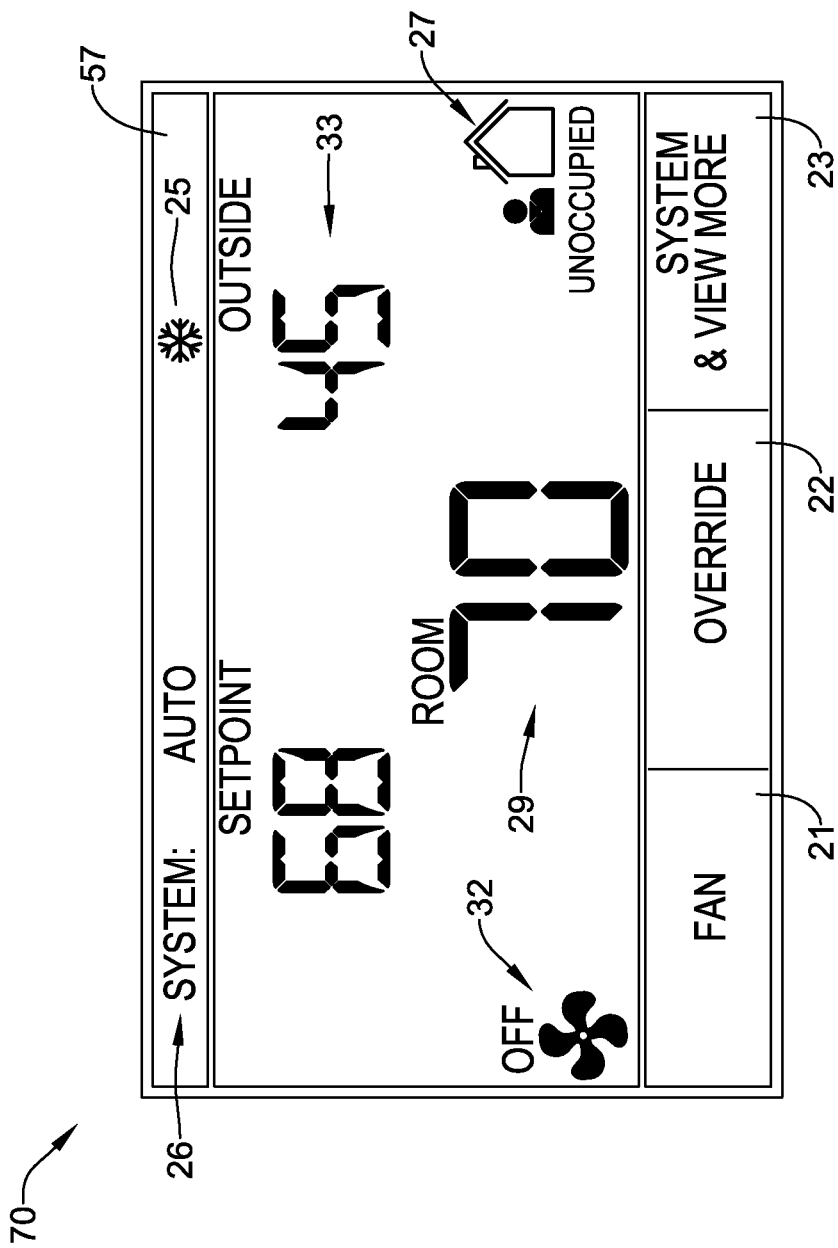
FIGS. 7-36 are pictorial views showing some illustrative screens that may be displayed on the display of the programmable wall module.

FIG. 7 shows an illustrative example home screen 70 for the tenant scenario. The soft key area 21 displays "FAN", soft key area 22 displays "OVERRIDE", and soft key area 23 displays "SYSTEM & VIEW MORE". The system status area 26 shows "SYSTEM: AUTO" indicating that the system is commanded to AUTO mode. The system mode area 25 shows the flake symbol indicating that the HVAC system is in COOL mode.

The home screen 70 may also include the occupancy status area 27, which shows that the building is currently in "Unoccupied" mode. The contractor, via the configuration tool 13, may configure effective occupancy to be always displayed or instead show the commanded override if in override. If status area 27 shows an effective occupancy, then the "Occupied" symbol may be displayed if in occupied mode, the Unoccupied symbol may be displayed if in unoccupied mode, and the Standby symbol may be displayed if in standby.

Home screen 70 may also include fan setpoint area 32 displaying the fan symbol. As shown, the fan symbol may be accompanied by the word "OFF" indicating that the commanded state of the fan is off. Pressing a button corresponding to soft key are 21 may change fan state 32. The fan state may toggle between a 2-position Auto/On, a 3-position Auto/Off/On, or a 5-position Auto/Off/bar1/bar1+2/bar1+2+3. The contractor, via the configuration tool 13, may define fan selection as none, 2-position, 3-position, or 5-position. If none is chosen, then it may be that none of the fan symbols 32 is displayed, the software key 21 Fan state is not shown, and the soft key area 21 is ignored in the Home screen. If a 2, 3 or 5 position fan selection is chosen, then the Blade symbol may be shown with the fan setpoint value. Other fan position configurations may be possible.

AUTO may be displayed if the tenant or configuration tool 13 commanded AUTO. ON may be displayed if the tenant or configuration tool 13 commanded ON (2 or 3 position). BAR1 may be displayed if the tenant or configuration tool 13 commanded speed 1 from the wall module (5-position only). "BAR1+BAR2" may be displayed if the tenant or configuration tool 13 commanded speed 2 from the wall module (5-position only). A BAR1+BAR2+BAR3 may be displayed if the tenant or configuration tool 13 commanded speed 3 from the wall module (5-position only).

Home screen 70 may also display a Setpoint symbol and the set point value in a left portion of numeric area 33. A right portion of numeric area 33 may display an Outside symbol along with the outside temperature. The numeric area 29 may display a value the room temperature and a temperature symbol indicating that the room temperature is displayed. In other instances, the humidity, current time, or other parameters may be displayed on home screen 70, if desired.

In some cases, the setpoint and/or fan may be adjustable on the tenant home screen 70. For example, a home screen "Up" key (not shown) and a home screen "Down" key may increment and decrement the setpoint in area 33 by one unit. On the home screen, the setpoint segment may serve as the identifier of which number is the setpoint. The value may be sent to the controller 17 when the wall module 11 is confident that the tenant is finished. This may be either a time out (i.e., 10 seconds) with no key presses or a key other than up/down is pressed. When the tenant presses and holds the up/down keys 74, the display may slew. There may be a slow slew rate and then a fast rate. The setpoint may, however, be configured to be in any area of the screen, such as the left side of area 33, the right side of area 33, or area 29.

In some cases, wall module 11 may be configured to limit the setpoint number to the high limit and a low limit. Wall module 11 may increment and decrement the setpoint of the controller 17 by the increment/decrement amount. The contractor, via the configuration tool 13, may define high limit, low limit, increment/decrement value. On the home screen, a key press may be ignored if high or low limit would be exceeded.

As shown, middle key 22 may initiate override. If not in override, pressing the middle key 22 may show the first item in the override round robin. If already in override, the Cancel symbol may be shown in addition to the Occupancy Override symbol. Pressing the middle key 22 may cancel any override in effect. Once in the override screens, pressing the NEXT key (not shown in FIG. 7, but may be associated with key 23) may again sequence to the next override option in the round robin. In some embodiments, the round robin may sequence to a CANCEL screen after the last option is shown, but this may not be provided. After the CANCEL screen (when provided), the round robin may sequence to the first screen. If there is only one override option, pressing the Occupancy Override key may sequence between the one option and the Cancel screen. In some cases, a "Done" segment may be shown to initiate the override. For timed overrides, the appropriate symbol (Occupied, Unoccupied, or Standby) may be displayed. Override and Time Remaining symbols may be displayed. The setpoint area may show the time remaining It may be initialized to the low limit value. The times may be in Hours or Days. The top alpha numeric area 33 may display the word "Hours" or "Days", as appropriate.

Soft key area 23 may display "System & View More". However, depending on the configuration, soft key area 23 may display "View More", "System", or other suitable indicator. For example, if only the system mode setpoint is configured, then only the System symbol may be displayed. If only View More is configured, then only the View More symbol may be displayed. If both are configured, then the System, &, and View More symbols may be displayed.

If system mode setpoint is configured, then pressing the System & View more key 23 may go to the system mode setpoint screen 71 shown in FIG. 8. The contractor, via the configuration tool 13, may enable the tenant to be able to set the system mode. The symbols configured by the configuration tool 13 may be displayed. The present mode selected may blink. Up/Down keys (not shown) may allow the tenant to change the selection. The "View More" key may save and go to the "View More" screens. The right key 23 may change from "System & View More" to "View More". If there are no View More items, then the "&" and "View More" symbols are not necessarily displayed. The left key 21 may display "Done". The middle key 22 may display Cancel. Top alpha numeric area 23 may display a label such as "SYS MODE". The system mode symbols configured by the configuration tool 13 (OFF, AUTO, COOL, HEAT, EMERGENCY+ HEAT) and setpoint symbol may be shown. The current system mode selection may blink. The up/down keys of the wall module 11 may enable the tenant to change the selection. If the tenant leaves the wall module in system mode setpoint for more than several (e.g., 10) seconds without a key press, then it may go back one level (i.e., it returns to the Home screen). Any change made to this screen may be saved.

Figure 9:
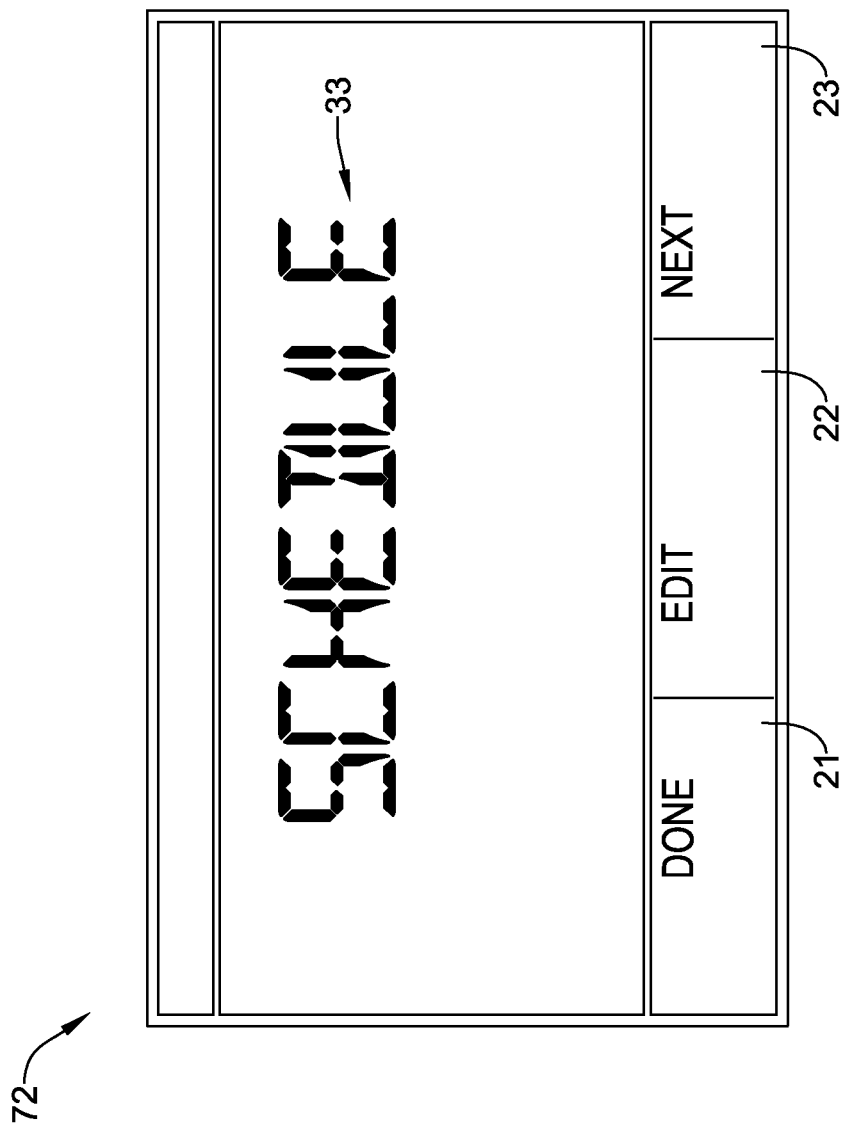

If the "VIEW MORE" button is pressed from the system mode setpoint screen 72, or if the system mode setpoint is not configured, then the wall module 11 may display the schedule screen 72. In FIG. 9, top alpha numeric area 33 may display a label such as "SCHEDULE". The middle key 22 may be an Edit, which may access the schedule sub-level screens. The left key 21 may be labeled "Done". One may go back one level (i.e., return to Home screen). When in the SCHEDULE screen, in FIG. 9, the right key 23 may be labeled "NEXT". In other cases, the right key 23 may be labeled "VIEW MORE" or other suitable labels. One may save any changes made to the value on the current screen. One can go to next View More screen in the list. If there is only one entry in the View More list, then the Next key 23 is not necessarily shown.

Figure 10:
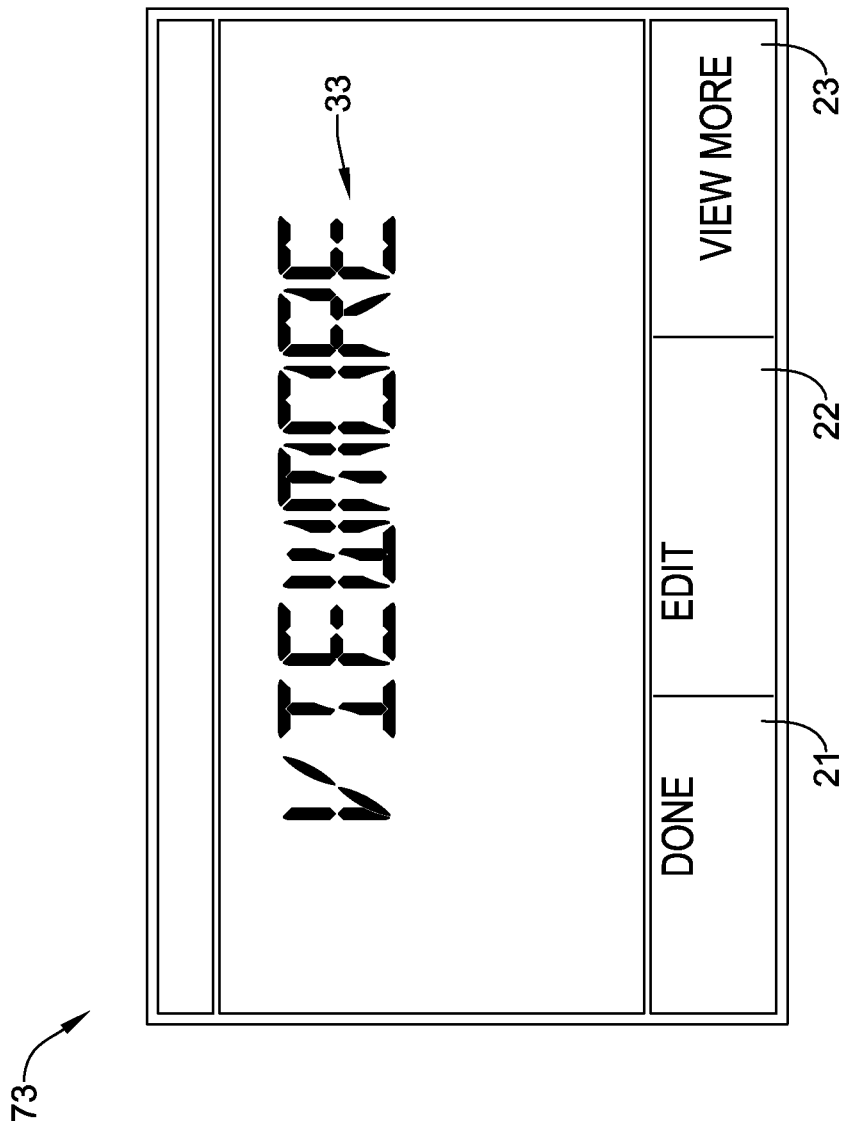

If the "NEXT" key is pressed, screen 73 may be displayed on the programmable wall module shown in FIG. 10. As shown, top alpha numeric area 33 may display a label such as "VIEW MORE", however, it is contemplated that other parameters may be displayed, similar to the embodiment shown in FIG. 37. The middle key 22 may be an Edit, which may access the View More parameters (e.g. Humidity, CO2, Humidity setpoint, etc.) for viewing and/or editing. The left key 21 may be labeled "Done". The value changed on this screen may be saved and sent to the controller. One may go back one level (i.e., return to Home screen). The right key 23 may be labeled "VIEW MORE". In other cases, the right key 23 may be labeled "NEXT" or other suitable labels. One may save any changes made to the value on the current screen. When "VIEW MORE" is pressed, the wall module 11 may again display the schedule screen 72 (shown in FIG. 9). In other cases, pressing the "VIEW MORE" key 23 may move to the system mode screen 71, shown in FIG. 8, if desired.

Figure 11:
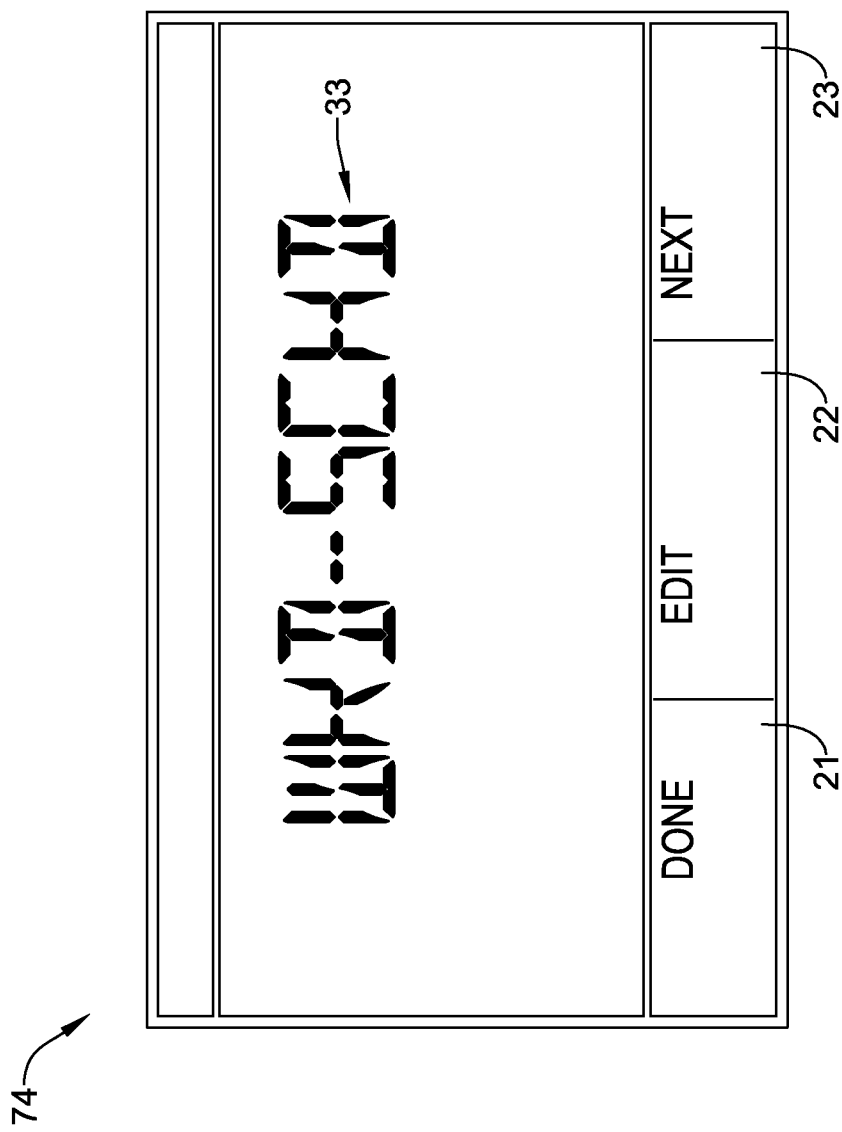
Figure 12:
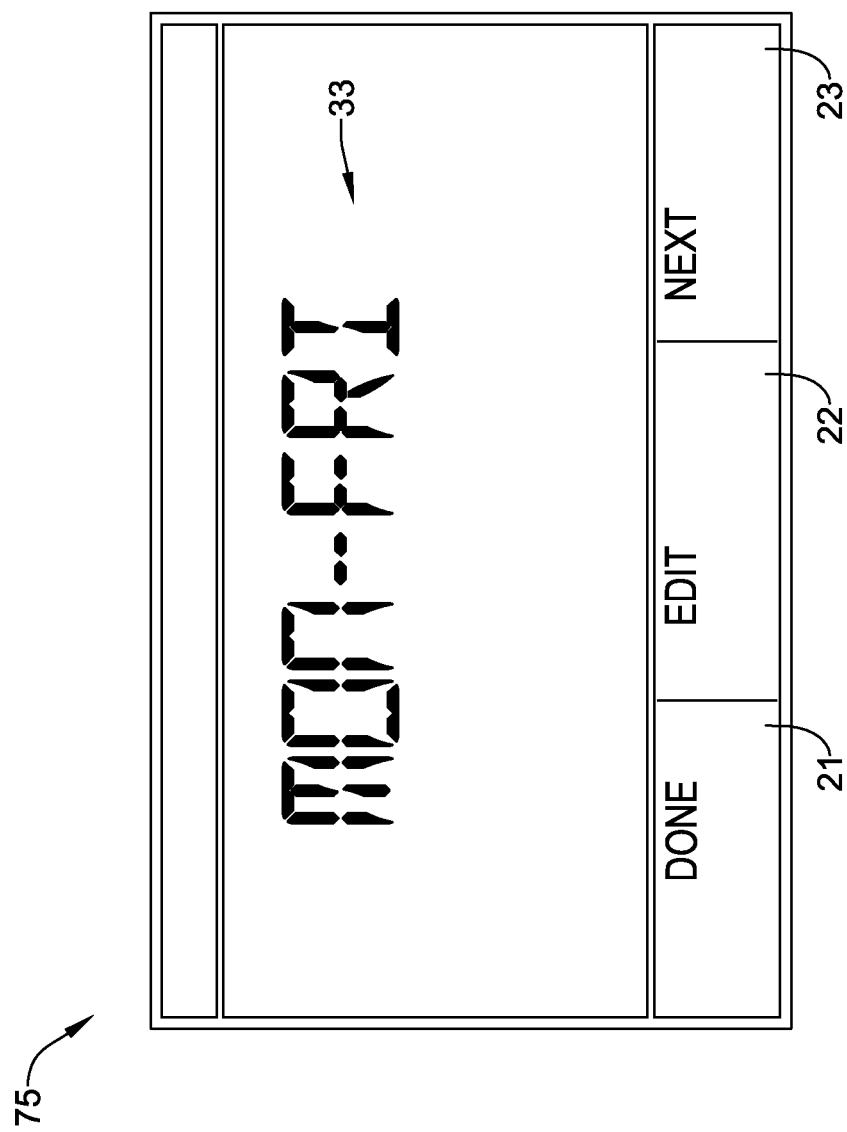
Figure 13:
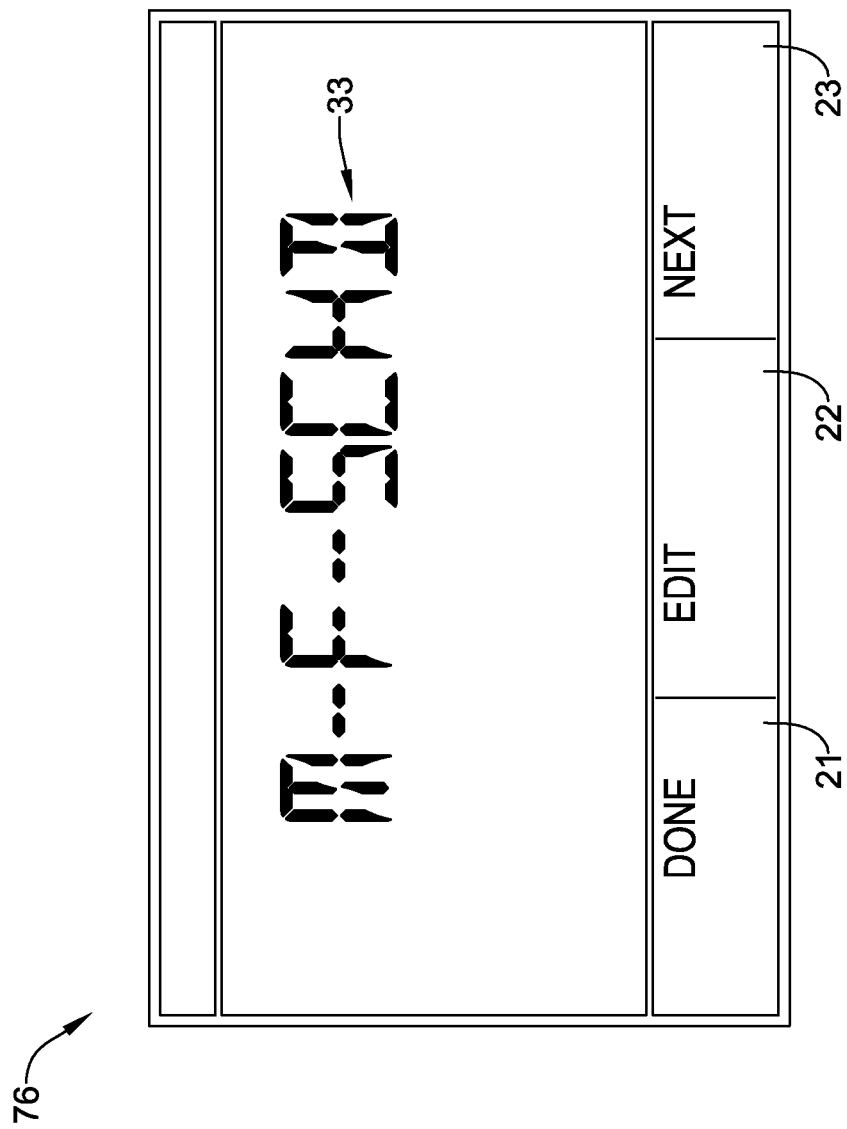

FIGS. 11-13 are example screens that may be displayed when the "EDIT" key is pressed in the schedule screen 72 shown in FIG. 9, depending on how the screens are configured by the configuration tool 13. Screen 74 shown in FIG. 11 has the label "WKD-SCHD" shown in alpha numeric area 33. Screen 75 shown in FIG. 12 has the label "MON-FRI" shown in alpha numeric area 33. Screen 76 shown in FIG. 13 has the label "M-F-SCHD" shown in the alpha numeric area 33. These are just examples, and it is contemplated that other labels may be used to indicate that the screen corresponds to Monday-Friday schedule settings.

Each of the screens may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Monday-Friday schedule settings.

Figure 14:
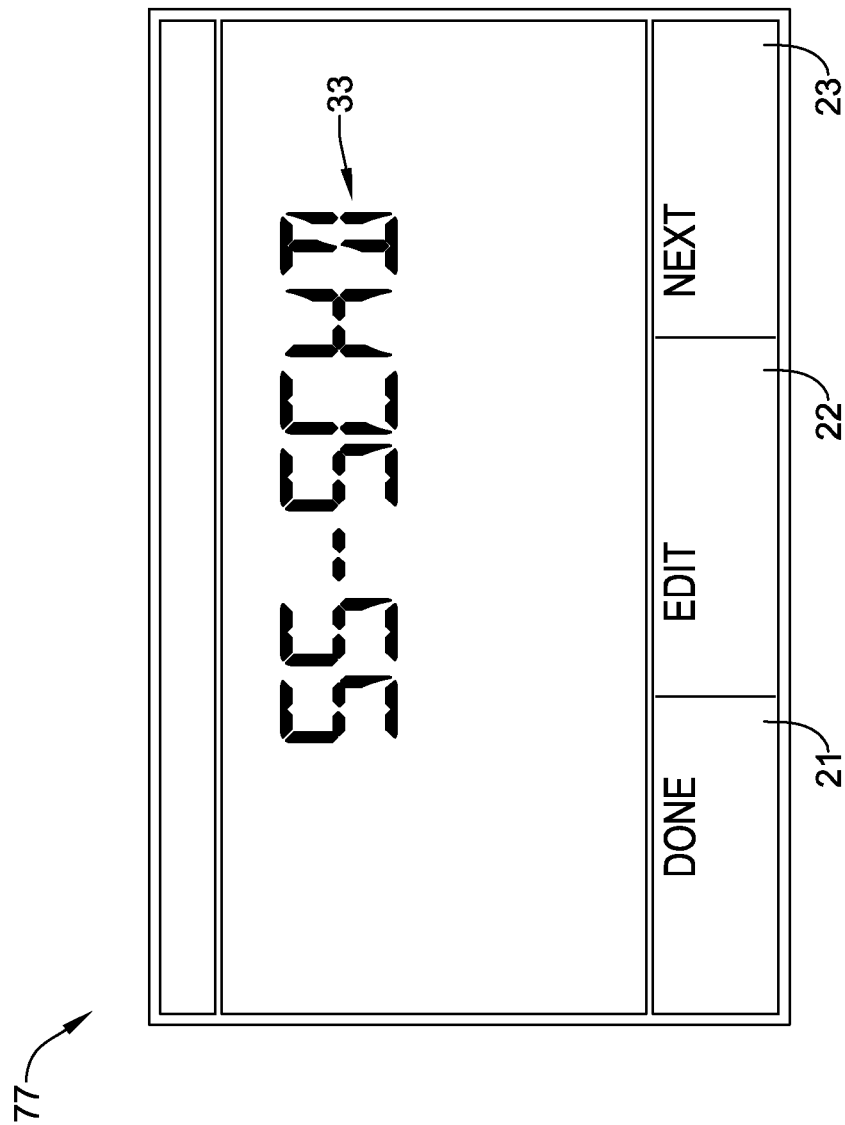

If the right key 23 is pressed in any of screens 74-76, screen 77 shown in FIG. 14 may be displayed on the programmable wall module. Screen 77 has the label "SS-SCHD" shown in alpha numeric area 33, however, this is just one example screen for the Saturday-Sunday schedule setting. It is contemplated that other labels may also be used.

Screen 77 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Saturday-Sunday schedule settings.

Figure 15:
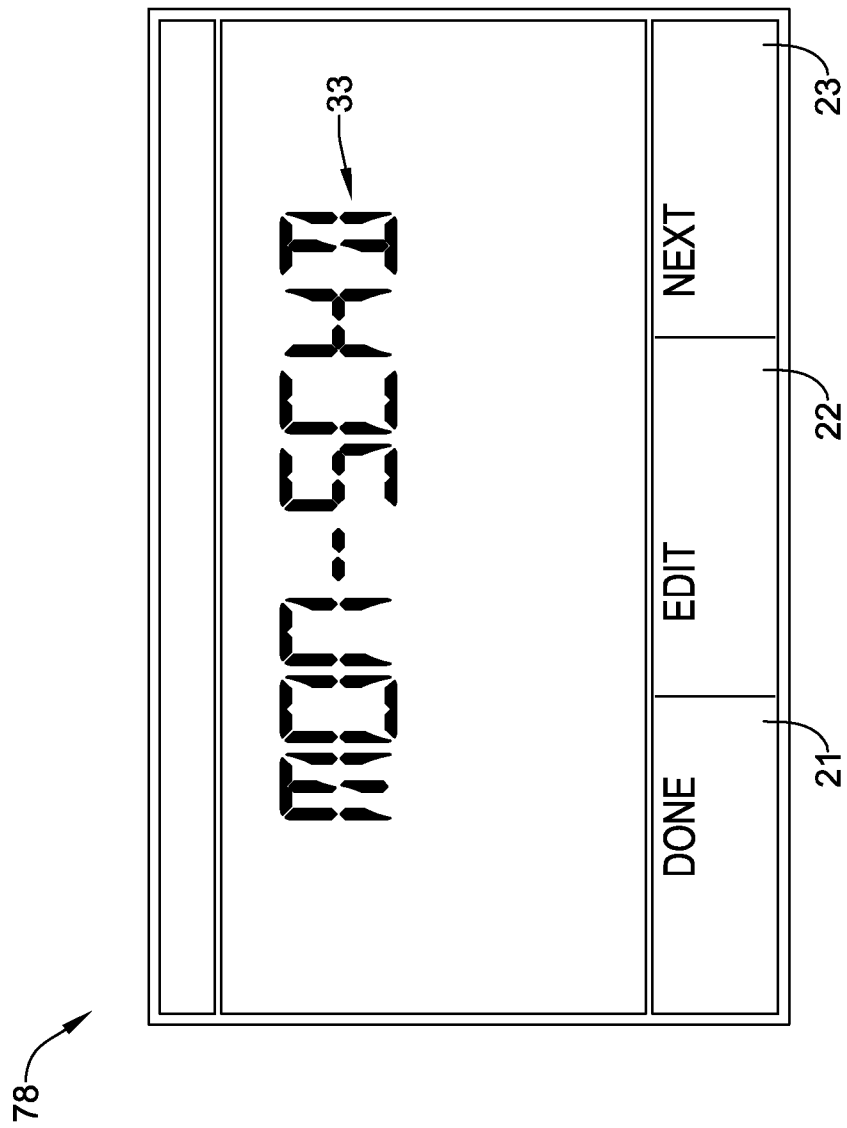

If "NEXT" is pressed in screen 77, then screen 78 shown in FIG. 15 may be displayed on the programmable wall module 11. Screen 78 may corresponding to the Monday schedule setting. Screen 78 has the label "MON-SCHD" shown in alpha numeric area 33, however, this is just one example screen for the Monday schedule setting. It is contemplated that other labels may also be used. Screen 78 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Monday schedule settings.

Figure 16:
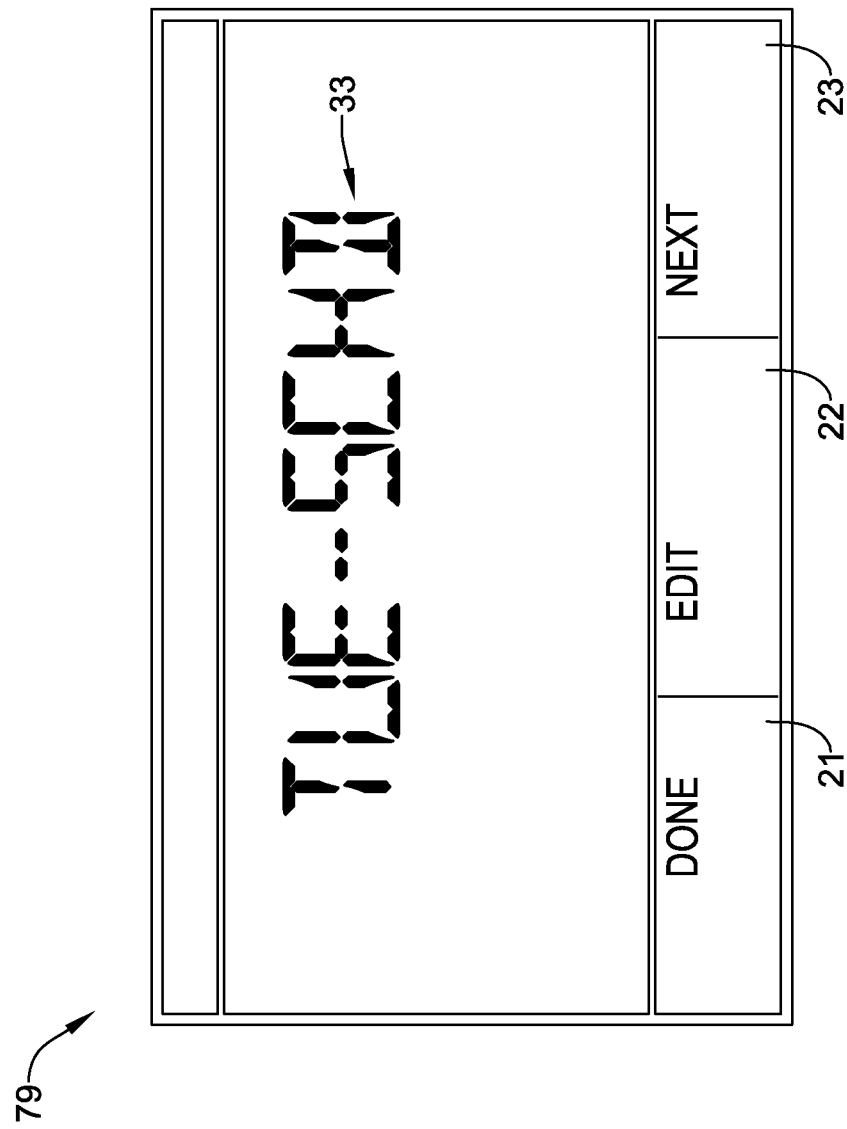

If "NEXT" is pressed in screen 78, then screen 79 shown in FIG. 16 may be displayed on the programmable wall module 11. Screen 79 may corresponding to the Tuesday schedule setting. Screen 79 has the label "TUE-SCHD" shown in alpha numeric area 33, however, this is just one example screen for the Tuesday schedule setting. It is contemplated that other labels may also be used. Screen 79 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Tuesday schedule settings.

Figure 17:
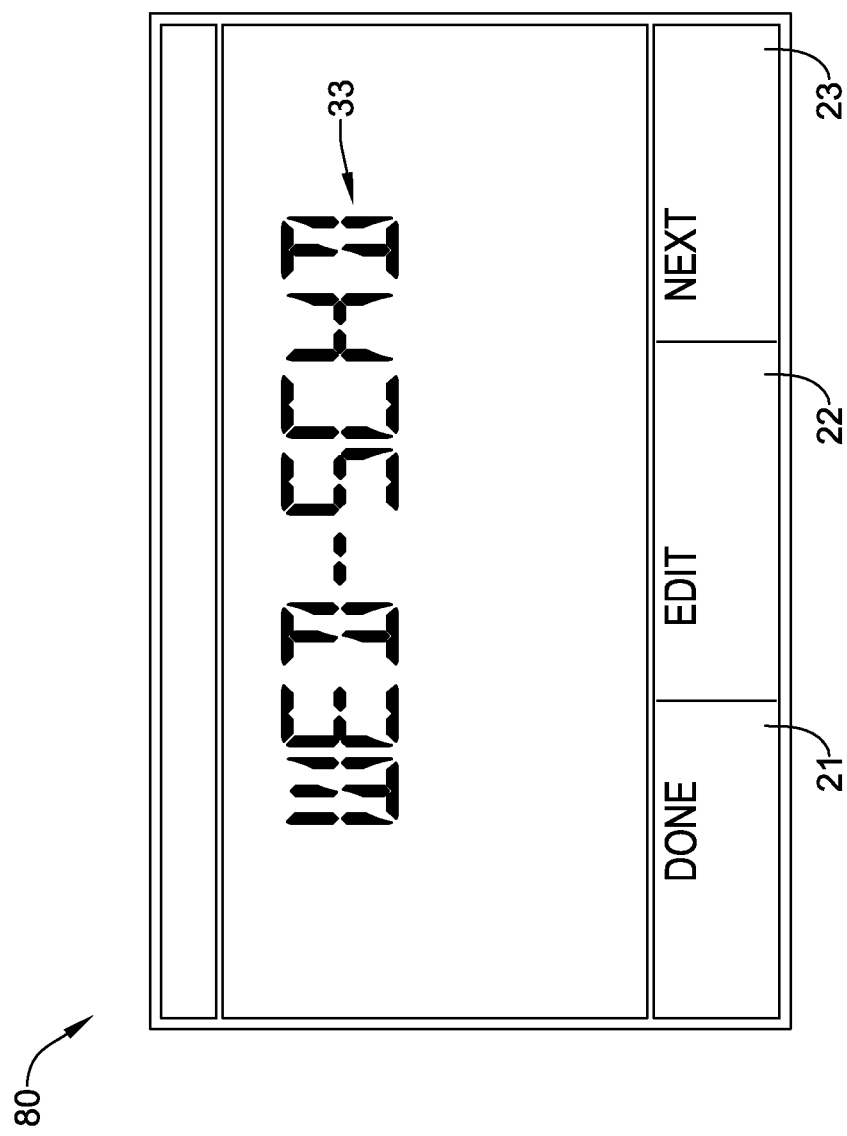

If "NEXT" is pressed in screen 79, then screen 80 shown in FIG. 17 may be displayed on the programmable wall module 11. Screen 80 may corresponding to the Wednesday schedule setting. Screen 80 has the label "WED-SCHD" shown in alpha numeric area 33, however, this is just one example screen for the Wednesday schedule setting. It is contemplated that other labels may also be used. Screen 80 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for Wednesday schedule settings.

Figure 18:
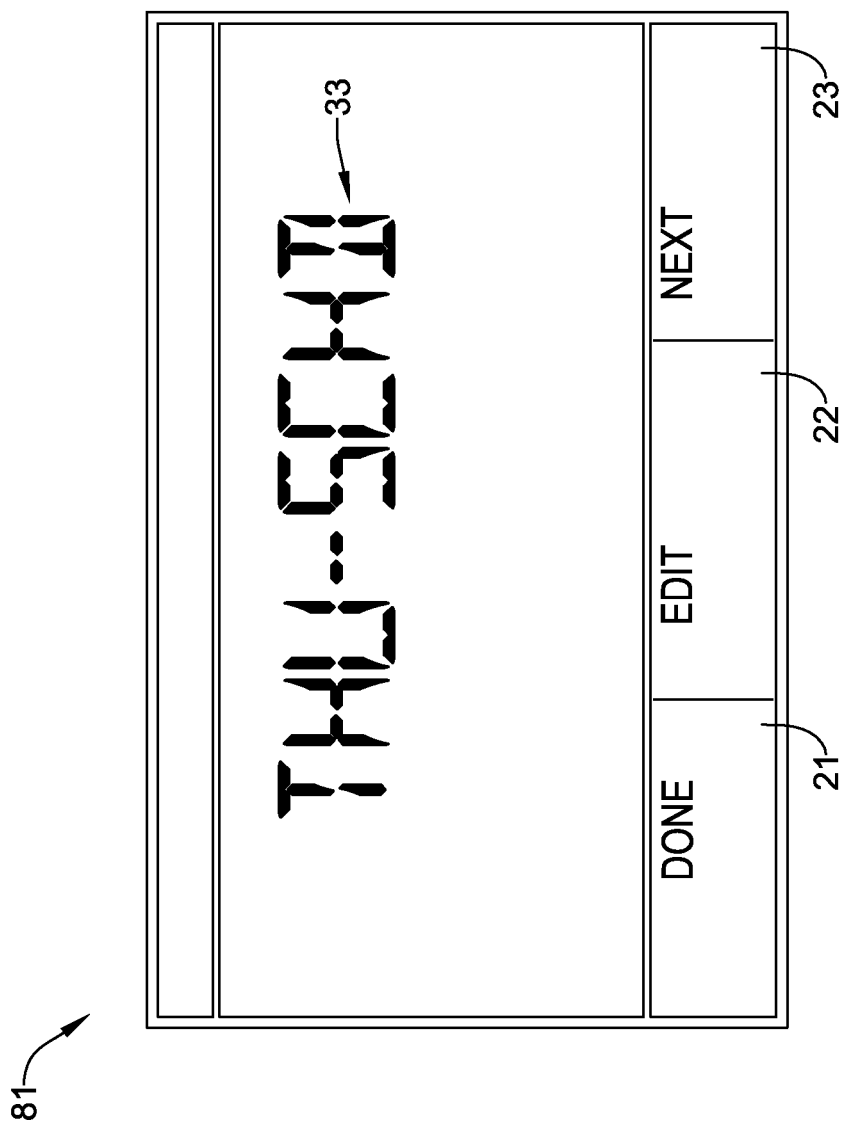

If "NEXT" is pressed in screen 80, then screen 81 shown in FIG. 18 may be displayed on the programmable wall module 11. Screen 81 may corresponding to the Thursday schedule setting. Screen 81 has the label "THU-SCHD" shown in alpha numeric area 33, however, this is just one example screen for the Thursday schedule setting. It is contemplated that other labels may also be used. Screen 81 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Thursday schedule settings.

Figure 19:
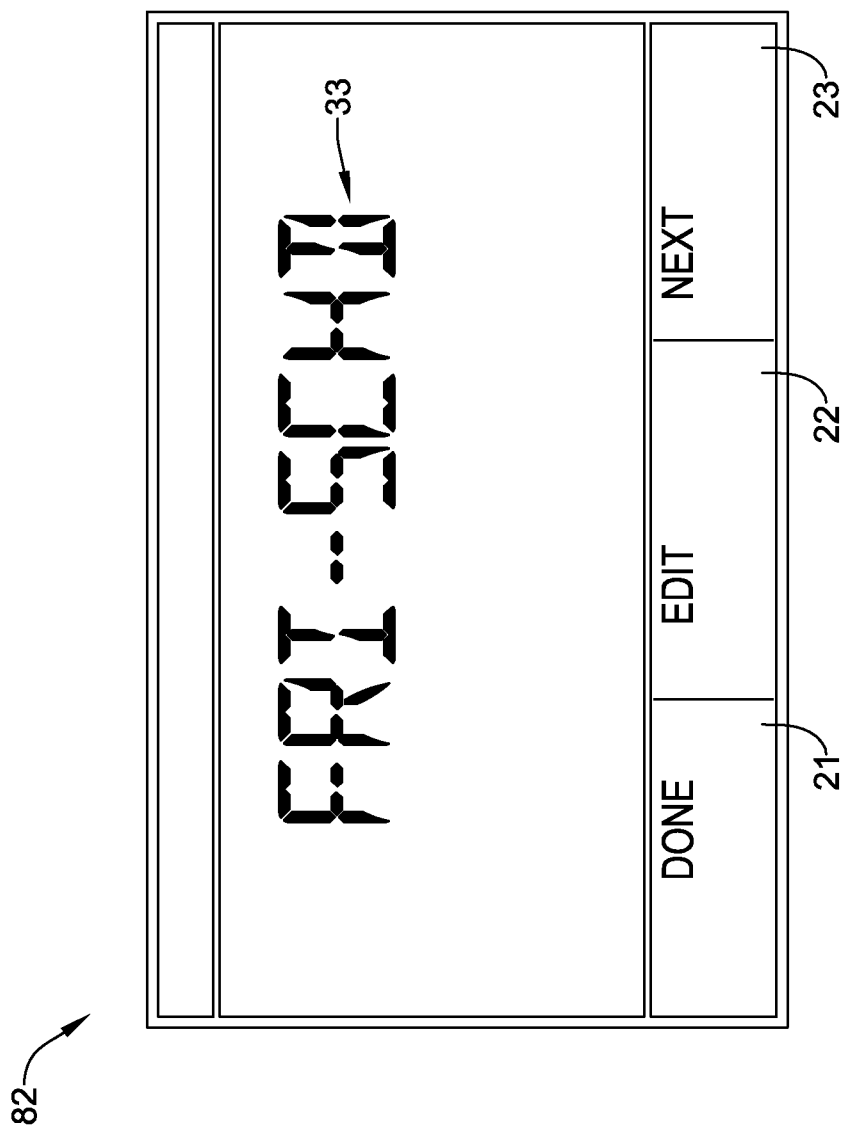

If "NEXT" is pressed in screen 81, then screen 82 shown in FIG. 19 may be displayed on the programmable wall module 11. Screen 82 may corresponding to the Friday schedule setting. Screen 82 has the label "FRI-SCHD" shown in alpha numeric area 33, however, this is just one example screen for the Friday schedule setting. It is contemplated that other labels may also be used. Screen 82 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Friday schedule settings.

Figure 20:
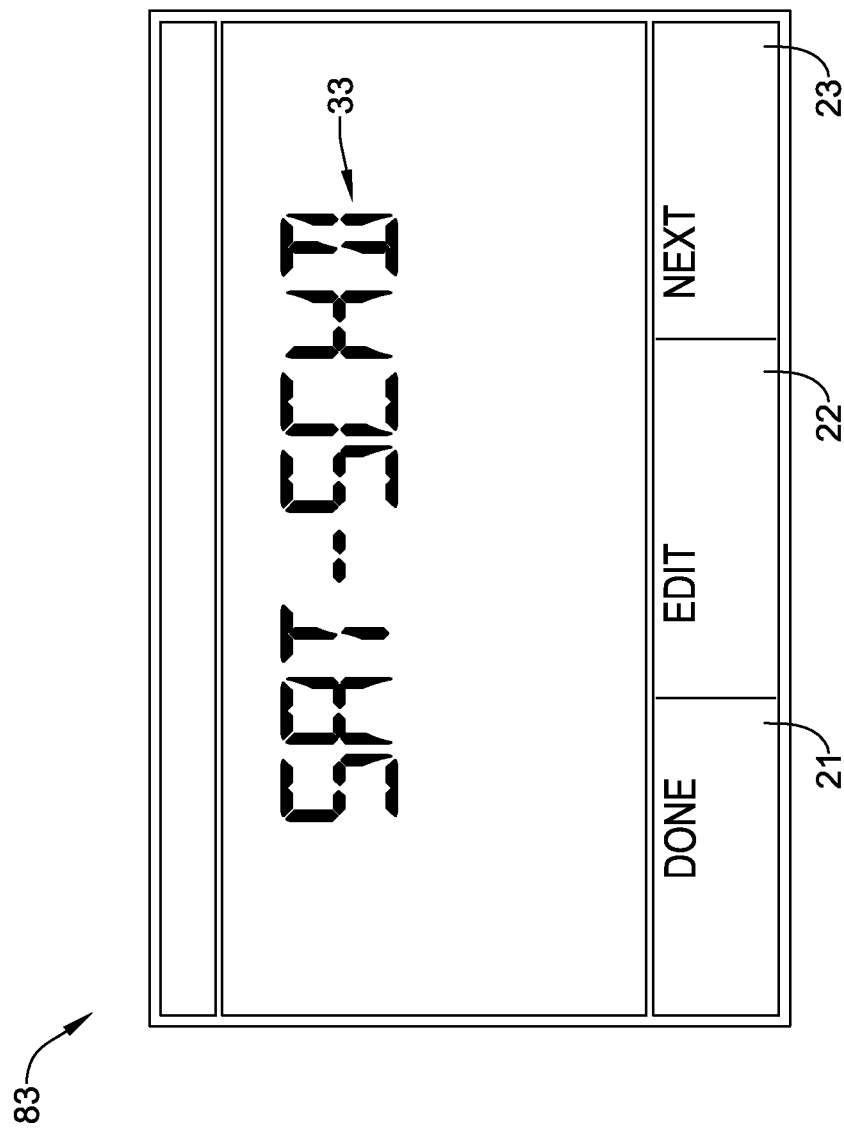

If "NEXT" is pressed in screen 82, then screen 83 shown in FIG. 20 may be displayed on the programmable wall module 11. Screen 83 may corresponding to the Saturday schedule setting. Screen 83 has the label "SAT-SCHD" shown in alpha numeric area 33, however, this is just one example screen for the Saturday schedule setting. It is contemplated that other labels may also be used. Screen 83 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Saturday schedule settings.

Figure 21:
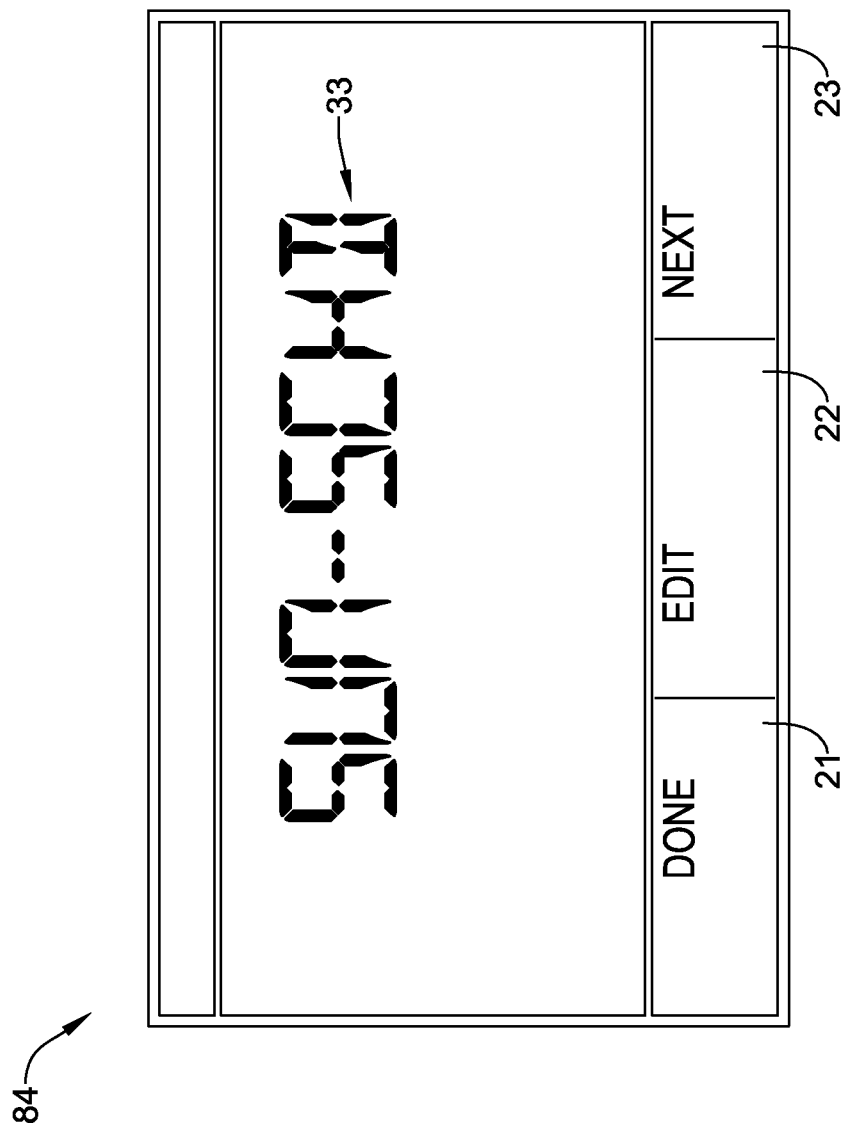

If "NEXT" is pressed in screen 83, then screen 84 shown in FIG. 21 may be displayed on the programmable wall module 11. Screen 84 may corresponding to the Sunday schedule setting. Screen 84 has the label "SUN-SCHD" shown in alpha numeric area 33, however, this is just one example screen for the Sunday schedule setting. It is contemplated that other labels may also be used. Screen 84 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Sunday schedule settings.

Figure 22:
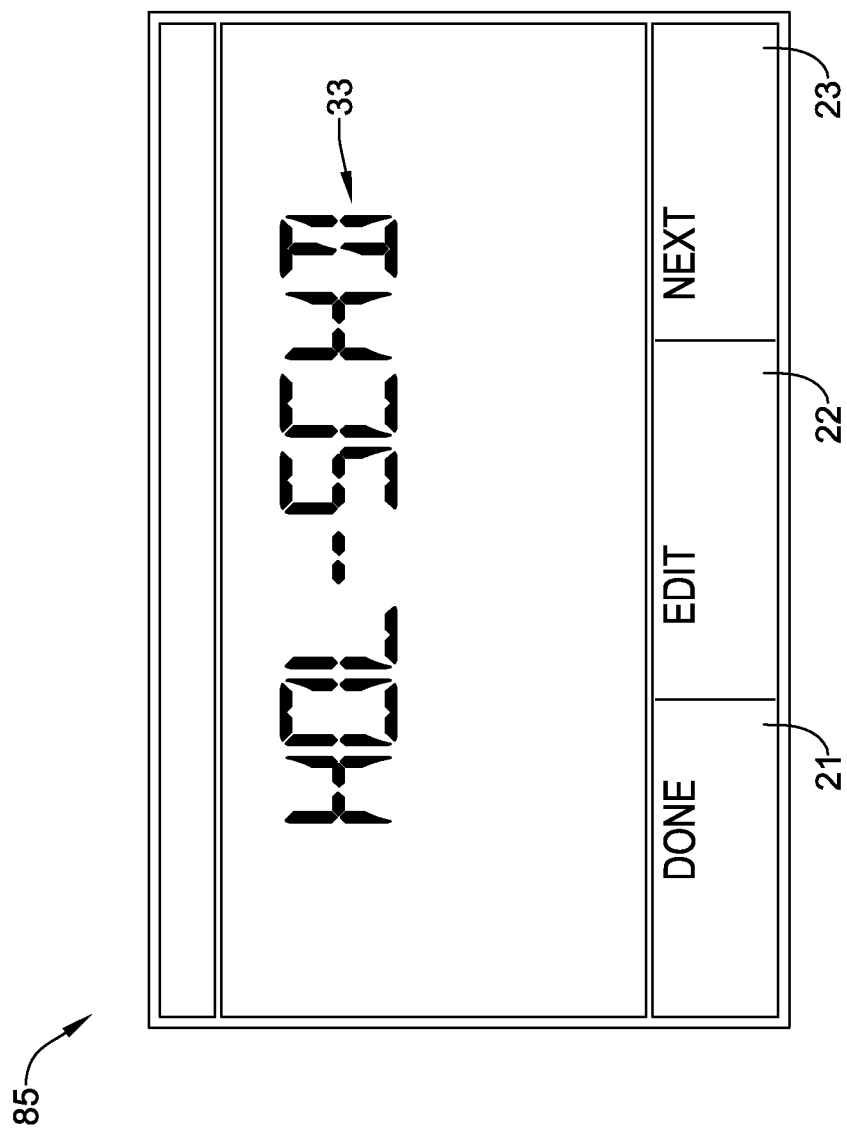
Figure 23:
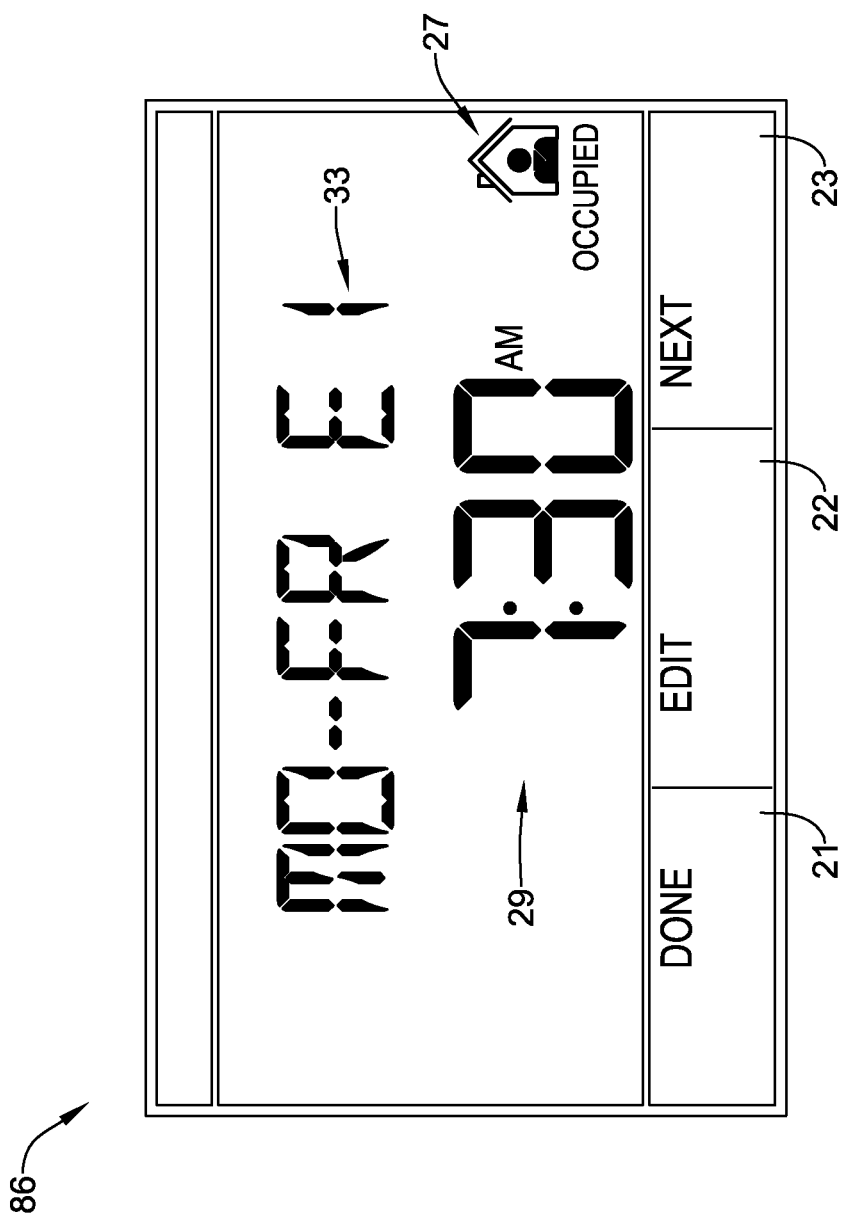

If "NEXT" is pressed in screen 84, then screen 85 shown in FIG. 22 may be displayed on the programmable wall module 11. Screen 84 may corresponding to the Holiday schedule setting. Screen 85 has the label "HOL-SCHD" shown in alpha numeric area 33, however, this is just one example screen for the Holiday schedule setting. It is contemplated that other labels may also be used. Screen 85 may have the left key 21 may be labeled "Done". One may go back one level (i.e., return to Schedule screen). The right key 23 may be labeled "NEXT" to move to the next schedule screen. The middle key 22 may be labeled "EDIT" to allow the tenant to edit the events for the Holiday schedule settings. If "NEXT" is pressed in screen 85, then one of screens 74-76 (shown in FIGS. 11-13) may be displayed on the programmable wall module 11.

In the illustrative embodiment, the Tenant may also be able to configure each day separately. For example, the wall module may continue to cycle through the individual days of the week and a holiday, so that the Tenant can view and/or edit these settings. In some embodiments, the event settings set under the Monday-Friday setting may be applied to each individual day (Monday, Tuesday, Wednesday, Thursday, and Friday). Similarly, the settings under the Saturday-Sunday setting may be applied to both Saturday and Sunday. In this case, the Tenant can scroll through the individual days to change one or more of the individual events, while maintaining the settings being applied to the remainder of the group.

Each of the schedule day settings (e.g. Monday-Friday, Saturday-Sunday, Monday, Tuesday, Wednesday, Thursday, Friday, Saturday, Sunday, and Holiday) may be configured to have one or more events for that day/days. In the illustrative example, there are four events per day, but this is just one example. It is contemplated that one event, two events, three events, four events, five events, six events, seven events, eight events, or any other number of events may be provided for each of the day.

The Tenant may access the next sub-level menu for a specific day or group of days by pressing "EDIT" in the corresponding day. For example, if "EDIT" key 21 is pressed in one of screens 74-85 (shown in FIGS. 11-22), screen 86 shown in FIG. 23 may be displayed on the programmable wall module 11. Screens 74-85 (shown in FIGS. 11-22) may be considered first level screens, and screen 86 may be considered a second level screen in a hierarchical menu structure. Screen 86 may correspond to event 1 for Monday-Friday. As shown, Screen 86 may have the left key 21 may be labeled "Done". One may go back one level (i.e., return to Monday-Friday screen). The right key 23 may be labeled "NEXT" to move to the next event screen. The middle key 22 may be labeled "EDIT" to allow the tenant to edit the event (e.g. value, state, etc.).

In screen 86, alpha numeric area 33 may display "MO-FR E1" and alpha numeric area 29 may display a time corresponding to the start time for the event. Screen 86 may also display the effective occupancy state, such as "Occupied", "Unoccupied", or "Standby" along with a corresponding symbol.

Figure 33:
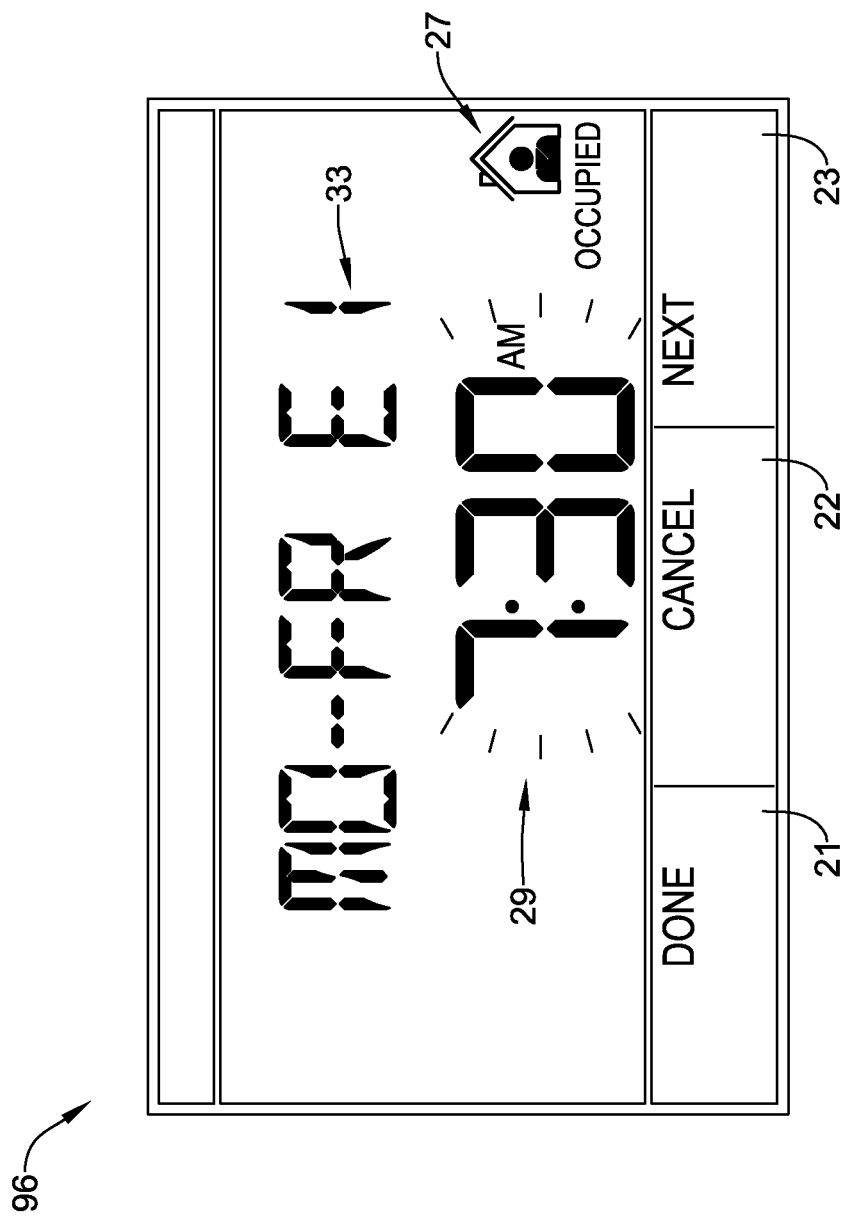

Pressing "EDIT" key 22 in screen 86 may allow a user to edit the time as shown in screen 96 of FIG. 33. In this screen, the middle key 22 may now be labeled "CANCEL" to allow the tenant to go back one level and discard the changes. Also, since the time may be editable, the time may blink. The up/down keys (not shown) may enable the tenant to change the time. The contractor, via the configuration tool 13, may define the label and increment/decrement value of the time. The up Key may increment the time in a middle alphanumeric area 29 by a specified amount, such as 15 minutes. However, other increments/decrements may be used as desired. Down key may decrement the time in middle alpha numeric area 29 by a specified amount. In some embodiments, while incrementing/decrementing, the time just before noon and/or midnight may show dashes and the occupancy symbol may not be displayed. If the uses presses Done at this point, the event may be set to null or unprogrammed. If the tenant leaves the wall module in System & View More mode for more than several (e.g., 60) seconds without a key press, then it may go back one level (i.e., returns to the Home screen). Any change made to this screen may be saved.

Figure 34:
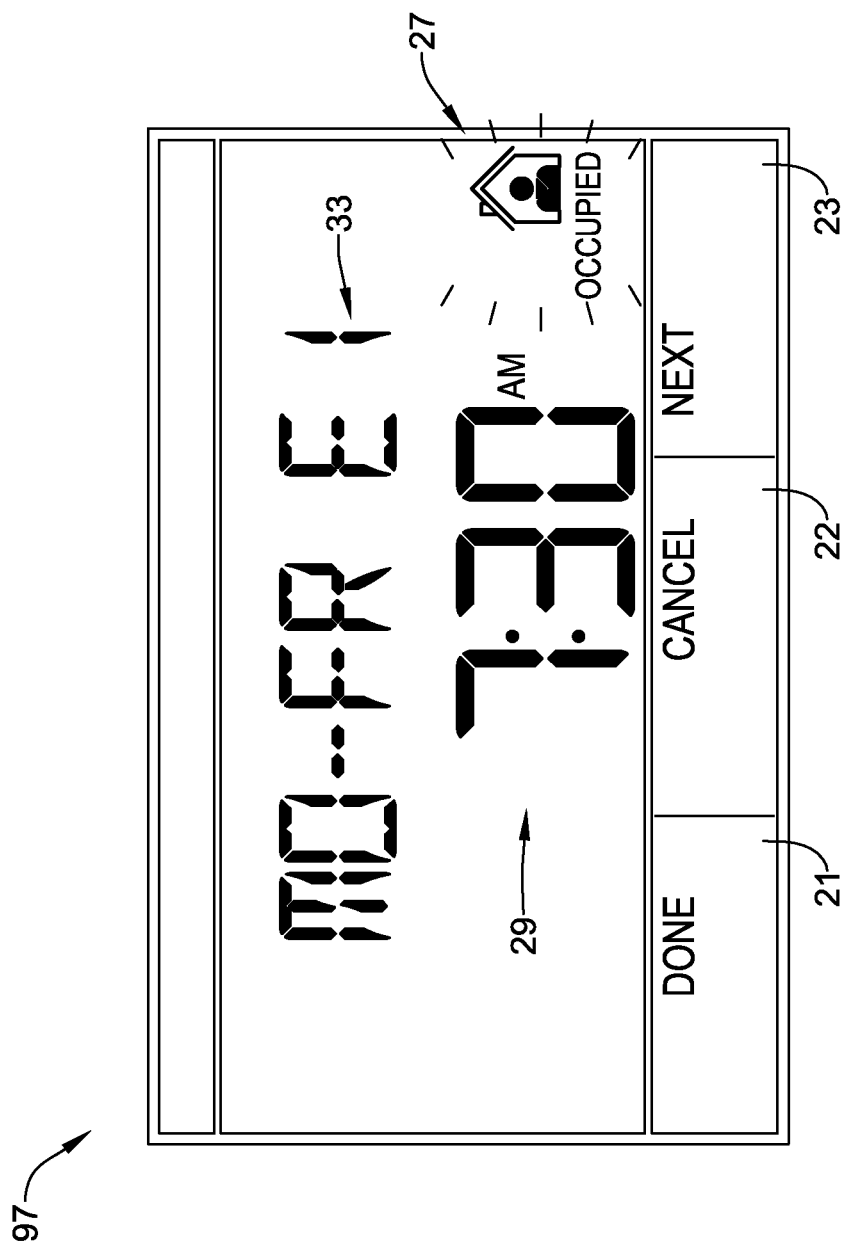

Once the desired time is displayed in alpha numeric area 29, pressing "NEXT" key 23 will move to screen 97, shown in FIG. 34, and allow the Tenant to modify the occupancy setting. Screen 96 may also display the effective occupancy state, such as "Occupied", "Unoccupied", or "Standby" along with a corresponding symbol. Pressing the up or down keys may cycle through the various occupancy settings. When the desired occupancy setting is displayed, the Tenant may press "NEXT" to return to screen 96, or "DONE" to return to screen 86, changes may be saved and sent to the controller.

Figure 24:
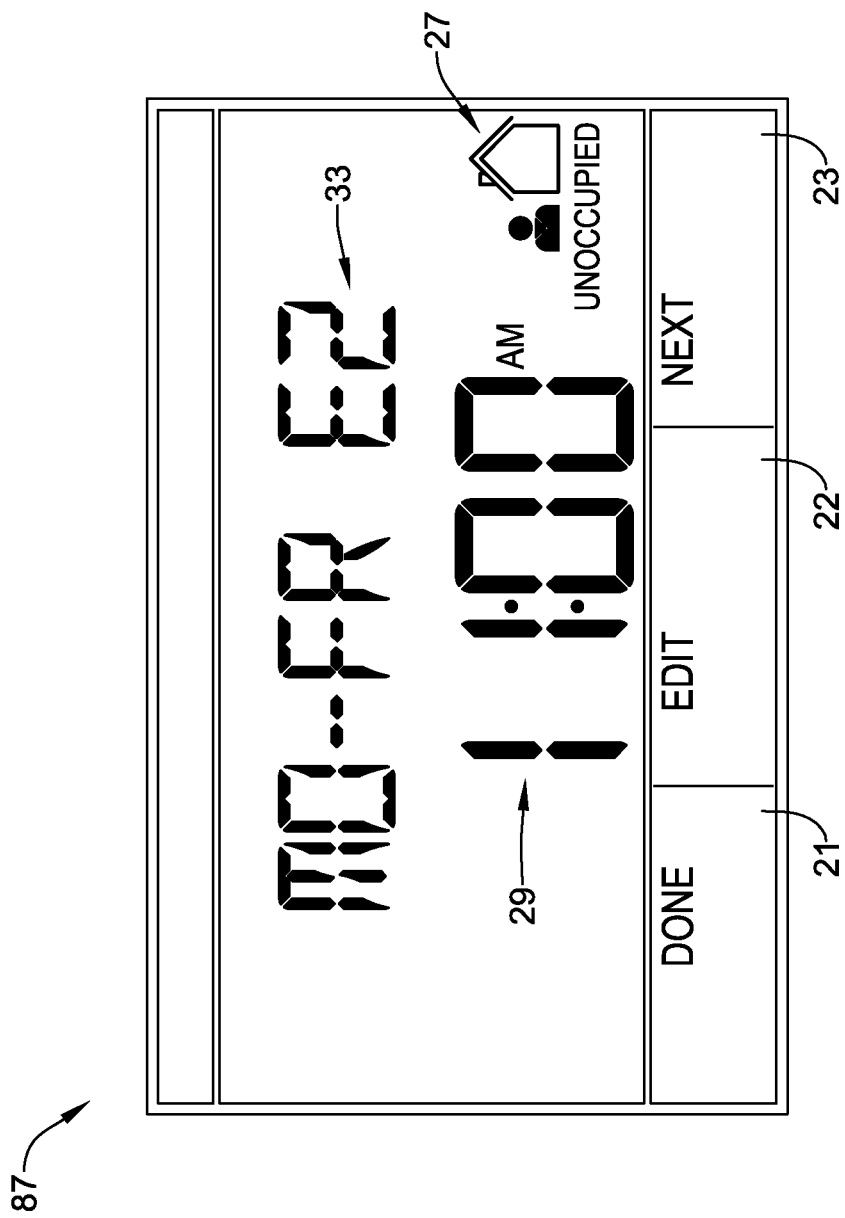

Pressing "NEXT" key 23 in screen 86 may display screen 87 shown in FIG. 24 may be on the programmable wall module 11. Screen 87 may correspond to event 2 for Monday-Friday. As shown, Screen 87 may have the left key 21 may be labeled "Done". One may go back one level (i.e., return to Monday-Friday screen). The right key 23 may be labeled "NEXT" to move to the next event screen. The middle key 22 may be labeled "EDIT" to allow the tenant to edit the event.

In screen 87, alpha numeric area 33 may display "MO-FR E2" and alpha numeric area 29 may display a time corresponding to the start time for the event. Screen 87 may also display the effective occupancy state, such as "Occupied", "Unoccupied", or "Standby" along with a corresponding symbol. Pressing "EDIT" key 22 in screen 87 may allow a user to edit the event, similar to as discussed above.

Figure 25:
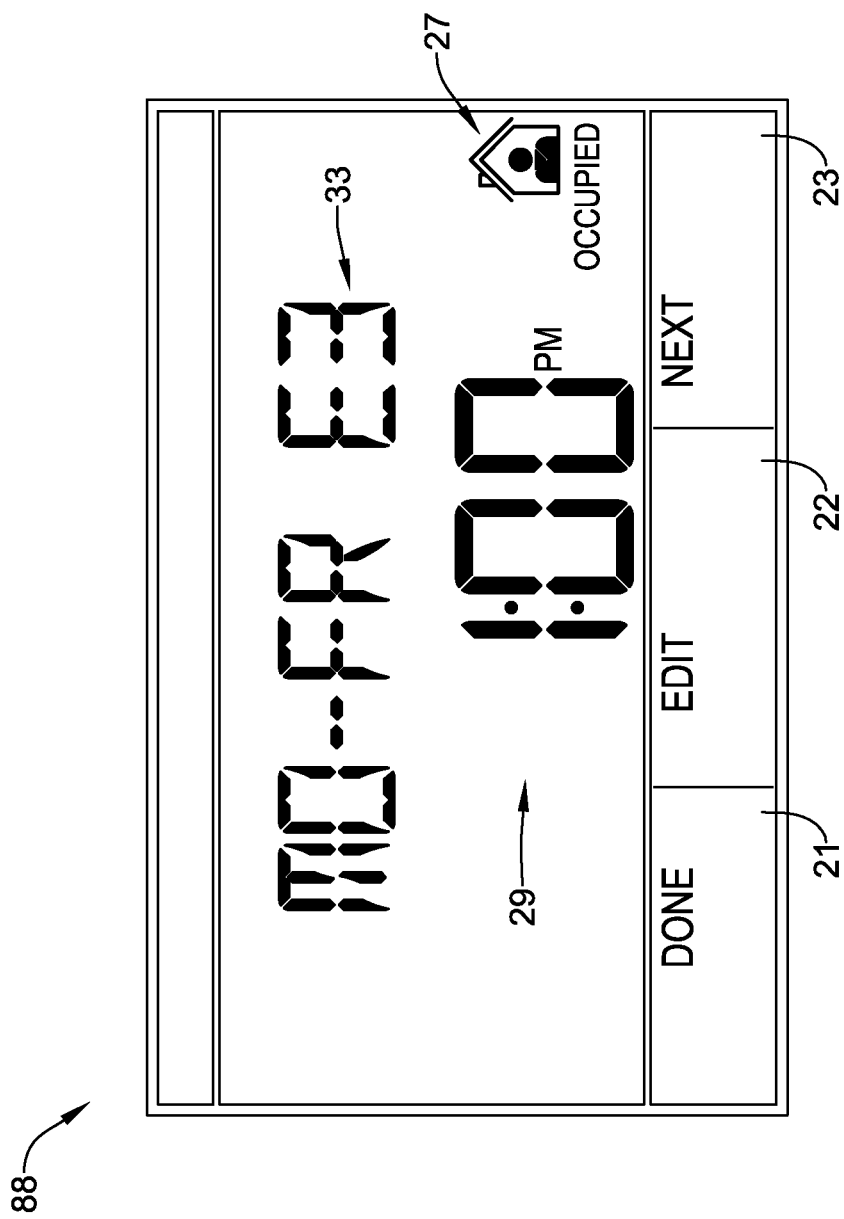

Pressing "NEXT" key 23 in screen 87 may display screen 88 shown in FIG. 25 may be on the programmable wall module 11. Screen 88 may correspond to event 3 for Monday-Friday. As shown, Screen 88 may have the left key 21 may be labeled "Done". One may go back one level (i.e., return to Monday-Friday screen). The right key 23 may be labeled "NEXT" to move to the next event screen. The middle key 22 may be labeled "EDIT" to allow the tenant to edit the event.

In screen 88, alpha numeric area 33 may display "MO-FR E3" and alpha numeric area 29 may display a time corresponding to the start time for the event. Screen 88 may also display the effective occupancy state, such as "Occupied", "Unoccupied", or "Standby" along with a corresponding symbol. Pressing "EDIT" key 22 in screen 88 may allow a user to edit the event, similar to as discussed above.

Figure 26:
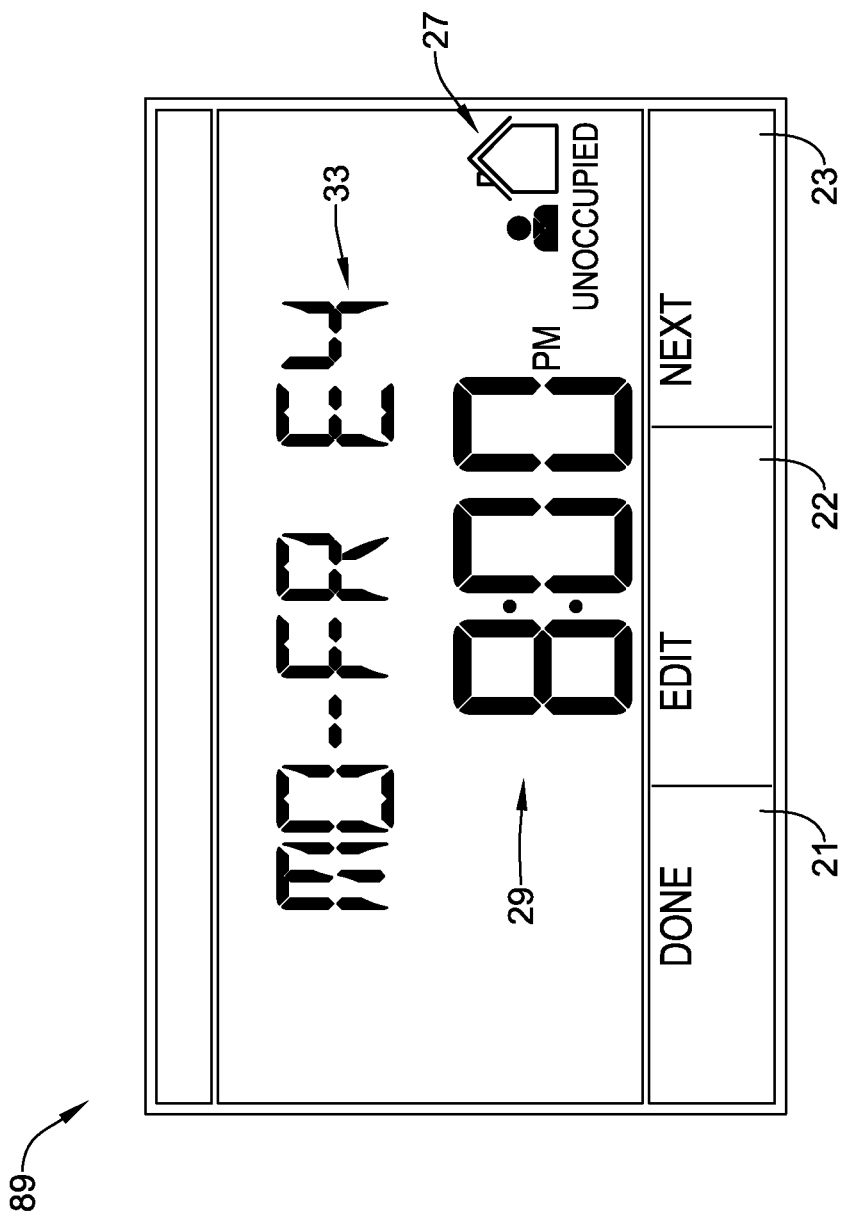

Pressing "NEXT" key 23 in screen 88 may display screen 89 shown in FIG. 26 may be on the programmable wall module 11. Screen 89 may correspond to event 4 for Monday-Friday. As shown, Screen 89 may have the left key 21 may be labeled "Done". One may go back one level (i.e., return to Monday-Friday screen). The right key 23 may be labeled "NEXT" to move to the next event screen. The middle key 22 may be labeled "EDIT" to allow the tenant to edit the event.

In screen 89, alpha numeric area 33 may display "MO-FR E4" and alpha numeric area 29 may display a time corresponding to the start time for the event. Screen 89 may also display the effective occupancy state, such as "Occupied", "Unoccupied", or "Standby" along with a corresponding symbol. Pressing "EDIT" key 22 in screen 89 may allow a user to edit the event, similar to as discussed above. Pressing "NEXT" key 23 in screen 89 may return to event 1 and display screen 86 shown in FIG. 23 may be on the programmable wall module 11.

Figure 27:
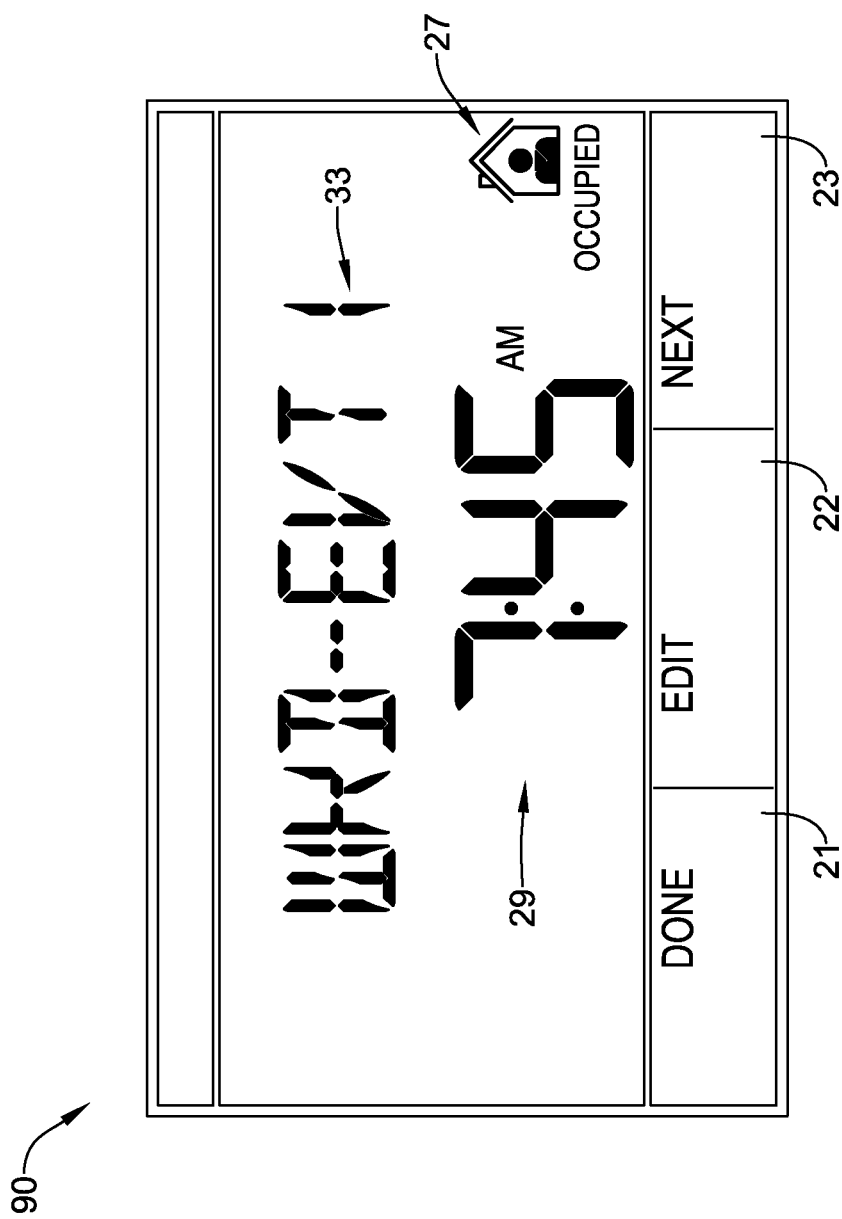

FIG. 27 is an alternative Monday-Friday event screen 90. Instead of displaying label "MO-FR-E1", screen 90 displays "WKD-EVT1". Other suitable labels could also be used. Further, similar labels may be applied to the other events (e.g. events 2, 3, and 4).

Figure 28:
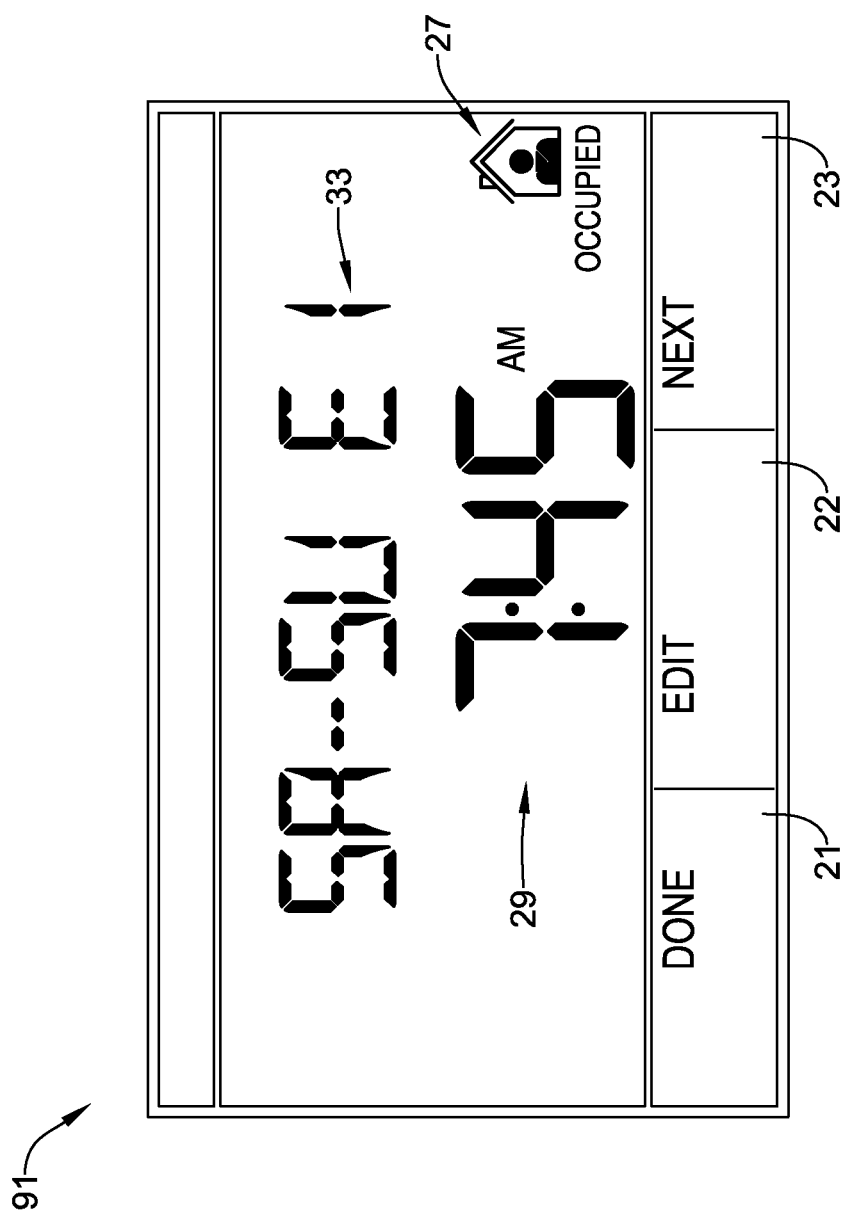

If "EDIT" key 21 is pressed in screen 77 (shown in FIG. 14), screen 91 shown in FIG. 28 may be displayed on the programmable wall module 11. Screen 91 may correspond to event 1 for Saturday-Sunday. As shown, Screen 91 may have the left key 21 may be labeled "Done". One may go back one level (i.e., return to Saturday-Sunday screen). The right key 23 may be labeled "NEXT" to move to the next event screen. The middle key 22 may be labeled "EDIT" to allow the tenant to edit the event.

In screen 91, alpha numeric area 33 may display "SA-SU E1" and alpha numeric area 29 may display a time corresponding to the start time for the event. Screen 91 may also display the effective occupancy state, such as "Occupied", "Unoccupied", or "Standby" along with a corresponding symbol. Pressing "EDIT" key 22 in screen 91 may allow a user to edit the event, similar to as discussed above with reference to FIGS. 33 and 34.

Figure 29:
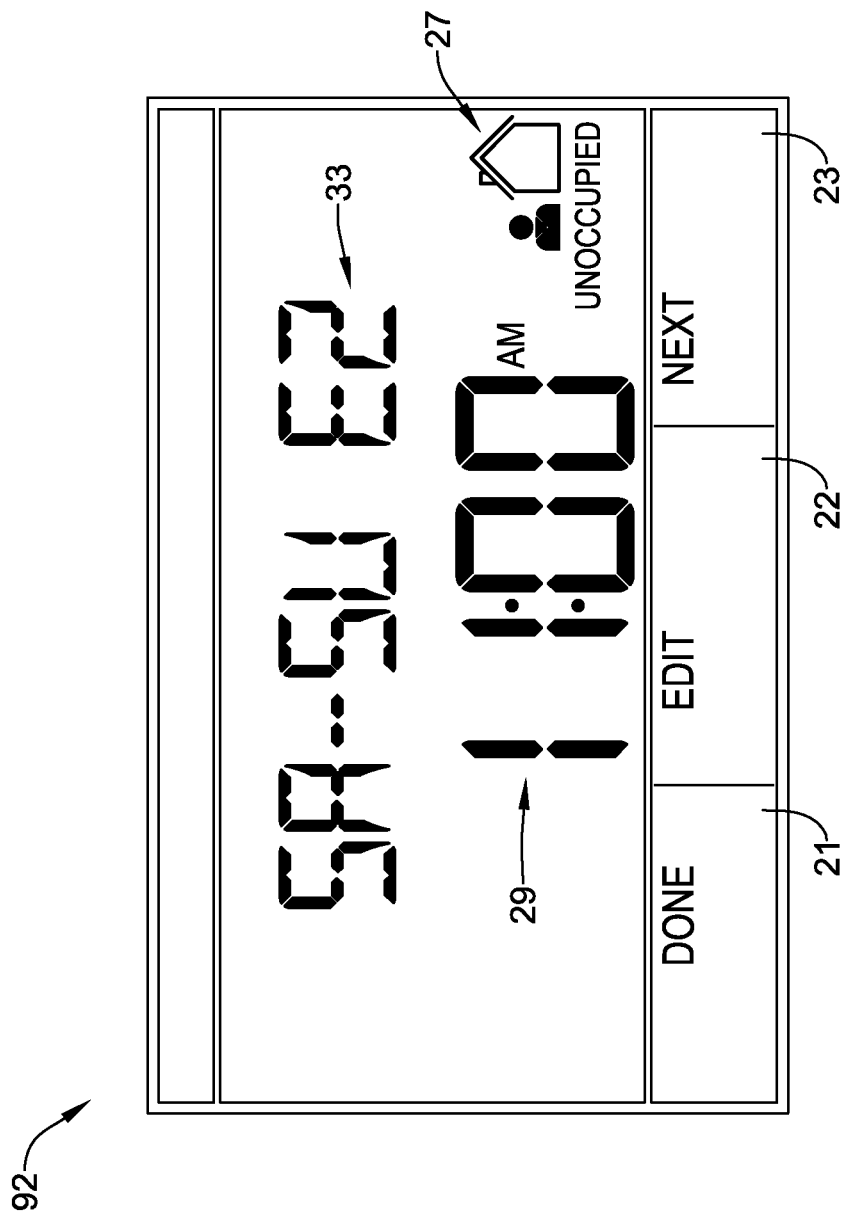

Pressing "NEXT" key 23 in screen 91 may display screen 92 shown in FIG. 29 may be on the programmable wall module 11. Screen 92 may correspond to event 2 for Saturday-Sunday. As shown, Screen 92 may have the left key 21 may be labeled "Done". One may go back one level (i.e., return to Monday-Friday screen). The right key 23 may be labeled "NEXT" to move to the next event screen. The middle key 22 may be labeled "EDIT" to allow the tenant to edit the event.

In screen 92, alpha numeric area 33 may display "SA-SU E2" and alpha numeric area 29 may display a time corresponding to the start time for the event. Screen 92 may also display the effective occupancy state, such as "Occupied", "Unoccupied", or "Standby" along with a corresponding symbol. Pressing "EDIT" key 22 in screen 92 may allow a user to edit the event, similar to as discussed above with reference to FIGS. 33 and 34.

Figure 30:
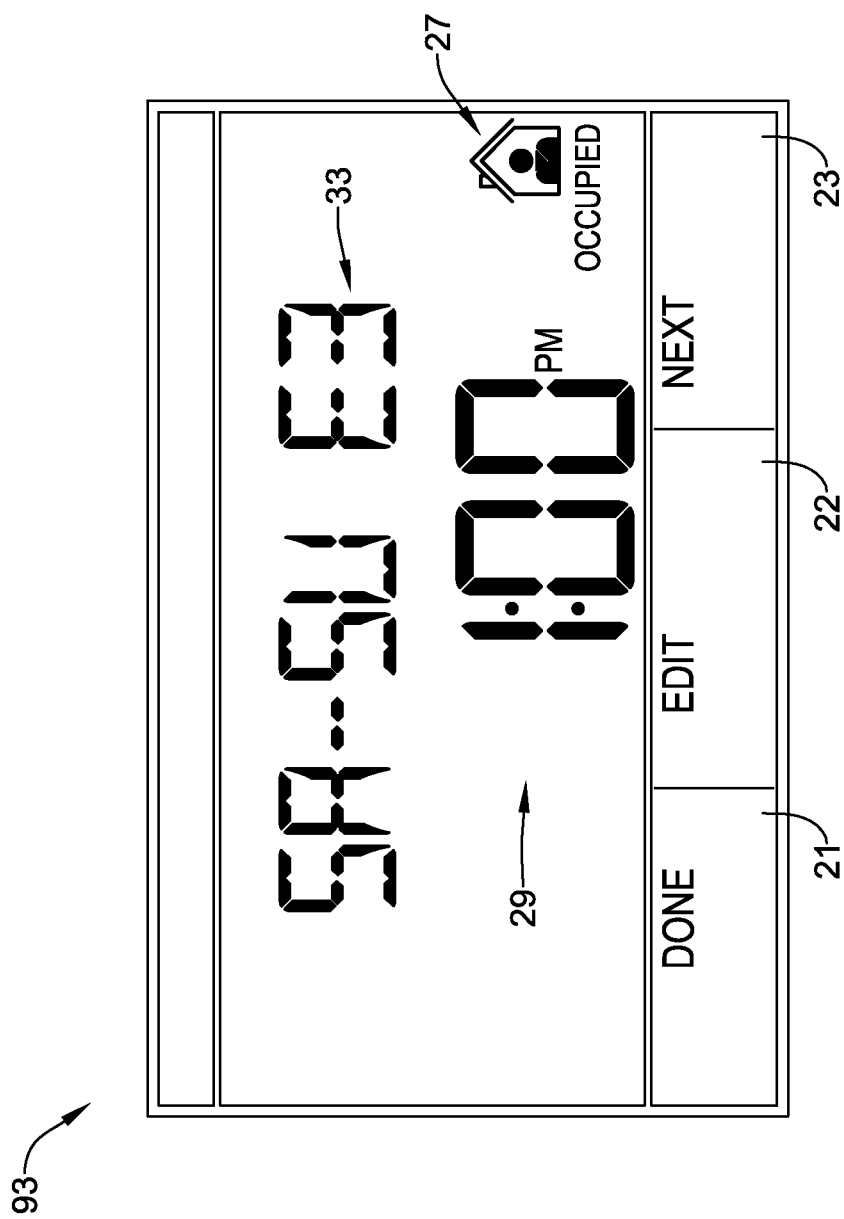

Pressing "NEXT" key 23 in screen 92 may display screen 93 shown in FIG. 30 may be on the programmable wall module 11. Screen 93 may correspond to event 3 for Saturday-Sunday. As shown, Screen 93 may have the left key 21 may be labeled "Done". One may go back one level (i.e., return to Monday-Friday screen). The right key 23 may be labeled "NEXT" to move to the next event screen. The middle key 22 may be labeled "EDIT" to allow the tenant to edit the event.

In screen 93, alpha numeric area 33 may display "SA-SU E3" and alpha numeric area 29 may display a time corresponding to the start time for the event. Screen 93 may also display the effective occupancy state, such as "Occupied", "Unoccupied", or "Standby" along with a corresponding symbol. Pressing "EDIT" key 22 in screen 93 may allow a user to edit the event, similar to as discussed above with reference to FIGS. 33 and 34.

Figure 31:
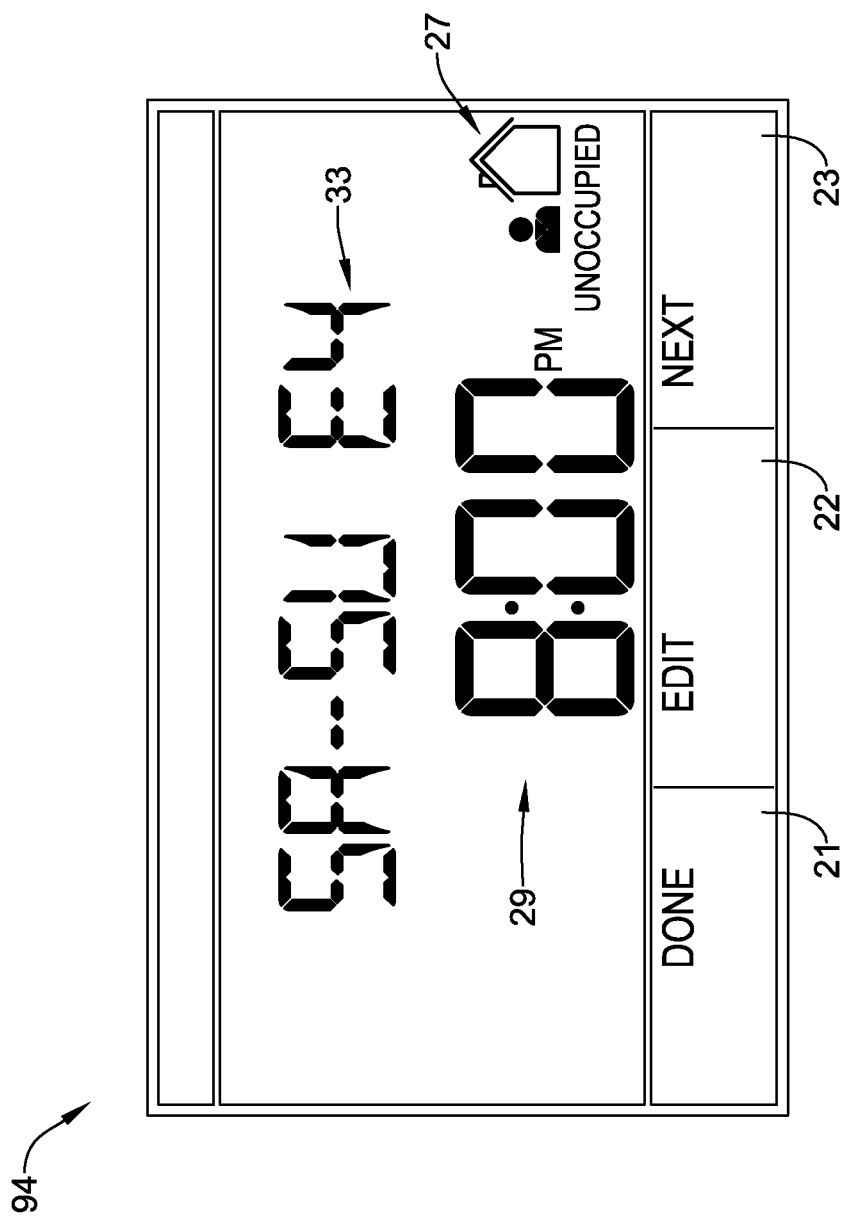

Pressing "NEXT" key 23 in screen 93 may display screen 94 shown in FIG. 31 may be on the programmable wall module 11. Screen 94 may correspond to event 4 for Saturday-Sunday. As shown, Screen 94 may have the left key 21 may be labeled "Done". One may go back one level (i.e., return to Monday-Friday screen). The right key 23 may be labeled "NEXT" to move to the next event screen. The middle key 22 may be labeled "EDIT" to allow the tenant to edit the event.

In screen 94, alpha numeric area 33 may display "SA-SU E4" and alpha numeric area 29 may display a time corresponding to the start time for the event. Screen 94 may also display the effective occupancy state, such as "Occupied", "Unoccupied", or "Standby" along with a corresponding symbol. Pressing "EDIT" key 22 in screen 94 may allow a user to edit the event, similar to as discussed above with reference to FIGS. 33 and 34.

Figure 32:
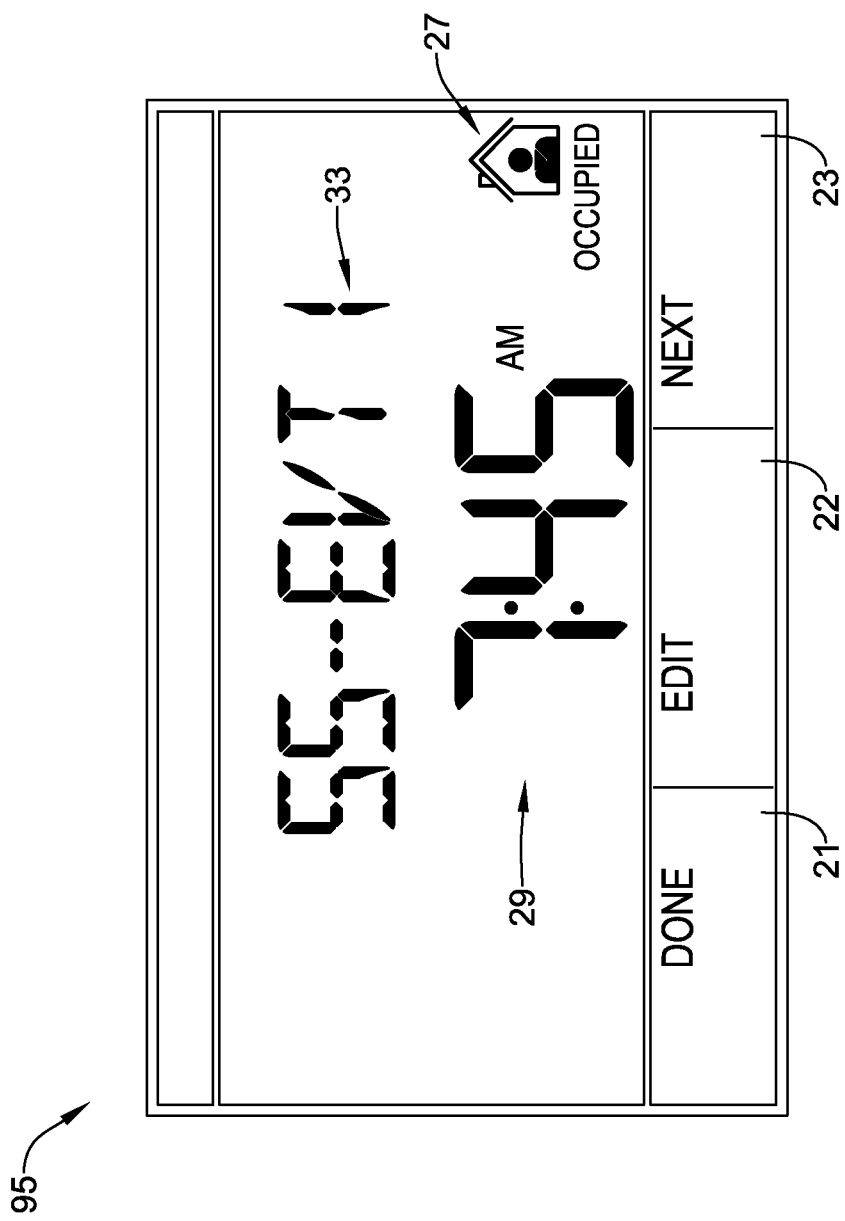

FIG. 32 is an alternative Saturday-Sunday event screen 95. Instead of displaying label "SA-SU-E1", screen 95 displays "SS-EVT1". Other suitable labels could also be used. Further, similar labels may be applied to the other events (e.g. events 2, 3, and 4).

Although not shown, similar screens could be created by the configuration tool 13 for each of the individual days of the week (e.g. Monday, Tuesday, Wednesday, Thursday, Friday, Saturday, Sunday, and Holiday) and, once created, uploaded onto the programmable wall module 11 via the output port 9 of the configuration tool 13.

Figure 35:
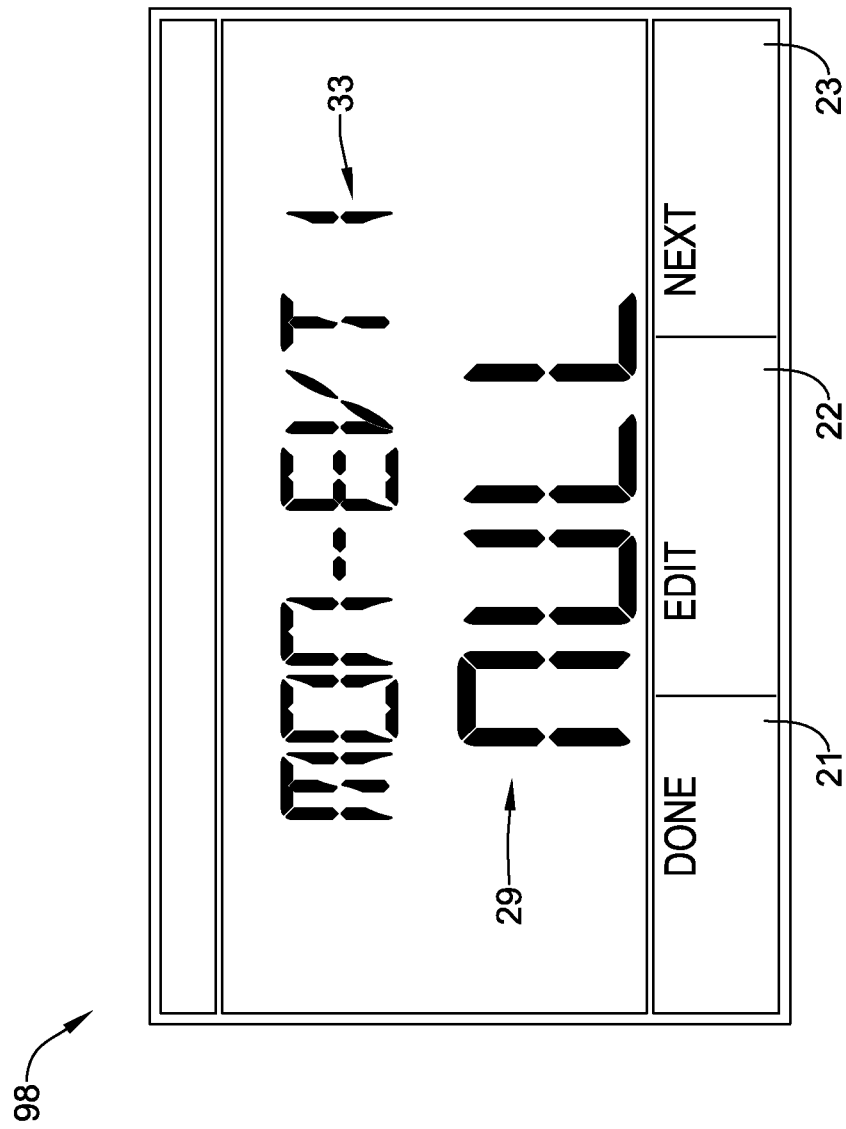
Figure 35A:
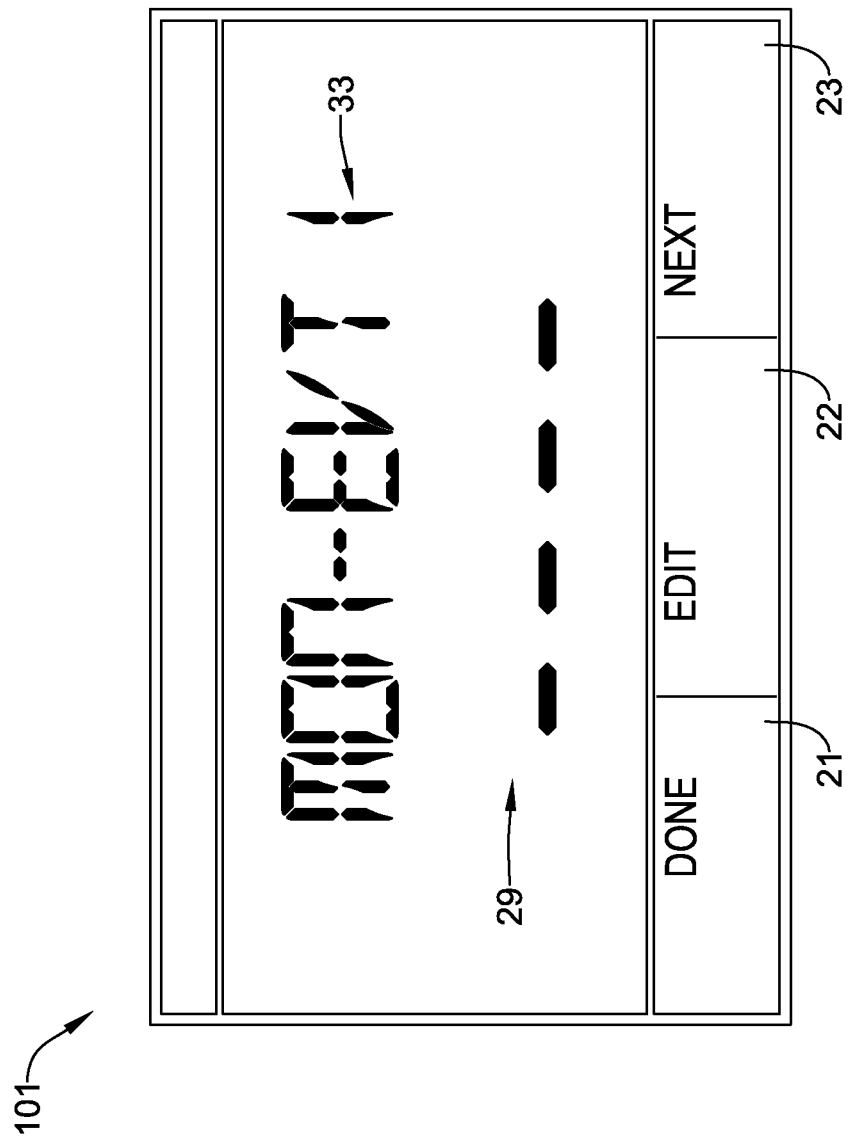
Figure 36:
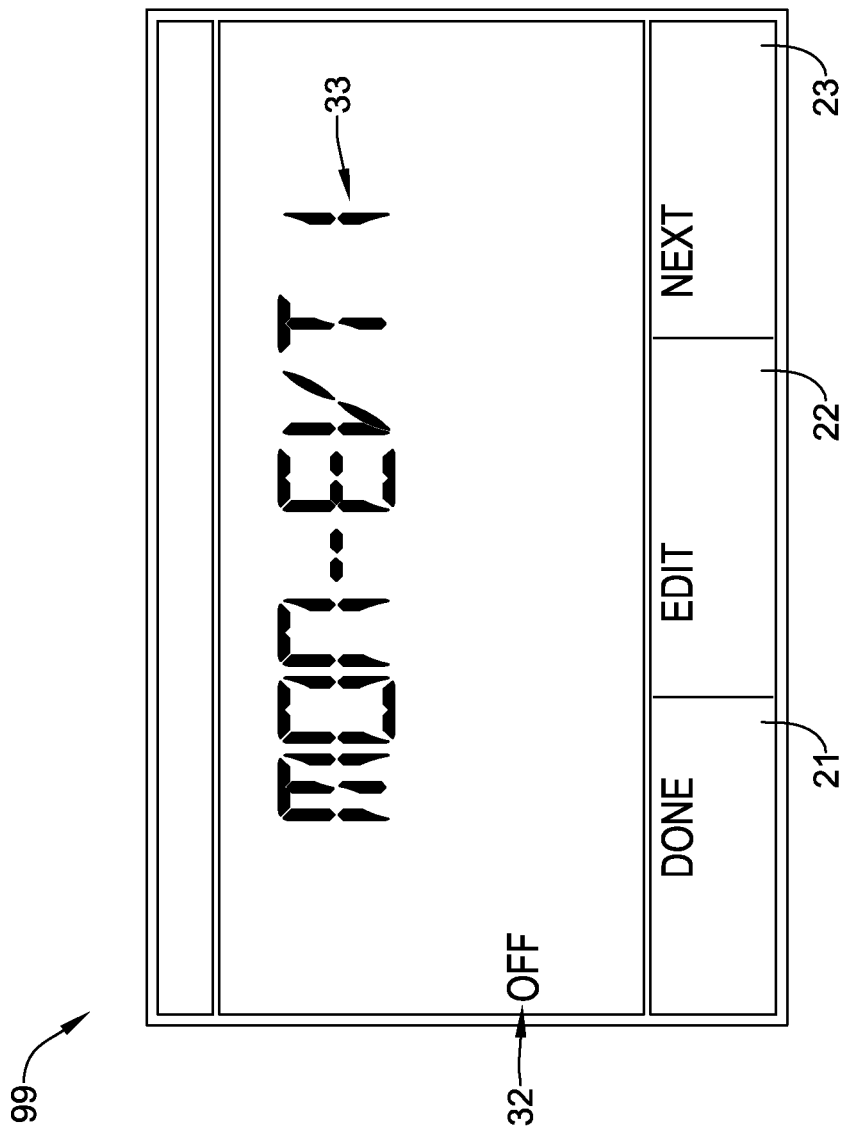

FIGS. 35, 35A, and 36 show example screens 98, 99, and 101 of an unused, or null, event. For simplicity, this is shown only with reference to event 1 of Monday, but could be implemented in a similar manner for other events. As shown in screen 98, instead of having the time and occupancy state shown, alpha numeric area 29 may have the label "NULL". In screen 99, instead of having the time and occupancy state shown, alpha numeric area 29 may be blank and the fan status area 32 may say "OFF". As shown in screen 98, instead of having the time and occupancy state shown, alpha numeric area 29 may have dashes, such as four dashed "----". These are just some examples and it is contemplated that other labels may be used, as desired.

Figure 37:
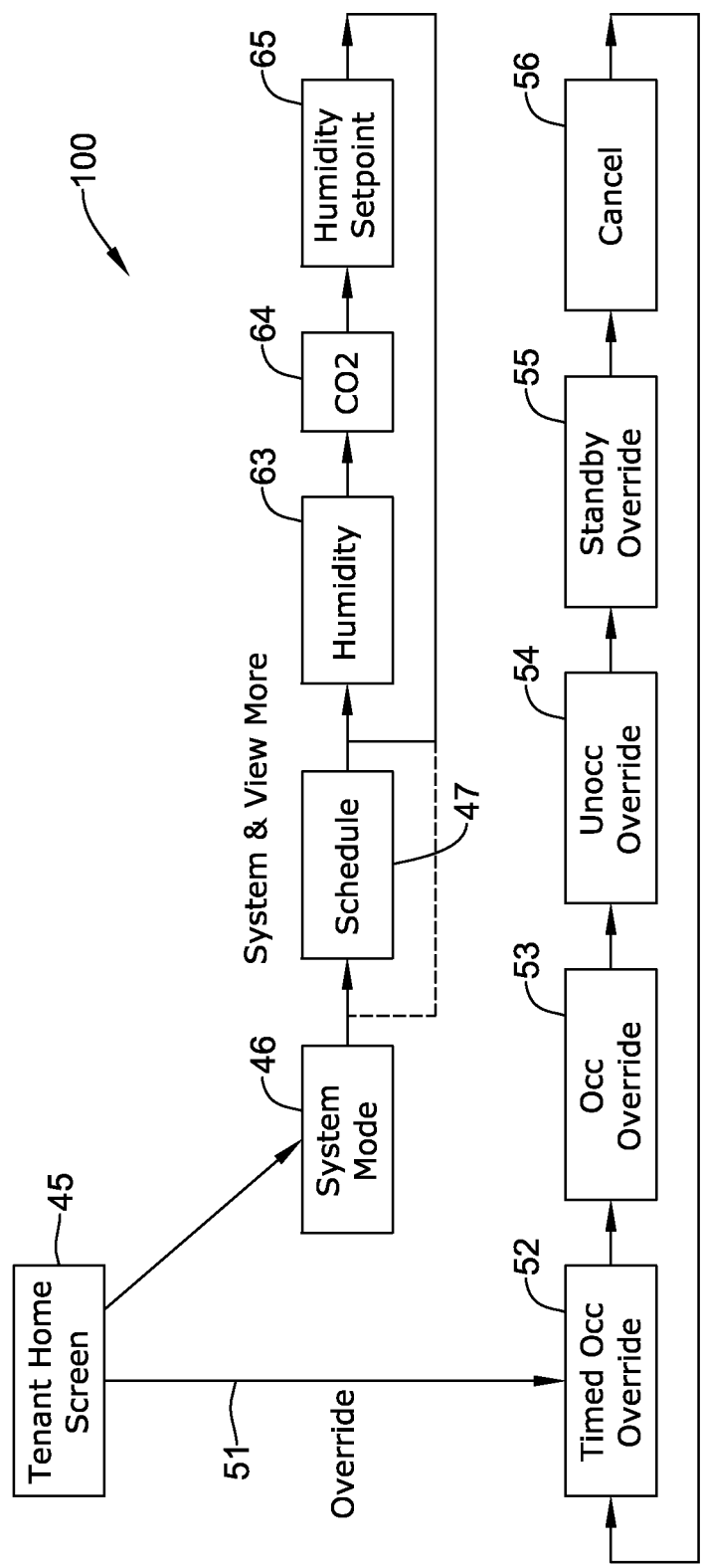
FIG. 37 is a block diagram of another illustrative tenant scenario for the programmable wall module.

FIG. 37 is a block diagram of another illustrative tenant scenario for the programmable wall module 11. As shown, the top level of this menu scenario is a Tenant home screen 100. The home screen 45 may be display by the programmable wall module 11 as a default screen, when no other data entry is underway, and/or when selected by the user. A home screen may, if desired, display one or more parameters relating to environmental conditions such as indoor and/or outdoor temperature and/or humidity, set points, time, equipment status, and/or any other suitable parameter or setting, as desired. In some cases, the home screen may vary depending on the HVAC system that the programmable wall module 11 is operatively engaged to (via the HVAC controller 17).

The Tenant may access one or more sub-levels from the home screen 45 via a "system & view more". When accessed, the programmable wall module 11 may initially display a system mode block 46. From system mode block 46, the tenant may cycle through the schedule block 47, a humidity screen 63, CO2 screen 64, and a humidity setpoint screen 65. From the schedule block 47, the tenant may access the programmed screens for the schedule.

From the Tenant home screen 45, the tenant may access a Timed Occ Override block 52 (via an Override path 51) and cycle through an Occ Override block 53, an Unocc Override block 54, a Standby Override block 55, a Cancel block 56 (if provided) and back to the Timed Occ Override block 52.

Figure 38:
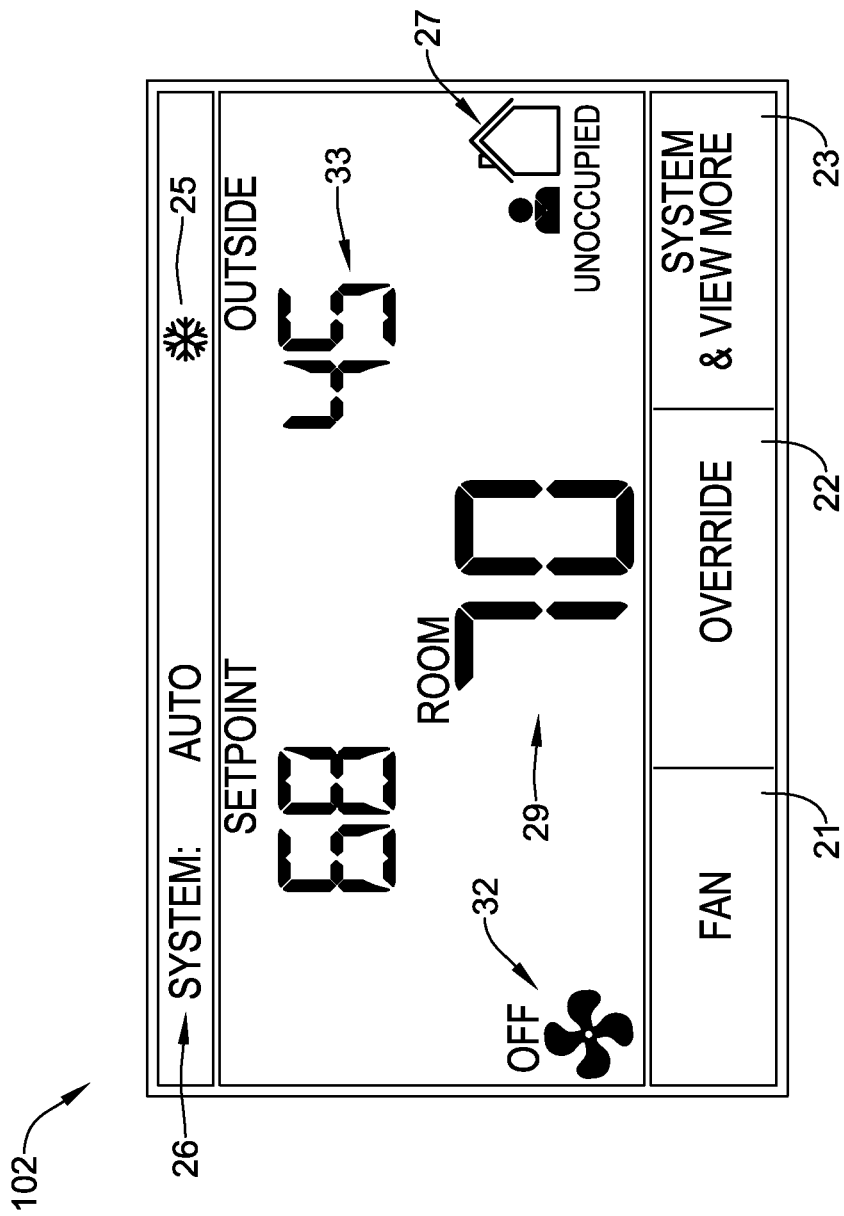
FIGS. 38-43 are pictorial views showing some illustrative screens that may be displayed on the display of the programmable wall module.
Figure 39:
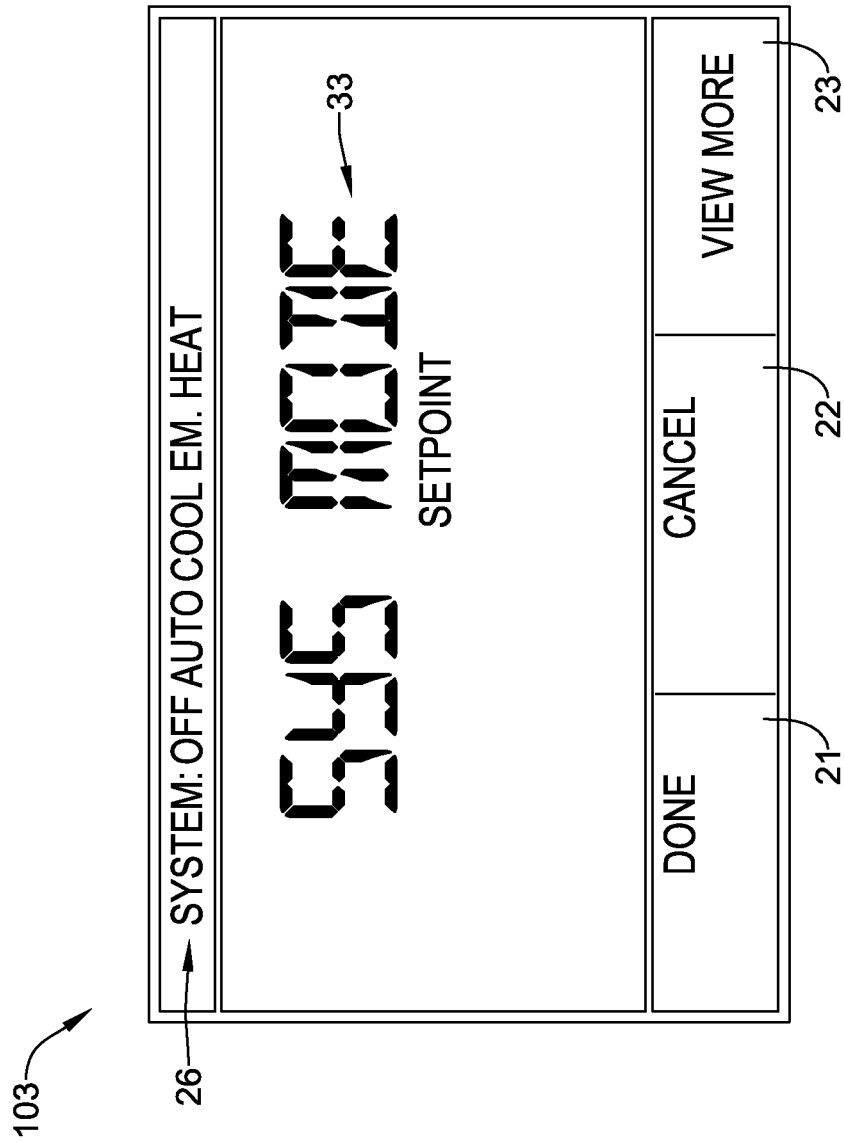

FIGS. 38-43 are pictorial views showing some illustrative screens that may be displayed on the display of the programmable wall module 11. In some embodiments, the screens shown in FIG. 38-43 may be manifestations of the some of the screens described in the tenant scenario of FIG. 37. FIG. 38 shows an illustrative example home screen 102 for the tenant scenario. Home screen 102 may be similar to home screen 70 shown in FIG. 7. If system mode setpoint is configured, then pressing the "System & View more" key 23 may go to the system mode setpoint screen 103 shown in FIG. 39. Setpoint screen 103 may be similar to setpoint screen 71 shown in FIG. 8. The right key 23 may change from "System & View More" to "View More". If there are no View More items, then the "&" and "View More" symbols are not necessarily displayed.

Figure 40:
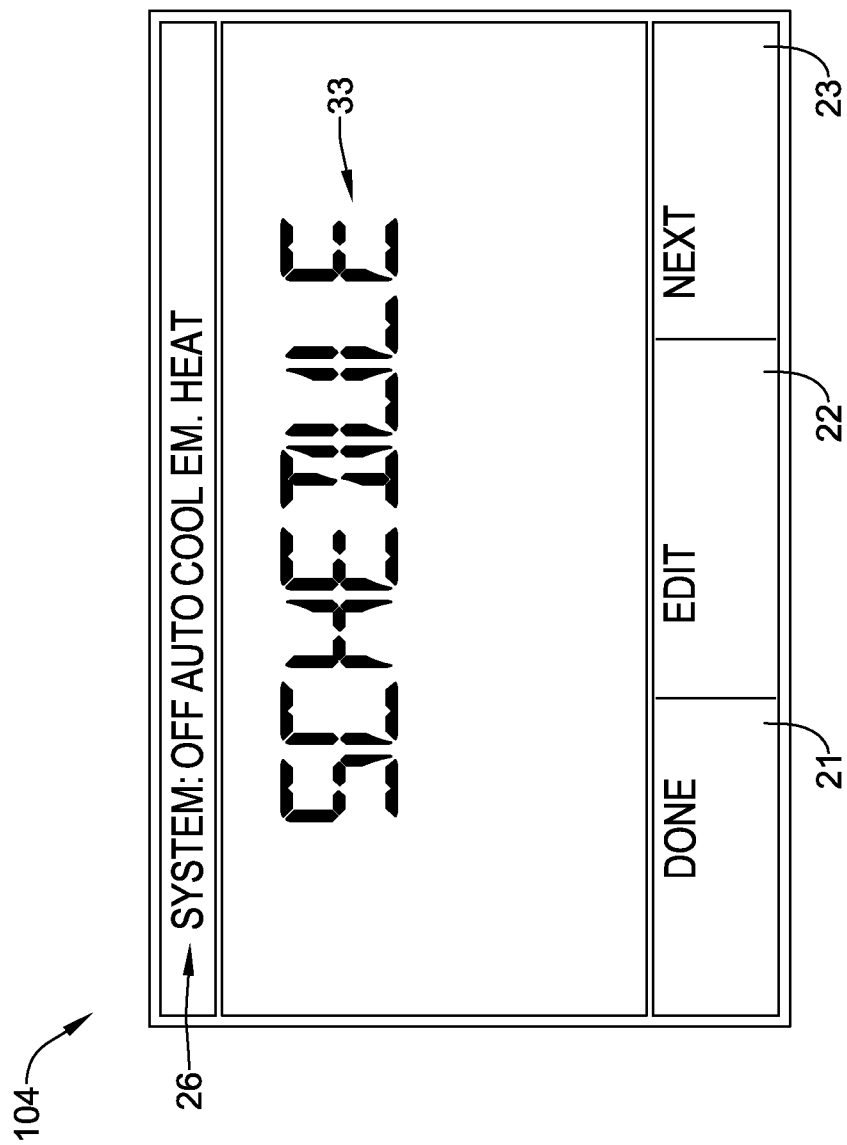

If the "VIEW MORE" button 23 is pressed from the system mode setpoint screen 103, or if the system mode setpoint is not configured, then the wall module 11 may display the schedule screen 104. In FIG. 40, top alpha numeric area 33 may display a label such as "SCHEDULE". The middle key 22 may display edit, which may access the schedule sub-screens. The left key 21 may be labeled "Done". In FIG. 40, the right key 23 may be labeled "VIEW MORE". In other cases, the right key 23 may be labeled "NEXT" or other suitable label. One can go to next View More screen in the list. If there is only one entry in the View More list, then the Next key 23 is not necessarily shown.

Figure 41:
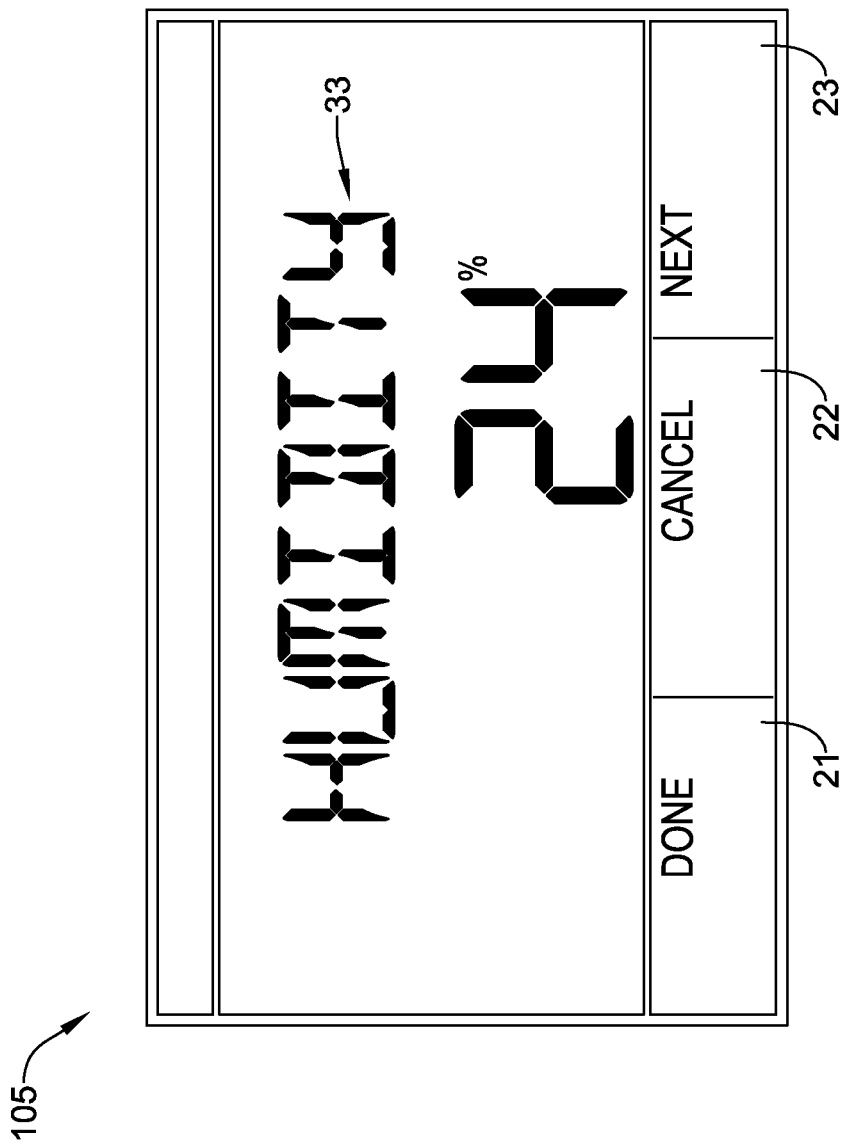
Figure 42:
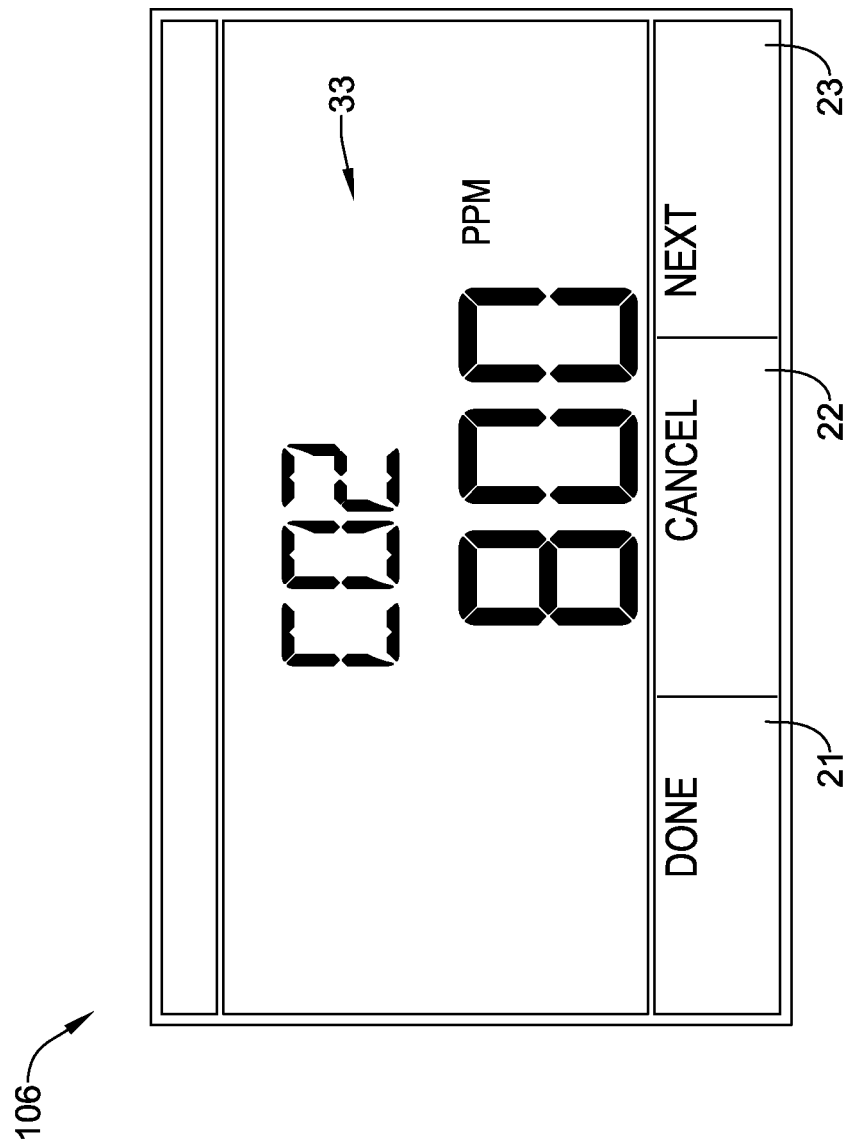
Figure 43:
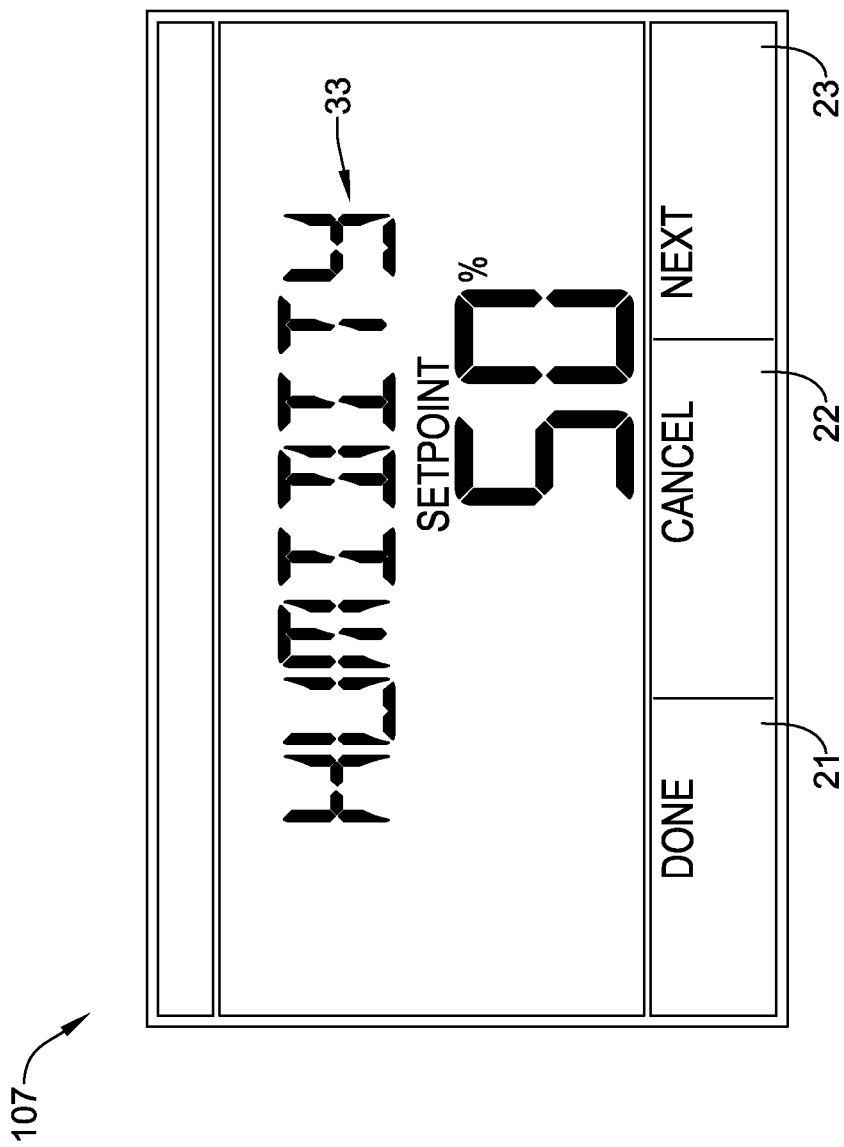

The "View More" key may save and go to the "View More" screens. Examples of "view more" screens, as shown in FIGS. 41, 42, and 43, may include room humidity percent screen 105, room CO2 PPM screen 106, and humidity setpoint screen 107, respectively, or other suitable screens, as programmed by a contractor, and as automatically generated by the configuration tool 13. If provided, settings for each of screens 105, 106, and 107 may be adjusted by pressing up or down keys. In each screen 105, 106, and 107, the middle key 22 may be a "Cancel", which may cancel and discard any changes. The left key 21 may be labeled "Done". The value changed on these screens, if any, may be saved and sent to the controller. One may go back one level (i.e., return to Home screen) if desired. The right key 23 may be labeled "VIEW MORE" or, in other cases, could be "NEXT". When "VIEW MORE" is pressed, the wall module 11 may display the next screen.

Figure 44:
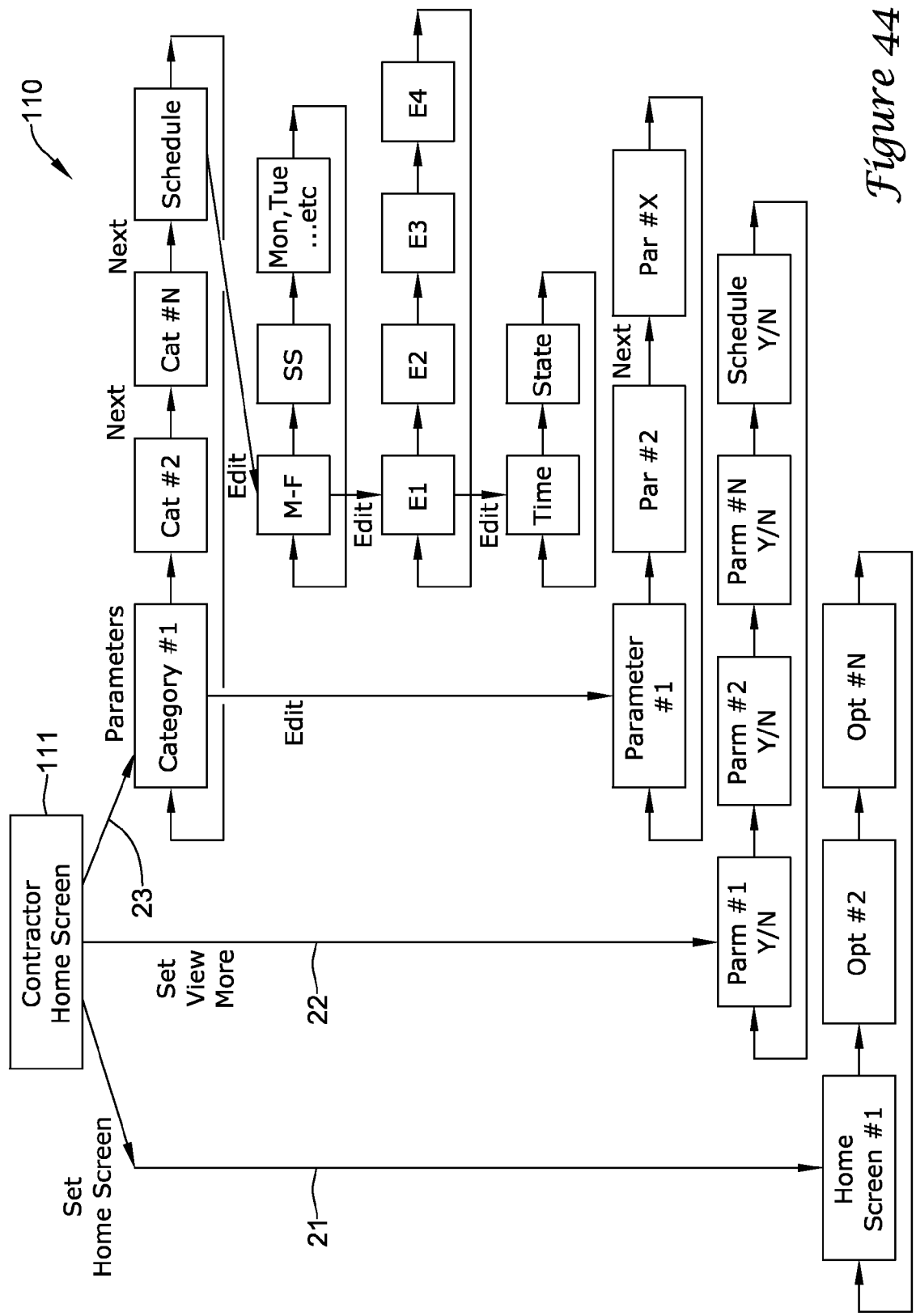
FIG. 44 is a flow diagram of an illustrative menu structure for a contractor/installer scenario 110 for the programmable wall module.

FIG. 44 is a flow diagram of an illustrative menu overview of a contractor/installer menu scenario 110 for the programmable wall module 11. As shown, the top level of menu scenario 110 is a contractor home screen 111. The contractor home screen 111 may be display by the programmable wall module 11 when entered by a contractor or installer. In some cases, a set of rules may be resorted to for the contractor or installer. The contractor may enter contractor/installer mode by, for example, pressing a special key sequence, and/or by entering a password or pin. The key sequence could be a number of keys pressed in a specified order or two or more keys pressed simultaneously. The password or pin may include any combination of letters, numbers or other characters. The contractor home screen 111 may have the same or similar format as the tenant home screen 70 of FIG. 7. The contractor may exit contractor/installer mode by pressing the same special key sequence used for entering the mode. If the wall module is left in contractor/installer home screen 111 for a predetermined amount of time (e.g. 2 minutes, 3 minutes, four minutes, 5 minutes, or other amount of time) without a key press, then the wall module 11 may exit contractor/installer mode screen 111 and return the Tenant Mode screen. The timeout for the parameters screen should be sufficiently long to allow for the contractors to do their work.

Once in the contractor mode, the user may be shown the following soft key labels on the contractor home screen 111: "SET HOME SCREEN", "SET VIEW MORE", and "PARAMETERS". When in the contractor mode, the contractor/installer may access one or more sub-levels from the contractor home screen 111. For example, from the contractor/installer home screen block 111, keys 21, 22, and 23 may be available for selecting "SET HOME SCREEN", "SET VIEW MORE", and "PARAMETERS", as shown in FIG. 44. The arrows are labeled 21, 22 and 23, respectively, for the home screen options, the view more settings, and the parameters. Selecting key 21 may go to a number of blocks allowing the contractor to set the home screen. For example, the contractor installer may scroll through a home screen #1, option #2 and so on to option #N, where N may be the number of options available in the system. The contractor may select a desired home screen for the tenant using the soft keys.

Selecting key 22 may go to a number of blocks allowing a contractor to set the parameters that are viewable by the tenant. Pressing the "SET VIEW MORE" key 22 from the contractor/installer home screen 111 may give the "SET VIEW MORE" parameter #1. A word Yes/No may blink indicating that the setpoint may be viewed by the tenant. Pressing Up/Down keys may toggle between Yes and No. If Yes is selected, then the tenant may see this screen under the View More screens in the Tenant Mode. If No is selected, then the Tenant will not necessarily see this screen in the View More screens. In the latter situation, the screen may be available only at contractor/installer mode Parameters key. Pressing a "Next" key may have the screen go to the next "SET VIEW MORE" parameter and save the selection from the previous screen. The next "SET VIEW MORE" may be parameter #2. Yes/No may be selected for parameter #2 in a similar manner as parameter #1.

Pressing the "Next" key may have the screen go to the next "SET VIEW MORE" parameter and save the selection from the previous screen. The next "SET VIEW MORE" may be parameter #3. Yes/No may be selected for parameter #3 in a similar manner as parameter #1. Example parameters may include humidity, CO2, temperature, and other HVAC parameters.

Pressing a "Next" key may have the screen go to the next "SET VIEW MORE" parameter and save the selection from the previous screen. The next "Set View More" may be the schedule parameter. A word Yes/No may blink indicating that the schedule may be viewed by the tenant. Pressing Up/Down keys may toggle between Yes and No. If Yes is selected, then the tenant may see the schedule screen under the View More screens in the Tenant Mode. If No is selected, then the Tenant will not necessarily see the schedule screen in the View More screens. In the latter situation, the screen may be available only at contractor/installer mode Parameters key. Pressing a "Next" key may have the screen go to the next "SET VIEW MORE" parameter, or in this case, return to the first parameter screen, and save the selection from the previous screen.

Pressing the Done key in any of the parameter option screens may result in the value changed on this screen being saved and going back one level (i.e., returning to the Contractor/Installer Home screen 111). Pressing the Cancel key may result in the value changed on the current screen being canceled (i.e., discarded), although all other changes made at this level may be saved, and going back one level (i.e., returning to Contractor/Installer Home screen 111). If the contractor leaves the wall module in the "SET VIEW MORE" mode for more than (e.g., 60) seconds without a key press, then it may return to contractor/installer Home screen 111 and save changes on current screen.

Selecting key 23 may go to a number of blocks allowing a contractor to set/change the parameters. Pressing the "PARAMETERS" key 22 from the contractor/installer home screen 111, category 1 of the parameters may be obtained. There should be at least one category configured to be able to go into the Parameter category screen. The contractor, via the configuration tool 13, may configure the names of the parameter categories, how many there are, and what parameters are in each category. The configuration tool 13 may set up some fixed categories like balance, sensors, setpoints, and limits if appropriate for the application at hand. Other categories, such as offsets, may be set up.

Pressing the "Next" key may take the screen into the next parameter category. As shown, there may be "N" categories and then a schedule category. Pressing the "Done" key may return one level to the Contractor/Installer mode Home screen 111. The parameter saving may be done at the next level down. Pressing the "Edit" key may move the screen down one level into the category chosen. Here, the first parameter in that category may be shown. If the contractor leaves the wall module in the Parameter category mode for more than a predetermined amount of time without a key press, then it may return one level to the Contractor/Installer Home screen 111. This timeout should be long enough to allow for the contractor to do their work.

After entering a category, the "Edit" key may be pressed resulting in the first parameter in that category being shown, such as Parameter #1. The value of the parameter may blink, if it's editable, indicating to the contractor that it can be changed with the Up/Down keys. Pressing the Next key may move the screen to the next parameter in the present category, such as parameter #2. The value of the parameter may blink, if it's editable, indicating to the contractor that it can be changed with the Up/Down keys. Pressing the Next key may move the screen to the next parameter in the present category, and this may be performed for all X parameters. The contractor, via the configuration tool 13, may select the parameters, configure their names, determine how many there are, determine if certain parameters are editable, and configure the high and low limits, units, and increment amounts. If the "Done" key is pressed, then the value changed on the parameter screen may be saved and sent to the controller and the screen may go back one level (i.e., return to the parameter category screen. If the "cancel" key is pressed, then the value changed on the current screen may be canceled (i.e., discarded), although all of the other changes made at this level may be saved, and the screen goes back one level (i.e., returns to level 1 Parameter category screen).

Pressing the "Edit" key when in the schedule category may move the screen down one level. Here, the contractor may scroll through the "days" of the schedule by pressing the "Next" key. Example days may include Monday-Friday, Saturday and Sunday, Monday, Tuesday, Wednesday, Thursday, Friday, Saturday, Sunday, Holiday, and/or other combination of days, as desired. Pressing the "Edit" key when one of the "days" is displayed moves down one level to allow a contractor to select an event for that day. As shown, there are four events for Monday-Friday including event 1 (E1), event 2 (E2), event 3 (E3), and event 4 (E4). However, other number of events may be used. For this sublevel, the contractor may scroll through the events by pressing "Next". To edit one of the events, the contractor can press "Edit" and then may edit the time or the state of the event. If the "Done" key is pressed, then the value changed on the may be saved and sent to the controller and the screen may go back one level. If the "cancel" key is pressed, then the value changed on the current screen may be canceled (i.e., discarded), although all of the other changes made at this level may be saved, and the screen goes back one level.

It is to be understood that while the tenant and contractor menu scenarios are shown in certain orders, this is not meant to be limiting and other orders of screens may be used, as desired. Furthermore, it is contemplated that other screens may be displayed by the wall module 11. Example screens and functions that may be employed are disclosed in, for example, U.S. Ser. No. 11/957,253 titled "Configurable Wall Module System" filed Dec. 14, 2007.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure.

What is claimed is:

1. A configuration tool for configuring a programmable wall module of an HVAC system with scheduling information, wherein the programmable wall module includes a user interface that is configured to display a number of screens, the configuration tool comprising:
   a controller;
   a user interface controlled by the controller;
   an output port controlled by the controller;
   the controller configured to create a number of screens for the user interface of a programmable wall module based on a number of user inputs received via the user interface of the configuration tool, wherein the number of user inputs is less than the number of screens that are created by the controller; and
   wherein the controller is configured to output the number of screens that are created by the controller to the output port of the configuration tool so that the number of screens can be uploaded to a programmable wall module for display on the user interface of the programmable wall module.

2. The configuration tool of claim 1, wherein the controller is configured to upload the number of screens to the programmable wall module after the number of screens are created by the controller.

3. The configuration tool of claim 1, wherein at least some of the number of screens that are created by the controller show scheduling information.

4. The configuration tool of claim 1, wherein at least some of the number of screens that are created by the controller show scheduling information, and include a first menu level for showing days, and a second menu level for editing a selected day.

5. The configuration tool of claim 3, wherein the number of user inputs received via the user interface of the configuration tool include a first input for selecting whether a schedule is to be displayed to a user of the programmable wall module, and a second input for selecting a one of two or more type of schedule formats for the number of screens.

6. The configuration tool of claim 5, wherein the number of user inputs received via the user interface of the configuration tool include a third input for determining whether the scheduling information is modifiable by a user of the programmable wall module or viewable only.

7. The configuration tool of claim 1, wherein the number of screens are all automatically configured in a language that is selected by a user of the configuration tool.

8. The configuration tool of claim 1, wherein the number of user inputs is five or less before the controller can create the number of screens for the user interface of the programmable wall module.

9. A method of configuring a programmable wall module with one or more screens, comprising:
communicatively connecting a configuration tool to the programmable wall module;
displaying selectable scheduling configuration information to a user on a user interface of the configuration tool;
allowing the user to make scheduling configuration information selections via the user interface of the configuration tool; and
creating a plurality of scheduling screens for the programmable wall module with the configuration tool based on the scheduling configuration information selections made by the user of the configuration tool.

10. The method of claim 9, wherein the selectable scheduling configuration information includes one or more of the following: whether a schedule will be viewable by a user of the programmable wall module, whether a schedule is editable by a user of the programmable wall module, a type of schedule to be displayed on the programmable wall module, and a step change size for a schedule if the schedule is editable by a user of the programmable wall module.

11. The method of claim 10, wherein the schedule type includes one or more of the following: a 8 day schedule, a 7 day schedule, a 5-2-1 day schedule, a 5-2 day schedule, a 5-2-8 day schedule, a 2-5 day schedule, a 8-2-5 day schedule, a 5-1-1 day schedule, a 5-1-1-1 day schedule, a 8-5-1-1 day schedule, and a 1-2-5 day schedule.

12. The method of claim 9, wherein the plurality of scheduling screens are created with the configuration tool using one or more predefined labels.

13. The method of claim 9, further comprising uploading the plurality of scheduling screens to the programmable wall module from the configuration tool.

14. The method of claim 9, wherein the programmable wall module includes a tenant mode and a contractor mode, wherein the plurality of scheduling screens are displayed on the programmable wall module when in the tenant mode for viewing and/or modification by a tenant.

15. A configuration tool for configuring a programmable wall module of an HVAC system with scheduling information, wherein the programmable wall module includes a user interface that is configured to display a number of screens, the configuration tool comprising:
a controller;
a user interface controlled by the controller;
an output port controlled by the controller;
the controller configured to allow a user to select from two or more configuration options for the programmable wall module, and to create two or more screens for the user interface of the programmable wall module based on the user's selection from the two or more configuration options; and
the controller is configured to output the two or more screens that are created by the controller to the output port of the configuration tool so that the two or more screens can be uploaded to the programmable wall module for display on the user interface of the programmable wall module.

16. The configuration tool of claim 15, wherein the two or more configuration options include one or more of the following: whether a schedule will be viewable by a user of the programmable wall module, whether a schedule is editable by a user of the programmable wall module, a type of schedule to be displayed on the programmable wall module, and a step change size for a schedule if the schedule is editable by a user of the programmable wall module.

17. The configuration tool of claim 15, wherein the schedule type includes one or more of the following: a 8 day schedule, a 7 day schedule, a 5-2-1 day schedule, a 5-2 day schedule, a 5-2-8 day schedule, a 2-5 day schedule, a 8-2-5 day schedule, a 5-1-1 day schedule, a 5-1-1-1 day schedule, a 8-5-1-1 day schedule, and a 1-2-5 day schedule.

18. The configuration tool of claim 15, wherein the two or more screens include a first level screen for showing days, a second level screen for viewing a schedule of a selected day, and a third level screen for editing the schedule of the selected day.

19. The configuration tool of claim 15, wherein the two or more screens are created using one or more predefined labels.

20. The configuration tool of claim 15, wherein the two or more screens include two or more selectable inputs that are selectable by a user of the programmable wall module.

* * * * *